(12) United States Patent
Yoshida et al.

(10) Patent No.: US 10,013,923 B2
(45) Date of Patent: Jul. 3, 2018

(54) DISPLAY DEVICE AND DRIVING METHOD THEREOF

(71) Applicant: Semiconductor Energy Laboratory Co., Ltd., Atsugi-shi, Kanagawa-ken (JP)

(72) Inventors: Yasunori Yoshida, Atsugi (JP); Hajime Kimura, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 98 days.

(21) Appl. No.: 14/939,497

(22) Filed: Nov. 12, 2015

(65) Prior Publication Data

US 2016/0078822 A1  Mar. 17, 2016

Related U.S. Application Data

(63) Continuation of application No. 13/657,136, filed on Oct. 22, 2012, now Pat. No. 9,235,067, which is a
(Continued)

(30) Foreign Application Priority Data

Jun. 2, 2006 (JP) .................................. 2006-155459

(51) Int. Cl.
*G09G 3/34* (2006.01)
*G09G 3/20* (2006.01)
(Continued)

(52) U.S. Cl.
CPC ......... *G09G 3/3406* (2013.01); *G02F 1/0121* (2013.01); *G09G 3/2025* (2013.01);
(Continued)

(58) Field of Classification Search
CPC .. G09G 3/3406; G09G 3/2025; G09G 3/3611; G09G 3/3614; G09G 3/3655;
(Continued)

(56) References Cited

U.S. PATENT DOCUMENTS 4,969,718 A  11/1990 Noguchi et al.
5,745,207 A   4/1998 Asada et al.
(Continued)

FOREIGN PATENT DOCUMENTS

CN  001369731 A  9/2002
CN  001200313 C  5/2005
(Continued)

OTHER PUBLICATIONS

Lee.J et al., "69.4: Amorphous Silicon Based 40"LCD TV Using Ultra Fast OCB Mode", SID Digest '06 : SID International Symposium Digest of Technical Papers, Jun. 6, 2006, vol. 37, pp. 1950-1953.
(Continued)

*Primary Examiner* — Sahlu Okebato
(74) *Attorney, Agent, or Firm* — Robinson Intellectual Property Law Office; Eric J. Robinson

(57) ABSTRACT

It is an object of the present invention to provide a display device in which problems such as an increase of power consumption and increase of a load of when light is emitted are reduced by using a method for realizing pseudo impulsive driving by inserting an dark image, and a driving method thereof. A display device which displays a gray scale by dividing one frame period into a plurality of subframe periods, where one frame period is divided into at least a first subframe period and a second subframe period; and when luminance in the first subframe period to display the maximum gray scale is Lmax1 and luminance in the second subframe period to display the maximum gray scale is
(Continued)

Lmax2, (½) Lmax2<Lmax1<(9/10) Lmax2 is satisfied in the one frame period, is provided.

17 Claims, 37 Drawing Sheets

Related U.S. Application Data continuation of application No. 13/334,128, filed on Dec. 22, 2011, now Pat. No. 8,441,423, which is a continuation of application No. 11/797,534, filed on May 4, 2007, now Pat. No. 8,106,865.

(51) Int. Cl.
  *G09G 3/36* (2006.01)
  *G02F 1/01* (2006.01)
  *G09G 5/10* (2006.01)

(52) U.S. Cl.
  CPC ......... *G09G 3/3611* (2013.01); *G09G 3/3614* (2013.01); *G09G 3/3655* (2013.01); *G09G 5/10* (2013.01); *G09G 2300/0876* (2013.01); *G09G 2310/024* (2013.01); *G09G 2310/061* (2013.01); *G09G 2320/0247* (2013.01); *G09G 2320/0252* (2013.01); *G09G 2320/0261* (2013.01); *G09G 2320/0276* (2013.01); *G09G 2320/0626* (2013.01); *G09G 2320/0633* (2013.01); *G09G 2330/021* (2013.01); *G09G 2340/16* (2013.01)

(58) Field of Classification Search
  CPC ............. G09G 5/10; G09G 2300/0876; G09G 2310/024; G09G 2320/0247; G09G 2320/0252; G09G 2320/0261; G09G 2320/0276; G09G 2320/0626; G09G 2320/0633; G09G 2330/021; G09G 2340/13
  See application file for complete search history.

(56) References Cited

U.S. PATENT DOCUMENTS

| | | | |
|---|---|---|---|
| 5,990,629 A | 11/1999 | Yamada et al. | |
| 6,115,018 A | 9/2000 | Okumura et al. | |
| 6,127,998 A | 10/2000 | Ichikawa et al. | |
| 6,144,364 A | 11/2000 | Otobe et al. | |
| 6,208,467 B1 | 3/2001 | Naka et al. | |
| 6,331,843 B1 | 12/2001 | Kasahara et al. | |
| 6,392,620 B1 | 5/2002 | Mizutani et al. | |
| 6,417,835 B1 | 7/2002 | Otobe et al. | |
| 6,563,486 B2 | 5/2003 | Otobe et al. | |
| 6,614,415 B2 | 9/2003 | Mizutani et al. | |
| 6,630,977 B1 * | 10/2003 | Yamazaki ......... G02F 1/134363 257/E21.413 |
| 6,646,692 B2 | 11/2003 | Yamazaki et al. | |
| 6,646,707 B2 | 11/2003 | Noh et al. | |
| 6,724,358 B2 | 4/2004 | Ban et al. | |
| 6,816,222 B2 | 11/2004 | Ono et al. | |
| 6,970,148 B2 | 11/2005 | Itoh et al. | |
| 6,972,824 B2 | 12/2005 | Masutani et al. | |
| 7,050,038 B2 | 5/2006 | Matsuda et al. | |
| 7,095,390 B2 | 8/2006 | Otobe et al. | |
| 7,119,766 B2 | 10/2006 | Otobe et al. | |
| 7,136,130 B2 | 11/2006 | Ono et al. | |
| 7,256,853 B2 | 8/2007 | Ono et al. | |
| 7,295,173 B2 | 11/2007 | Itoh et al. | |
| 7,295,268 B2 | 11/2007 | Ono et al. | |
| 7,355,575 B1 | 4/2008 | Ota et al. | |
| 7,411,647 B2 | 8/2008 | Ono et al. | |
| 7,528,926 B2 | 5/2009 | Sung et al. | |
| 7,567,325 B2 | 7/2009 | Ono et al. | |
| 7,646,370 B2 | 1/2010 | Senda et al. | |
| 7,696,960 B2 | 4/2010 | Senda et al. | |
| 7,847,906 B2 | 12/2010 | Tak | |
| 7,855,698 B2 | 12/2010 | Otobe et al. | |
| 7,932,915 B2 | 4/2011 | Miyata et al. | |
| 8,094,143 B2 | 1/2012 | Kamada et al. | |
| 8,223,091 B2 | 7/2012 | Ishihara et al. | |
| 8,314,426 B2 | 11/2012 | Kokubo et al. | |
| 8,421,985 B2 | 4/2013 | Yamazaki et al. | |
| 8,502,762 B2 | 8/2013 | Kamada et al. | |
| 2002/0044249 A1 | 4/2002 | Hirota | |
| 2002/0196394 A1 | 12/2002 | Ohta et al. | |
| 2003/0011626 A1 | 1/2003 | Tanabe et al. | |
| 2003/0043327 A1 | 3/2003 | Aoyama et al. | |
| 2003/0086045 A1 * | 5/2003 | Ono .................. G02F 1/134309 349/141 |
| 2004/0095402 A1 | 5/2004 | Nakano | |
| 2004/0155847 A1 | 8/2004 | Taoka et al. | |
| 2005/0140634 A1 | 6/2005 | Takatori | |
| 2005/0162360 A1 | 7/2005 | Ishihara et al. | |
| 2005/0199880 A1 | 9/2005 | Hoffman et al. | |
| 2005/0259207 A1 | 11/2005 | Yang et al. | |
| 2005/0264720 A1 | 12/2005 | Itou et al. | |
| 2006/0006794 A1 | 1/2006 | Sakakura et al. | |
| 2006/0103621 A1 | 5/2006 | Feng | |
| 2006/0125812 A1 | 6/2006 | Lee | |
| 2006/0227569 A1 | 10/2006 | Uehara et al. | |
| 2006/0250543 A1 | 11/2006 | Sugimoto et al. | |
| 2006/0256141 A1 | 11/2006 | Maruyama et al. | |
| 2008/0225183 A1 | 9/2008 | Tomizawa et al. | |
| 2008/0272998 A1 | 11/2008 | Yano et al. | |
| 2010/0090938 A1 | 4/2010 | Kamada et al. | |
| 2011/0157477 A1 | 6/2011 | Miyata et al. | |
| 2012/0307161 A1 | 12/2012 | Ishihara et al. | |
| 2014/0184976 A1 | 7/2014 | Kimura et al. | |

FOREIGN PATENT DOCUMENTS

| | | |
|---|---|---|
| CN | 001684134 A | 10/2005 |
| CN | 001690815 A | 11/2005 |
| EP | 1276094 A | 1/2003 |
| EP | 1536407 A | 6/2005 |
| EP | 1564714 A | 8/2005 |
| EP | 1600935 A | 11/2005 |
| EP | 1600936 A | 11/2005 |
| EP | 1662474 A | 5/2006 |
| EP | 2175437 A | 4/2010 |
| EP | 2175438 A | 4/2010 |
| JP | 63-271497 A | 11/1988 |
| JP | 06-265846 A | 9/1994 |
| JP | 09-258169 A | 10/1997 |
| JP | 09-325715 A | 12/1997 |
| JP | 11-202285 A | 7/1999 |
| JP | 2000-200063 A | 7/2000 |
| JP | 2001-174818 A | 6/2001 |
| JP | 2001-235765 A | 8/2001 |
| JP | 2001-255519 A | 9/2001 |
| JP | 2001-265287 A | 9/2001 |
| JP | 2001-296841 A | 10/2001 |
| JP | 2002-049049 A | 2/2002 |
| JP | 2002-350810 A | 12/2002 |
| JP | 2003-022061 A | 1/2003 |
| JP | 2003-150080 A | 5/2003 |
| JP | 2003-307748 A | 10/2003 |
| JP | 2004-021069 A | 1/2004 |
| JP | 2004-253827 A | 9/2004 |
| JP | 2004-302270 A | 10/2004 |
| JP | 2004-317707 A | 11/2004 |
| JP | 2005-055897 A | 3/2005 |
| JP | 2005-148534 A | 6/2005 |
| JP | 2005-173573 A | 6/2005 |
| JP | 2005-234552 A | 9/2005 |
| JP | 2006-011405 A | 1/2006 |
| KR | 2004-0012222 A | 2/2004 |
| TW | 348250 | 12/1998 |
| TW | 569171 | 1/2004 |
| TW | 200525487 | 8/2005 |

(56) References Cited

FOREIGN PATENT DOCUMENTS

| WO | WO-2006/009106 | 1/2006 |
|---|---|---|
| WO | WO-2006/121188 | 11/2006 |

OTHER PUBLICATIONS

Kimura.N et al., "60.2: Invited Paper: New Technologies for Large-Sized High-Quality LCD TV", SID Digest '05 : SID International Symposium Digest of Technical Papers, May 24, 2005, vol. 36, pp. 1734-1737.

Hitachi Developed a New Panel Technology for a Moving-Image Display of a Liquid Crystal Television Set, http://techon.nikkeibp.co.jp/article/news/20060410/115928, Apr. 10, 2006.

'IPS Alpha Exhibits 32 Inch 180 Hz/Triple Speed Drive Panel—Victor Exhibits 120 Hz/47 Inch Full HD Liquid Crystal Panel. "Display 2007"', http://watch.impress.co.jp/av/docs/20070411/display2.htm, Apr. 11, 2007.

Ono.K et al., "69.5: Invited Paper: Progress of IPS-Pro Technology for LCD-TVs", SID Digest '06 : SID International Symposium Digest of Technical Papers, Jun. 6, 2006, vol. 37, pp. 1954-1957.

Mori.I et al., "Improvement of Motion Blur for IPS-Pro LCD-TVs Driven by 180HZ Impulsive Driving", IDW '07 : Proceedings of the 14th International Display Workshops, Dec. 5, 2007, vol. 1, pp. 79-82.

Chen.E et al., "Advanced Overdrive Method for Dynamic Impulsive Driving", IDW '07 : Proceedings of the 14th International Display Workshops, Dec. 5, 2007, vol. 3, pp. 1909-1912.

Chinese Office Action (Application No. 200710129221.9) dated Dec. 24, 2010.

Taiwanese Office Action (Application No. 96117647) dated Jun. 25, 2013.

Fortunato.E et al., "Fully Transparent ZnO Thin-Film Transistor Produced at Room Temperature", Adv. Mater. (Advanced Materials), Mar. 8, 2005, vol. 17, No. 5, pp. 590-594.

Korean Office Action (Application No. 2013-0086488) dated Oct. 23, 2013.

Taiwanese Office Action (Application No. 102134077) dated Mar. 24, 2015.

\* cited by examiner

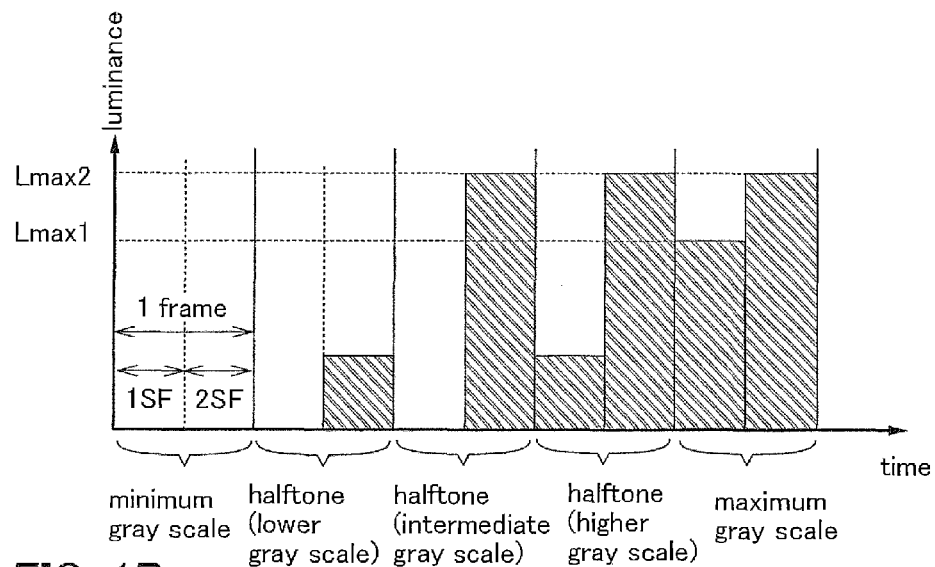
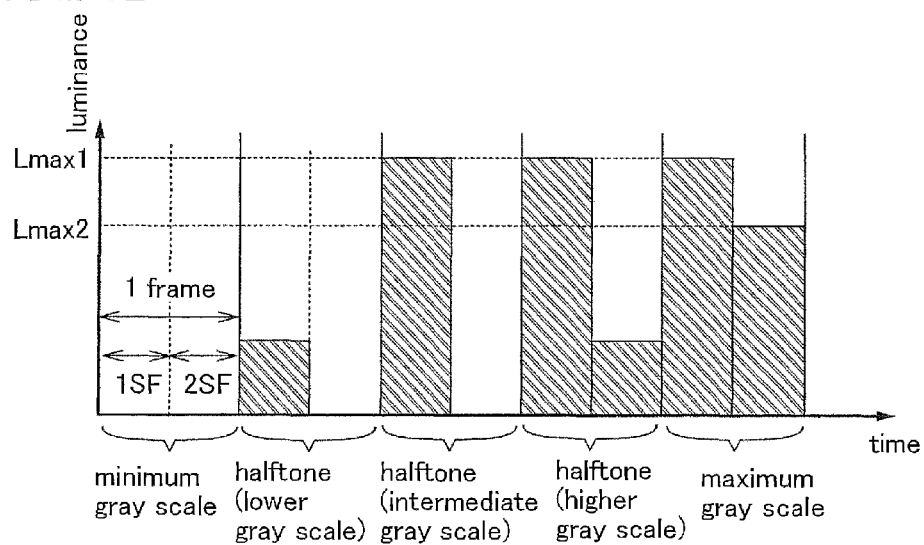

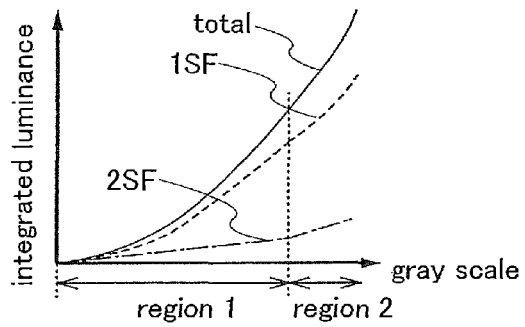
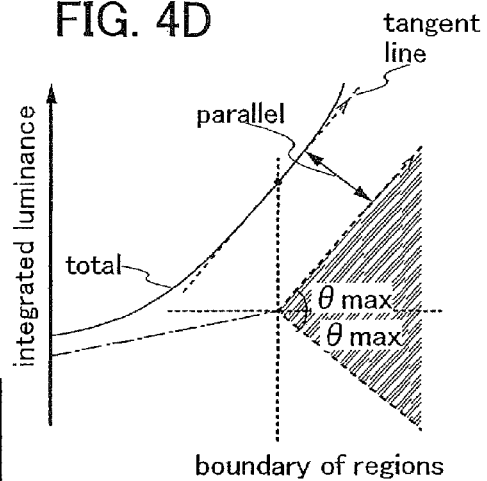
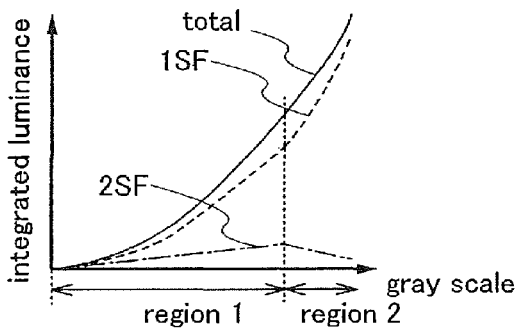
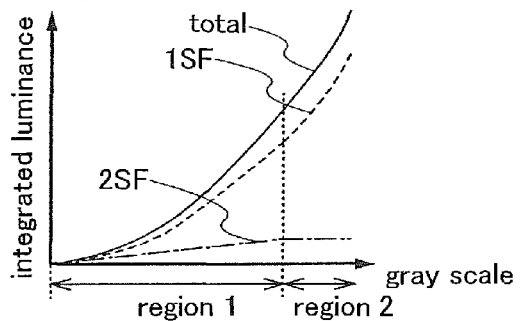
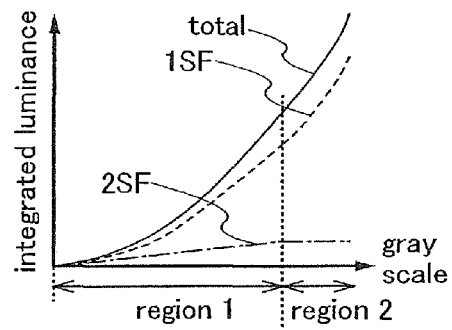
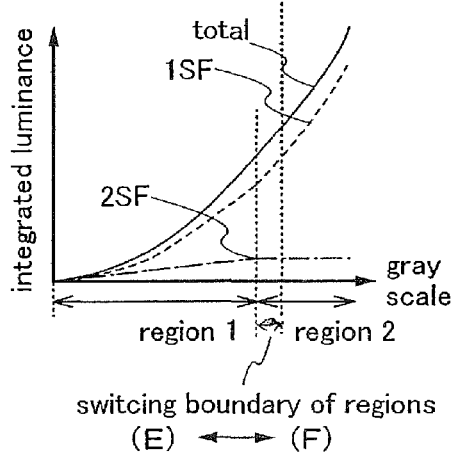

1801  1802  1803  1804
time 1811  1812  1813  1814  1815  1816
time 1821 1822 1823 1824 1825 1826 1827 1828
time

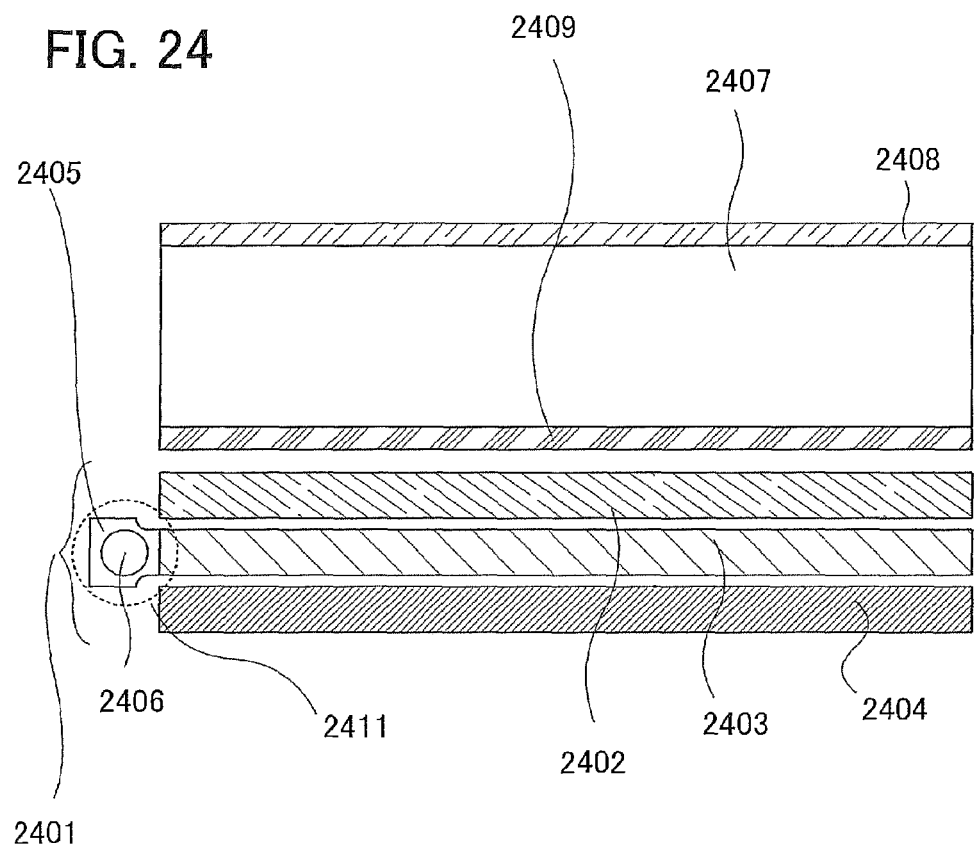

DISPLAY DEVICE AND DRIVING METHOD THEREOF

BACKGROUND OF THE INVENTION

1. Field of the Invention

The present invention relates to a device and a driving method thereof. Specifically, the present invention relates to a semiconductor device and a driving method thereof. More specifically, the present invention relates to a display device and a driving method thereof, particularly a method of improving the quality of moving images by hold driving.

2. Description of the Related Art

In recent years, there has been growing interests in thin display devices. As substitutes for CRT displays, liquid crystal displays, plasma displays, projection displays, and the like have been developed and becoming popular. Furthermore, field emission displays, inorganic electroluminescence displays, organic electroluminescence displays, electronic paper, and the like have been developed as next-generation display devices.

In a display portion which is provided in the above-described display device, pixels each of which is a minimum unit for constituting an image are juxtaposed. Each of the pixels emits light with certain luminance in accordance with the image data, whereby an image is formed in the display portion.

When a moving image is to be displayed with the use of such a display device, different images are displayed quickly, several tens of times per second. The period in which an image is displayed is referred to as one frame period.

Here, driving methods of display devices can be classified according to temporal distribution of the luminance of a pixel in one frame period. As for the hold driving which is typified by an active matrix display device, the luminance of a pixel is constant in one frame period. On the other hand, as for impulsive driving which is typified by CRT, after intense light is emitted once in one frame period, the luminance of a pixel immediately attenuates and light is not emitted any more. In impulsive driving, a non-lighting state dominates the most part of one frame period.

The recent research has made it clear that the hold driving has an essential problem in that contour becomes vague or movement looks unnatural when a moving image is displayed. An impulse-driven display device does not have this problem. In order to solve such a problem unique to the hold driving, a method for realizing pseudo impulsive driving, in which a black image that displays nothing is displayed for a certain period in one frame period, is disclosed (for example, Reference 1: Japanese Published Patent Application No. H9-325715 and Reference 2: Japanese Published Patent Application No. 2000-200063). In addition, as another method for realizing pseudo impulsive driving, Reference 3: SID'05 DIGEST, 60.2, pp 1734, (2005) is disclosed. This is a method in which one frame period is divided into two subframe periods, light is emitted only in a subframe that is located in the latter half of one frame in a low gray scale region, and light is emitted in a subframe that is located in the first half of one frame while light is emitted in a subframe located in the latter half of one frame in a high gray scale region, thereby realizing a pseudo impulsive driving.

SUMMARY OF THE INVENTION

A method for realizing pseudo impulsive driving by inserting a black image, which is disclosed in References 1 and 2, is effective for improving the quality of moving images; however, there is a problem in that average luminance is lowered by the insertion of black. In addition, in order to recover the lowered average luminance to the luminance before the insertion of the black image, instantaneous luminance of a pixel needs to be high, which leads to a problem in that power consumption and a load of when light is emitted are increased.

Furthermore, in a method disclosed by the Reference 3, the effect of improving the quality of moving images is small in the case where after a bright gray scale is displayed, a bright gray scale is displayed again. In particular, the effect of improving the quality of moving images that are displayed with luminance around the highest luminance can hardly be expected. This is because, in such a case, light is continuously emitted with high luminance and the driving becomes close to the hold driving.

In view of such problems, it is an object of the present invention to provide a display device in which problems such as an increase of power consumption and increase of a load of when light is emitted are reduced by using a method for realizing pseudo impulsive driving by inserting a black image, and a driving method thereof. In addition, it is another object of the present invention to provide a display device in which an effect of improving the quality of moving images is large even when a bright gray scale is displayed, and a driving method thereof.

One feature of a display device that solves the above problems is a display device which displays a gray scale by dividing one frame period into a plurality of subframe periods, wherein the one frame period is divided into at least a first subframe period and a second subframe period; and when luminance in the first subframe period to display the maximum gray scale is Lmax1 and luminance in the second subframe period to display the maximum gray scale is Lmax2, ($\frac{1}{2}$) Lmax2<Lmax1<($\frac{9}{10}$) Lmax2 is satisfied in one frame period.

A driving method of a display device that solves the above problems is a driving method of a display device that displays images by a plurality of display elements which are juxtaposed, wherein one frame period is divided into a first subframe period and a second subframe period; and when luminance in the first subframe period to display the maximum gray scale is Lmax1 and luminance in the second subframe period to display the maximum gray scale is Lmax2, ($\frac{1}{2}$) Lmax2<Lmax1<($\frac{9}{10}$) Lmax2 is satisfied. With such a feature, a driving method of a liquid crystal display device or semiconductor device, in which the hold time can be shortened and a load of when light is emitted is small, can be obtained, whereby the above problems can be solved.

Furthermore, a driving method of a display device that solves the above problems is a driving method of a display device that displays images by a plurality of display elements which are juxtaposed, wherein one frame period is divided into a first subframe period and a second subframe period; and when luminance in the first subframe period to display the maximum gray scale is Lmax1 and luminance in the second subframe period to display the maximum gray scale is Lmax2, ($\frac{1}{2}$) Lmax1<Lmax2<($\frac{9}{10}$) Lmax1 is satisfied. With such a feature, a driving method of a liquid crystal display device or semiconductor device, in which the hold time can be shortened and a load of when light is emitted is small, can be obtained, whereby the above problems can be solved.

Furthermore, a driving method of a display device that solves the above problems is a driving method of a display device that displays images by a plurality of display elements which are juxtaposed, wherein one frame period is divided into a first subframe period and a second subframe period, gray scales which can be displayed include gray scale regions divided into n (n is an integer number greater than 1) regions, and each of the n gray scale regions has a characteristic of, in one of the first subframe period or the second subframe period, a gray scale region where luminance change with respect to gray scale change is constant or a gray scale region where a ratio between luminance in the first subframe period and luminance in the second subframe period is constant with respect to gray scale. With such a feature, a driving method of a liquid crystal display device or semiconductor device, in which the hold time can be shortened and a load of when light is emitted is small, can be obtained, whereby the above problems can be solved.

Furthermore, a driving method of a display device that solves the above problems is a driving method of the above display device, where one frame period is divided into a first subframe period, a second subframe period, and a third subframe period; and when the maximum luminance in the third subframe period is Lmax3, Lmax3 is less than or equal to 1/10 of the maximum luminance of the first subframe period and the maximum luminance of the second subframe period. With such a feature, a driving method of a liquid crystal display device or semiconductor device, in which the hold time can be shortened and a load of when light is emitted is small, can be obtained, whereby the above problems can be solved.

It is to be noted that a switch shown in the present invention can have various modes, and an electrical switch, a mechanical switch, or the like can be used. That is, any element can be used as long as it can control a current flow; thus, a switch is not limited to a certain element, and various elements can be used. For example, it may be a transistor, a diode (for example, a PN diode, a PIN diode, a Schottky diode, a diode-connected transistor, or the like), or a logic circuit combining such elements. Therefore, in a case where a transistor is employed as a switch, the polarity (conductivity type) of the transistor is not particularly limited since it operates just as a switch. However, when an off-state current is preferred to be low, a transistor of the polarity with low off-state current is preferably employed. A transistor provided with an LDD region, a transistor with a multi-gate structure, or the like is given as an example of a transistor with low off-state current. In addition, it is preferable that an n-channel transistor be employed when a potential of a source terminal of the transistor which is operated as a switch is closer to a low-potential-side power source (such as Vss, GND, or 0 V), while a p-channel transistor be employed when the potential of the source terminal is closer to a high-potential-side power source (such as Vdd). This is because the absolute value of a gate-source voltage can be increased, and the transistor can easily function as a switch. It is to be noted that a CMOS switch may also be employed by using both n-channel and p-channel transistors. When a CMOS switch is used, even in the case where a condition changes such that a voltage output through the switch (that is, an input voltage to the switch) is high or low with respect to an output voltage, the switch can operate appropriately.

It is to be noted that description 'being connected' includes a case where elements are electrically connected, a case where elements are functionally connected, and a case where elements are directly connected. Accordingly, another element may be provided in addition to predetermined connected elements. For example, one or more elements which enable an electrical connection (for example, a switch, a transistor, a capacitor, an inductor, a resistor, a diode, or the like) may be interposed between one portion and another portion. Alternatively, one or more circuits which enable a functional connection (such as a logic circuit (an inverter, a NAND circuit, a NOR circuit, or the like), a signal converter circuit (a D/A converter circuit, an A/D converter circuit, a gamma-correction circuit, or the like), a potential-level converter circuit (a power supply circuit such as a step-up circuit or a step-down circuit, a level shifter circuit which changes a potential level such as an H signal or an L signal, or the like), a voltage source, a current source, a switching circuit, an amplifier circuit (a circuit which can increase signal amplitude, the current amount, or the like, such as an operational amplifier, a differential amplification circuit, a source follower circuit, or a buffer circuit), a signal generating circuit, a memory circuit, a control circuit, and the like) may be provided between one portion and another portion. Alternatively, the above circuits or elements may be directly connected without another element or circuit interposed therebetween. In the case where elements are connected without another element or circuit interposed therebetween, description 'being directly connected' is employed. It is to be noted that description 'being electrically connected' includes the case where elements are electrically connected (that is, the case where elements are connected with another element interposed therebetween), the case where elements are functionally connected (that is, the case where circuits are connected with another element interposed therebetween), and the case where elements are directly connected (that is, the case where elements are connected without another element or circuit interposed therebetween).

It is to be noted that a display element, a display device, a light emitting element, or a light emitting device can employ various modes or can include various elements. For example, as a display element, a display device, a light emitting element, or a light emitting device, a display medium whose contrast varies by an electromagnetic action can be used, such as an EL element (an organic EL element, an inorganic EL element, or an EL element containing organic and inorganic substances), an electron-emitting element, a liquid crystal element, electronic ink, a grating light valve (GLV), a plasma display panel (PDP), a digital micromirror device (DMD), a piezoceramic display, or a carbon nanotube. It is to be noted that a display device using an EL element includes an EL display; a display device using an electron-emitting element includes a field emission display (FED), an SED flat panel display (SED: Surface-conduction Electron-emitter Display), and the like; a display device using a liquid crystal element includes a liquid crystal display, a transmission liquid crystal display, a semi-transmission liquid crystal display, and a reflective liquid crystal display; and a display device using electronic ink includes electronic paper.

It is to be noted that various types of transistors can be employed, and an applicable type of the transistor is not limited. Accordingly, for example, a thin film transistor (TFT) using a non-single crystal semiconductor film typified by amorphous silicon or polycrystalline silicon may be employed. Such a transistor can be manufactured at a manufacturing temperature that is not high, at low costs, and over a large substrate or a substrate having a light-transmitting property, or the transistor can transmit light. In addition, a transistor formed using a semiconductor substrate or an SOI substrate, a MOS transistor, a junction transistor, a bipolar transistor, and the like can be employed. By these transistors, a transistor having less variation, a transistor capable of supplying current effectively, or a transistor which is small in size can be manufactured, and a circuit with less power consumption can be formed. In addition, a transistor using a compound semiconductor such as ZnO, a-InGaZnO, SiGe, or GaAs, or a thin film transistor which is obtained by thinning the compound semiconductor, and the like can be employed. These transistors can be manufactured at a manufacturing temperature that is not high or a room temperature, or directly over a substrate with low heat resistance such as a plastic substrate or a film substrate. In addition, a transistor formed by an ink jet method, a printing method, or the like can be employed. These transistors can be manufactured at a room temperature, in a low-vacuum state, or over a large substrate. Further, since the transistor can be manufactured without using a mask (reticle), layout of the transistor can be easily changed. In addition, a transistor using an organic semiconductor or a carbon nanotube, or other transistors can also be employed. These transistors can be formed over a bendable substrate. It is to be noted that the non-single crystal semiconductor film may contain hydrogen or halogen. In addition, a substrate over which a transistor is provided can be various types and is not particularly limited. Therefore, for example, the transistor can be formed using a single crystalline substrate, an SOI substrate, a glass substrate, a quartz substrate, a plastic substrate, a paper substrate, a cellophane substrate, a stone substrate, a stainless steel substrate, a substrate including stainless steel foil, or the like. In addition, after a transistor is formed over one substrate, the transistor may be transposed to another substrate to be located thereover. By these substrates, a transistor with favorable characteristics or low power consumption can be formed, or a device that is not easily defected or has heat resistance can be obtained.

A transistor can have various structures without limitation to a certain structure. For example, a multi-gate structure having two or more gate electrodes may be used. By the multi-gate structure, channel regions are connected in series; therefore, a plurality of transistors are connected in series. By the multi-gate structure, off-state current can be reduced, and the withstand voltage of the transistor can be increased, whereby reliability is improved. In addition, even if a drain-source voltage fluctuates when the transistor operates in a saturation region, drain-source current does not fluctuate very much, and flat characteristics can be provided. In addition, a structure in which gate electrodes are formed above and below a channel may be used. With the use of the structure in which gate electrodes are formed above and below the channel, a channel region is enlarged so that the amount of current flowing therethrough is increased, or a depletion layer can be easily formed so that the S value is decreased. Further, when the gate electrodes are provided above and below the channel, a plurality of transistors are connected in parallel. In addition, a structure in which a gate electrode is formed over a channel, a structure in which a gate electrode is formed below a channel, a staggered structure, an inverse staggered structure, a structure in which a channel region is divided into a plurality of regions and the divided regions are connected in parallel or in series may be employed. A source electrode or a drain electrode may overlap with a channel (or a part thereof). With the structure in which the source electrode or the drain electrode overlaps with the channel (or part thereof), electric charge can be prevented from being accumulated in part of the channel, and an unstable operation can be prevented. In addition, an LDD region may be provided. With the LDD region, off-state current can be reduced, and the withstand voltage of the transistor can be increased, whereby reliability is improved. In addition, even if a drain-source voltage fluctuates when the transistor operates in a saturation region, drain-source current does not fluctuate very much, and flat characteristics can be provided.

It is to be noted that various types of transistors can be used and can be formed over any substrate. Therefore, all the circuits may be formed using a glass substrate, a plastic substrate, a single crystalline substrate, an SOI substrate, or any other substrates. When all the circuits are formed over the same substrate, the costs can be reduced since the number of parts is reduced, and reliability can be improved since the number of connection points with parts in the circuits is reduced. Alternatively, it is possible that some circuits are formed over one substrate and some other circuits are formed over another substrate. That is, all of the circuits are not necessarily formed over the same substrate. For example, some circuits are formed over a glass substrate by using a transistor while some other circuits are formed on a single crystalline substrate, and an IC chip may be provided over the glass substrate by a COG (Chip On Glass) method. Alternatively, the IC chip may be connected to the glass substrate by a TAB (Tape Automated Bonding) method or by using a printed board. In this manner, when some circuits are formed over the same substrate, the costs can be reduced since the number of parts is reduced, and reliability can be improved since the number of connection points with parts in the circuits is reduced. Further, when portions with high drive voltage or high drive frequency, which consume more power, are not formed over the same substrate as the above circuits, increase in power consumption can be prevented.

It is to be noted that one pixel corresponds to one component that can control luminance. Accordingly, for example, one pixel corresponds to one color component and expresses luminance by the one color component. Therefore, in the case of a color display device with color components of R (red), G (green), and B (blue), the smallest unit of the image is constituted by three pixels including an R pixel, a G pixel, and a B pixel. It is to be noted that the color components are not limited to the three colors. The bigger number of colors may be used, or colors other than RGB may be used. For example, white may be added so that RGBW (W means white) are used. Alternatively, one or more of yellow, cyan, magenta, emerald green, cinnabar red, and the like may be added to RGB. Alternatively, a color which is close to at least one of RGB may be added. For example, R, G, B1, and B2 may be used. B1 and B2 are both blue, but their frequencies are a little different from each other. With the use of such color components, display that is closer to the original can be realized, or power consumption can be reduced. As another example, in the case where a plurality of regions are used for controlling luminance of one color component, the one region corresponds to one pixel. Accordingly, when area gray scale in which a plurality of regions for controlling luminance are provided for each color component and gray scale is expressed by the all regions is performed, for example, one region for controlling the luminance corresponds to one pixel. Therefore, in this case, one color component is constituted by a plurality of pixels. In addition, in this case, sometimes the size of a region contributing to display differs depending on the pixels. Furthermore, in the regions for controlling the luminance, plurality of which are provided for each color component, in other words, in a plurality of pixels that constitute one color component, signals to be supplied to each pixel may be slightly different from each other so that the view angle is widened. It is to be noted that, the description "one pixel (for three colors)" means that three pixels for R, G, and B are considered to be one pixel. When a plurality of pixels are provided for one color component, the description "one pixel (for one color)" means that the plurality of pixels that are provided for one color component as a whole are considered to be one pixel.

It is to be noted that pixels may be arranged (aligned) in a matrix. Here, description "pixels are arranged (aligned) in a matrix" includes a case where pixels are arranged so as to form a line and a case where pixels are arranged so as to form a jagged line, in a longitudinal direction or transverse direction. Accordingly, for example, when full-color display is performed with three color components (RGB, for example), a case where pixels are arranged in stripes and a case where dots for three color components are arranged in a so-called delta pattern or in a Bayer pattern are included. The color components are not limited to three colors, and more colors can be used. For example, RGBW (W represents white), or RGB with one additional color such as yellow, cyan, or magenta, and the like may be used. Furthermore, the size of a display region may be different in each dot of a color component. Consequently, power consumption can be reduced and the life of a display element can be extended.

A transistor is an element including at least three terminals, a gate, a drain, and a source. A channel region is provided between a drain region and a source region, and a current can flow through the drain region, the channel region, and the source region. Here, it is difficult to determine which of two terminals is a source or a drain since a source and a drain are switched depending on a structure, operating condition, and the like of the transistor. Therefore, regions which function as a source and a drain are not referred to as a source and a drain in some cases, and referred to as a first terminal and a second terminal. It is to be noted that a transistor may also be an element including at least three terminals, a base, an emitter, and a collector. Also in this case, an emitter and a collector may be referred to as a first terminal and a second terminal.

It is to be noted that a gate includes a gate electrode and a gate wiring (also referred to as a gate line, a gate signal line, or the like) or part thereof. A gate electrode corresponds to a portion of a conductive film, which overlaps with a semiconductor forming a channel region, an LDD (Lightly Doped Drain) region, and the like, with a gate insulating film interposed therebetween. A gate wiring corresponds to a wiring for connecting gate electrodes of pixels and connecting a gate electrode and another wiring.

It is to be noted that there is also a portion which functions as a gate electrode and also as a gate wiring. Such a region may be referred to as a gate electrode or a gate wiring. That is, there is a region which cannot be clearly distinguished as a gate electrode or a gate wiring. For example, in a case where a channel region overlaps with a gate wiring which is extended, the overlapped region functions as a gate wiring and also as a gate electrode. Therefore, such a region may be referred to as a gate electrode or a gate wiring.

Further, a region which is formed of the same material as that of a gate electrode and connected to the gate electrode may be referred to as a gate electrode as well. Similarly, a region which is formed of the same material as that of a gate wiring and connected to the gate wiring may be referred to as a gate wiring. In a strict sense, such a region does not overlap with a channel region or does not have a function to connect to another gate electrode in some cases. However, due to a condition of the manufacturing process of the like, there is a region which is formed of the same material as that of a gate electrode or a gate wiring and connected to the gate electrode or the gate wiring. Therefore, such a region may also be referred to as a gate electrode or a gate wiring.

For example, in a multi-gate transistor, gate electrodes of one transistor and another transistor are often connected through a conductive film formed of the same material as that of the gate electrode. Such a region is a region for connecting the gate electrodes and may be referred to as a gate wiring, but since a multi-gate transistor can be considered as one transistor, such a region may also be referred to as a gate electrode. That is, a component which is formed of the same material as that of a gate electrode or a gate wiring and connected to the gate electrode or the gate wiring may be referred to as a gate electrode or a gate wiring. Moreover, for example, a conductive film in a portion which connects a gate electrode and a gate wiring may also be referred to as a gate electrode or a gate wiring.

It is to be noted that a gate terminal corresponds to part of a region of a gate electrode or a region electrically connected to the gate electrode.

It is to be noted that a source includes a source region, a source electrode, and a source wiring (also referred to as a source line, a source signal line, or the like) or part thereof. A source region corresponds to a semiconductor region which contains a large amount of p-type impurities (boron, gallium, or the like) or n-type impurities (phosphorus, arsenic, or the like). Therefore, a region containing a small amount of p-type impurities or n-type impurities, that is, a so-called LDD (Lightly Doped Drain) region is not included in a source region. A source electrode corresponds to a conductive layer in a portion which is formed of a material different from that of a source region and electrically connected to the source region. It is to be noted that a source electrode including a source region may be referred to as a source electrode. A source wiring corresponds to a wiring for connecting source electrodes of pixels or connecting a source electrode and another wiring.

However, there is a portion which functions as a source electrode and also as a source wiring. Such a region may be referred to as a source electrode or a source wiring. That is, there is a region which cannot be clearly distinguished as a source electrode or a source wiring. For example, in a case where a source region overlaps with a source wiring which is extended, the overlapped region functions as a source wiring and also as a source electrode. Therefore, such a region may be referred to as a source electrode or a source wiring.

Further, a region which is formed of the same material as that of a source electrode and connected to the source electrode; or a portion which connects one source electrode and another source electrode may also be referred to as a source electrode. Further, a portion which overlaps with a source region may be referred to as a source electrode. Similarly, a region which is formed of the same material as that of a source wiring and connected to the source wiring may be referred to as a source wiring. In a strict sense, there is a case where such a region does not have a function to connect one source electrode to another source electrode. However, due to a condition of the manufacturing process or the like, there is a region which is formed of the same material as that of a source electrode or a source wiring and connected to the source electrode or the source wiring. Therefore, such a region may also be referred to as a source electrode or a source wiring.

For example, a conductive film in a portion which connects a source electrode and a source wiring may be referred to as a source electrode or a source wiring.

It is to be noted that a source terminal corresponds to part of a source region, a source electrode, or a region electrically connected to a source electrode.

It is to be noted that the same thing as that of a source can be applied to a drain.

It is to be noted that a semiconductor device corresponds to a device including a circuit having a semiconductor element (a transistor, a diode, or the like). Further, a semiconductor device may generally correspond to a device which functions by utilizing semiconductor characteristics. A display device corresponds to a device including a display element (such as a liquid crystal element or a light emitting element). It is to be noted that a display device may correspond to a display panel itself in which a plurality of pixels including display elements such as a liquid crystal element and a peripheral driver circuit for driving the pixels are formed over the same substrate. Moreover, a display device may include a peripheral driver circuit provided over a substrate by wire bonding or a bump, that is, a so-called COG (Chip On Glass), and further, a device provided with a flexible printed circuit (FPC) or a printed wiring board (PWB) (such as an IC, a resistor, a capacitor, an inductor, or a transistor). Further, a display device may include an optical sheet such as a polarizing plate or a wave plate. Further, it may include a backlight unit (which may include a light guide plate, a prism sheet, a diffusion sheet, a reflective sheet, and a light source (e.g., an LED or a cold-cathode tube)). Furthermore, a light emitting device is a display device including a self-luminous display element such as an element used for an EL element or FED. A liquid crystal display device is a display device including a liquid crystal element.

An expression that an object is formed on or formed over a different object does not necessarily mean that the object is in direct contact with the different object. The expression may include a case where two objects are not in direct contact with each other, that is, a case where another object is interposed therebetween. Accordingly, for example, when it is described that a layer B is formed on (or over) a layer A, it means either case where the layer B is formed on and in direct contact with the layer A, or where another layer (for example, a layer C or a layer D) is formed on and in direct contact with the layer A and the layer B is formed on and in direct contact with the layer C or D. In addition, when it is described that an object is formed above a different object, it does not necessarily mean that the object is in direct contact with the different object, and another object may be interposed therebetween. Accordingly, for example, when it is described that a layer B is formed above a layer A, it means either case where the layer B is formed on and in direct contact with the layer A, or where another layer (for example, a layer C or a layer D) is formed in direct contact with the layer A and the layer B is formed on and in direct contact with the layer C or D. Similarly, when it is described that an object is formed below or formed under a different object, it means either case where the objects are in direct contact with each other or not in contact with each other.

A problem in that average luminance is lowered by black insertion that is performed for improving the quality of moving images can be solved; therefore, power consumption and a load of when light is emitted can be reduced.

In addition, in the case where after a bright gray scale is displayed, a bright gray scale is displayed again, an effect of improving the quality of moving images can be increased. In particular, the quality of moving images which are displayed with the luminance close to the maximum luminance can be improved.

BRIEF DESCRIPTION OF THE DRAWINGS

In the accompanying drawings:

FIGS. 1A and 1B are graphs used for describing a mode of the present invention;

FIGS. 4A to 4F are graphs used for describing a mode of the present invention;

FIG. 24 is a view used for describing a structure of a display device of the present invention;

DETAILED DESCRIPTION OF THE INVENTION

Figure 2A:
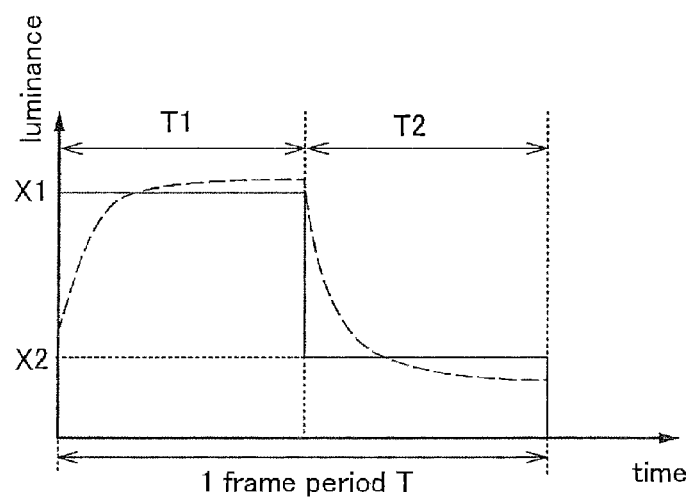
FIGS. 2A and 2B are graphs used for describing terms that are used in describing the present invention.

Embodiment Modes of the present invention will be explained below with reference to the accompanied drawings. However, the present invention can be carried out in various modes, and it is to be easily understood by those skilled in the art that the modes and details can be changed in various ways without departing from the spirit and scope of the present invention. Therefore, the present invention should not be interpreted as being limited to the description of the embodiment modes.

Embodiment Mode 1

In this embodiment mode, a method for improving the quality of moving images by dividing one frame into two or more subframes and using some of the two or more subframes mainly for image display (light image) and the others mainly for reducing residual images of moving images (dark image) will be described.

Here, difference between a black image and a dark image will be described. The black image is an image where all the pixels for forming an image are in a non-lighting state or non-transmitting state, and is just an inky black image. On the other hand, the dark image is an image that is formed when a major part of pixels for forming an image is pixels which emit light with relatively low luminance. In other words, the dark image is an image where the total light emission amount of all the pixels for forming an image is smaller than the light image counterpart. In accordance with this definition, there can be a case where the black image is used as the dark image.

Next, integrated luminance will be described. Generally, an image that is formed as a collection of pixels that are juxtaposed on a display device is not always perceived by human as it is.

First, when the size of pixels is very small, even if the pixels are dispersedly placed, human eyes cannot distinguish them from ones spatially close to each other. For example, when pixels close to each other have different light emission colors, the difference of the light emission colors is not perceived and the different colors are perceived as a mixed color from the pixels close to each other. This characteristic is referred to as juxtapositional color mixture, and it enables color image display. Furthermore, when pixels that are close to each other have different luminance, an intermediate value of the luminance of the pixels close to each other is perceived. As techniques of expressing intermediate luminance by utilizing this characteristic, there are gray scale interpolation techniques such as dither diffusion and error diffusion. In addition, an area gray scale method which expresses a gray scale according to an area of a light emitting region is also included.

Secondly, when time for which pixels emit light is very short and the pixels emit light a plurality of times temporally-dispersedly, human eyes cannot distinguish difference of luminance temporally close to each other. For example, in the case where light emission with high luminance and light emission with low luminance are performed consecutively, human eyes perceive that the pixel emits light with the intermediate luminance. A technique which utilizes this characteristic to express the intermediate luminance is referred to as a time gray scale method. Furthermore, when light emissions with different colors are performed temporally close to each other, the light emission color of the pixels which emit light temporally close to each other is perceived as a mixed color. As a technique of displaying color images by utilizing this characteristic, there is a field sequential method.

Here, the phenomenon in which human eyes cannot distinguish the difference of luminance temporally close to each other when light is emitted a plurality of times temporally-dispersedly is related to time-frequency characteristic of human eyes. Human eyes do not perceive luminance that changes at a higher frequency than a certain critical value as changing, and see it as continuously emits light with a constant luminance. At this time, the luminance which is perceived by the human eyes depends on the value obtained by integrating the luminance by time (integrated luminance).

On the other hand, when luminance that changes at a frequency that is lower than or equal to the certain critical value, human eyes perceive the change in luminance as it is as flickering. The critical value depends on luminance, and it is about several tens of Hz (the period is ten to several tens of msec). In other words, integrated luminance is a value obtained by integrating luminance by time in a time range up to several tens of msec in which luminance change is not perceived by human eyes.

Next, with reference to FIGS. 2A and 2B, the way in which integrated luminance is expressed by formulation when one frame is divided into a plurality of subframes will be described. A solid line in FIG. 2A shows an example of time change of luminance of one pixel in one frame, in the case where the one frame is divided into two subframes, for example.

In FIG. 2A, the length of one frame period is T, the length of a first subframe is T1, the length of a second subframe is T2, the average luminance of a pixel in the first subframe period is X1, and the average luminance of a pixel in the second subframe period is X2. Then, integrated luminance in the first subframe period is the product of T1 and X1. Similarly, integrated luminance in the second subframe period is the product of T2 and X2.

It is to be noted that there is a case where time change of luminance is not like the solid line in FIG. 2A, due to characteristics of the device that is actually used as a display device. For example, in the case of a display device using liquid crystal, the luminance changes gently as shown by a dashed line in FIG. 2A. In such a case, the integrated luminance is precisely defined by obtaining time integration of luminance; however, in this embodiment mode, the integrated luminance is to be defined by the product of the average luminance and the subframe period, for simplicity. In this way, the luminance in each subframe period need not necessarily be constant.

Figure 2B:
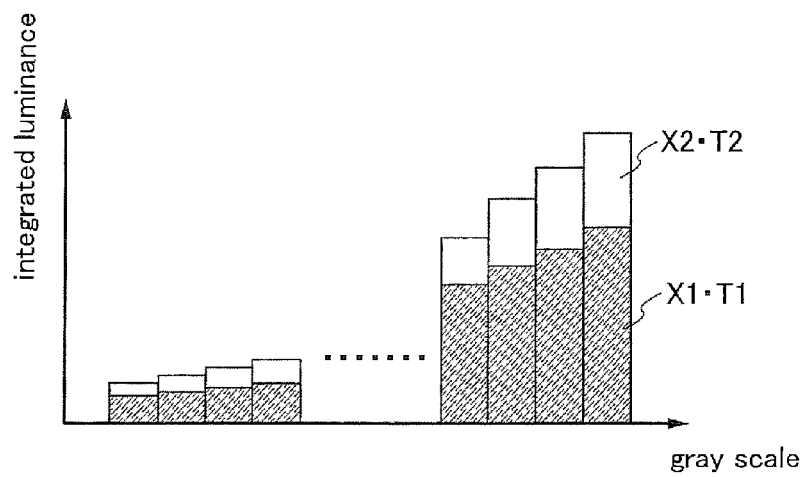

FIG. 2B shows an example of distribution of integrated luminance in one frame period with respect to gray scales to be displayed. The horizontal axis shows the gray scale and the vertical axis shows the integrated luminance in one frame period. In FIG. 2B, a case where the gray scale 0 to the gray scale 255 are displayed is shown. It is to be noted that the display of the gray scale 5 to the gray scale 251 is omitted. In each gray scale, a shaded portion shows the integrated luminance in the first subframe period, and a white portion shows the integrated luminance in the second subframe period.

In this manner, integrated luminance in one frame period can be expressed as the sum of the integrated luminance in the first subframe period and the integrated luminance in the second subframe period. And the distribution of the integrated luminance can be set individually depending on the gray scale to be displayed.

Here, the number of subframe periods into which one frame period is divided may be an integer which is greater than or equal to 2. When formulated, this can be expressed as below. That is, one frame period is divided into n (n is an integer greater than or equal to 2) subframe periods; when average luminance of the display element in the i-th (i is an integer greater than or equal to 1 and less than or equal to n) subframe period is Xi and the length of the i-th subframe period is Ti, integrated luminance Y that is obtained by time-integrating a function X(t) of luminance related to time by the one frame period can be expressed as a mathematical expression 1.

$$Y = \sum_{i=1}^{n} X_i T_i \qquad \text{[Mathematical Expression 1]}$$

It is desirable that the length Ti of the i-th subframe period be roughly equal in every subframe period. This is because a period in which image data is written in a pixel (an address period) can be longest when the length of every subframe period is equal to each other. When the address period is long, an operating frequency of a peripheral driving circuit of the display device can be slow; therefore, the power consumption can be reduced. In addition, a yield of the display device is improved. However, the present invention is not limited to this, and Ti may be different according to each subframe period. For example, when the length of a subframe period for displaying a light image is longer, average luminance of a backlight unit can be increased without increasing power consumption. In addition, power consumption can be reduced without changing average luminance of the backlight unit. In other words, luminous efficiency can be improved. Furthermore, when the length of a subframe period for displaying a dark image is longer, there is an advantage in that improvement of the quality of moving images is significant.

In this embodiment mode, the description is made for a case where the number n of divided subframes is 2 and the length of each subframe period is equal to each other. In addition, a subframe period which is located in the first half of one frame period is referred to as 1SF and a subframe period which is located in the latter half of one frame period is referred to as 2SF.

FIGS. 1A and 1B are graphs for showing how the luminance is distributed to two subframe periods, with respect to a gray scale to be displayed, in this embodiment mode. FIG. 1A shows a case where luminance in 2SF is higher than luminance in 1SF, and FIG. 1B shows a case where luminance in 1SF is higher than luminance in 2SF.

First, the description will be made with reference to FIG. 1A. In FIG. 1A, the horizontal axis shows time and the vertical solid lines show boundaries of frames. Further, the vertical dashed lines show boundaries of subframes. The vertical axis shows luminance. That is, FIG. 1A shows a change of the luminance of a pixel with respect to time over five frames in the case where the luminance rises with time.

Under the horizontal axis, the degree of gray scale in each frame is written. That is, in FIG. 1A, a change of the luminance of a pixel with respect to time in the case where a minimum gray scale is displayed first, and then, halftone on the lower gray scale side, halftone of an intermediate degree, halftone on the higher gray scale side, and a maximum gray scale are displayed in this order, is shown.

Although the quality of moving images is improved by inserting a black image, a feature of a driving method of a display device which is described in this embodiment mode is that the quality of moving images is improved by inserting a dark image which is close to black but not a black image. That is, one frame period is divided into two subframe periods 1SF and 2SF and light is emitted such that luminance of 1SF is lower than luminance of 2SF when a maximum gray scale is to be displayed, whereby improvement in quality of moving images is realized and luminance in one frame period is kept constant.

As for a method for expressing gray scales, first, in a range from the minimum gray scale to the halftone of the intermediate degree, the gray scales are expressed by high and low of the luminance in 2SF. Then, after the luminance in 2SF reaches the maximum value Lmax2, the luminance in 2SF is fixed to Lmax2 and the gray scales are expressed by high and low of the luminance in 1SF. Then, when the maximum gray scale is to be expressed, it is preferable in improving the quality of moving images that the luminance Lmax1 in 1SF be lower than Lmax2.

That is, by shortening time for which the luminance is maintained (hold time) even around the maximum gray scale, residual images are decreased in all the gray scale ranges; therefore, the quality of moving images can be made preferable. Furthermore, by displaying a dark image, not a black image, in 1SF when the maximum gray scale is displayed, luminance of Lmax1 can be lowered. Accordingly, power consumption can be reduced.

It is preferable that Lmax1 be 90% or less of Lmax2, more preferably 60% or less of Lmax2, in order to improve the quality of moving images. In addition, it is preferable that Lmax1 be 50% or more of Lmax2 in order to increase Lmax1 and suppress the maximum luminance in one frame so as to reduce power consumption. That is, when a dark image is inserted in 1SF, it is preferable that Lmax1 be in a range represented as follows: (½) Lmax2<Lmax1<(9/10) Lmax2, more preferably (½) Lmax2<Lmax1<(3/5) Lmax2.

It is desirable that the length of one frame period be less than or equal to 1/60 sec so that flickering does not easily occur. However, the shorter the length of one frame period is, the higher the operating frequency of a peripheral driving circuit becomes and the more power consumption increases.

Therefore, it is preferable that the length of one frame period be in a range of $\frac{1}{120}$ sec to $\frac{1}{60}$ sec.

Next, a case where the luminance in 1SF is higher than the luminance in luminance 2SF will be described with reference to FIG. 1B. In FIG. 1B, the horizontal axis shows time and the vertical solid lines show boundaries of frames. Further, the vertical dashed lines show boundaries of subframes. The vertical axis shows luminance. That is, FIG. 1B shows a change of the luminance of a pixel with respect to time over five frames. Although the luminance of 1SF is lower than that of 2SF in FIG. 1A, the present invention is not limited to this. That is, as shown in FIG. 1B, one frame period is divided into two subframe periods 1SF and 2SF, and light is emitted such that luminance of 2SF is lower than luminance of 1SF when a maximum gray scale is to be displayed, whereby improvement in quality of moving images can be realized. In this manner, it is possible to reverse the order of 1SF and 2SF.

It is to be noted that the driving method of a display device shown in FIGS. 1A and 1B may be carried out in combination with overdriving. Consequently, an effect of improving the quality of moving images can be sufficiently obtained even in the case where a display element such as a liquid crystal element in which a response speed to voltage change is slow is used.

Figure 13A:
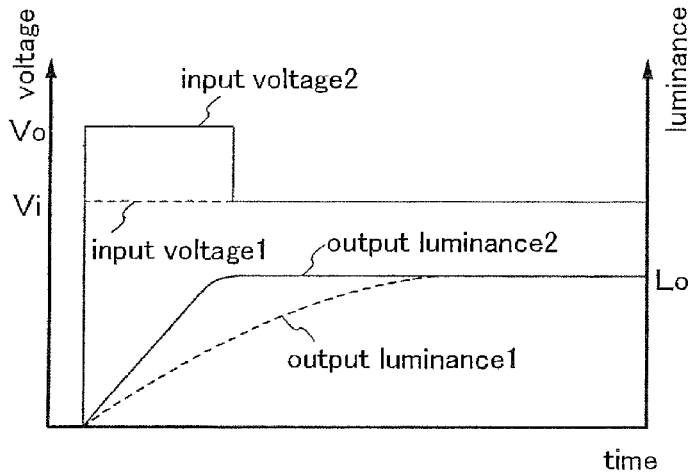
FIGS. 13A to 13C are diagrams used for describing a driving method of a display device of the present invention.
Figure 13B:
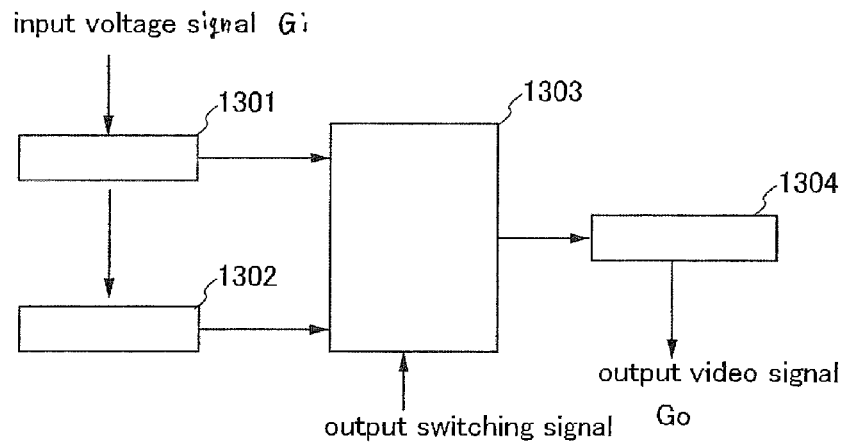
Figure 13C:
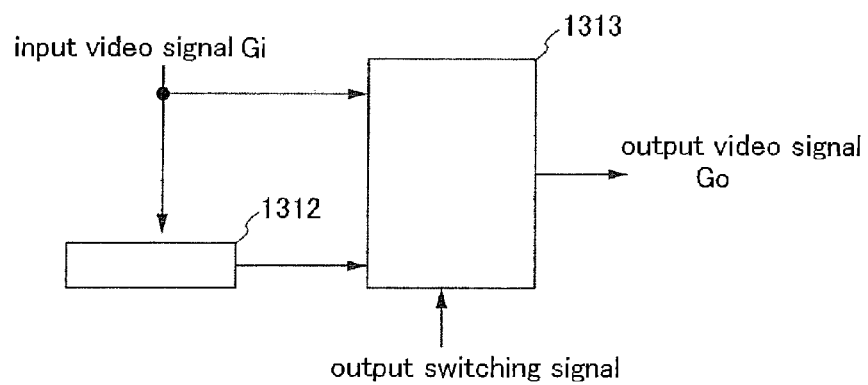

The overdriving will be described with reference to FIGS. 13A to 13C. FIG. 13A shows time change of output luminance with respect to an input voltage of a display element. The time change of the output luminance of the display element with respect to an input voltage 1 that is shown by a dashed line is output luminance 1 that is also shown by a dashed line. That is, although a voltage for obtaining an objective output luminance Lo is Vi, when Vi is simply input as an input voltage, it takes time corresponding to a response speed of the element before reaching the objective output luminance Lo.

The overdriving is a technique for increasing this response speed. Specifically, this is a method as follows: first, Vo that is a larger voltage than Vi is applied to the element for a certain time to increase the response speed of the output luminance and the luminance is made close to the objective output luminance Lo, and then, the input voltage is returned to Vi. The input voltage and the output luminance at this time are as shown by an input voltage 2 and an output luminance 2, respectively. As seen from the graph, the time which the output luminance 2 takes before reaching the objective luminance Lo is shorter than that of the output luminance 1.

It is to be noted that, although a case where the output luminance changes positively with respect to the input voltage is described with reference to FIG. 13A, it can be similarly applied to a case where the output luminance changes negatively with respect to the input voltage.

A circuit for realizing the above driving will be described with reference to FIGS. 13B and 13C. First, a case where an input video signal Gi is a signal of an analog value (it may be a discrete value) and an output video signal Go is also a signal of an analog value will be described. An overdrive circuit shown in FIG. 13B includes a coding circuit 1301, a frame memory 1302, a correction circuit 1303, and a D/A converter circuit 1304.

First, the input video signal Gi is input to the coding circuit 1301 and encoded. In other words, the input video signal Gi is converted from an analog signal to a digital signal with an appropriate bit number. After that, the converted digital signal is input to the frame memory 1302 and the correction circuit 1303 each. A video signal of the previous frame which has been hold in the frame memory 1302 is also input to the correction circuit 1303 at the same time. Then, in the correction circuit 1303, a video signal that is corrected according to a numeric value table that is prepared beforehand is output. A numeric value is selected from the numeric value table by using the video signal of the frame and the video signal of the previous frame. At this time, an output switching signal may be input to the correction circuit 1303 and the corrected video signal and the video signal of the frame may be switched to be output. Next, the corrected video signal or the video signal of the frame is input to the D/A converter circuit 1304. Further, the output video signal Go which is an analog signal of a value in accordance with the corrected video signal or the video signal of the frame is output. In this manner, the overdriving can be realized.

Next, a case where an input video signal Gi is a signal of a digital value and an output video signal Go is also a signal of a digital value will be described with reference to FIG. 13C. An overdrive circuit shown in FIG. 13C includes a frame memory 1312 and a correction circuit 1313.

The input video signal Gi is a digital signal, and first, input to the frame memory 1312 and the correction circuit 1313 each. A video signal of the previous frame which has been hold in the frame memory 1312 is also input to the correction circuit 1313 at the same time. Then, in the correction circuit 1313, a video signal that is corrected according to a numeric value table that is prepared beforehand is output. A numeric value is selected from the numeric value table by using the video signal of the frame and the video signal of the previous frame At this time, an output switching signal may be input to the correction circuit 1313 and the corrected video signal and the video signal of the frame may be switched to be output. In this manner, the overdriving can be realized.

It is to be noted that a combination of the numeric value table for obtaining a corrected video signal is the product of the number of gray scales which 1SF may take and the number of gray scales which 2SF may take. The smaller the number of this combination, the more preferable, since data amount to be stored in the correction circuit 1313 becomes small. In this embodiment mode, in halftone before the subframe displaying a light image reaches the maximum luminance, the luminance of a dark image is 0; and after the subframe displaying a light image reaches the maximum luminance and until the maximum gray scale is displayed, the luminance of a light image is constant; therefore, the number of this combination can be significantly small. Accordingly, when the driving method of a display device shown in FIGS. 1A and 1B is carried out in combination with the overdriving, a great effect can be obtained.

It is to be noted that the overdrive circuit includes a case where the input video signal Gi is an analog signal and the output video signal Go is a digital signal. In this case, the D/A converter circuit 1304 may be omitted from the circuit shown in FIG. 13B. In addition, the overdrive circuit includes a case where the input video signal Gi is a digital signal and the output video signal Go is an analog signal. In this case, the coding circuit 1301 may be omitted from the circuit shown in FIG. 13B. It is to be noted that the overdrive circuit is not limited to the one with a numeric value table as described above. For example, an overdrive circuit in which a video signal is corrected by using difference data of luminance between frames may be employed.

Figure 17A:
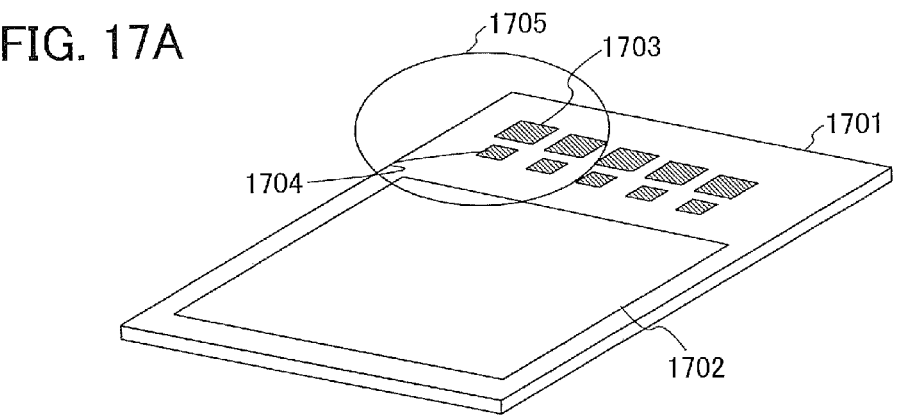
FIGS. 17A to 17D are views used for describing a method for mounting a circuit in a display device of the present invention.

Next, a method for mounting an overdrive circuit on a display panel will be described with reference to FIGS. 17A to 17D. FIG. 17A is a general view of the display panel. The display panel includes a substrate 1701, a display portion 1702, a peripheral driving circuit 1703, and an overdrive circuit 1704. It is to be noted that a plurality of peripheral driving circuits 1703 and a plurality of overdrive circuits 1704 may be provided around the display portion 1702. Here, a region surrounded by an ellipse 1705 will be described with reference to FIGS. 17B, 17C, and 17D.

Figure 17B:
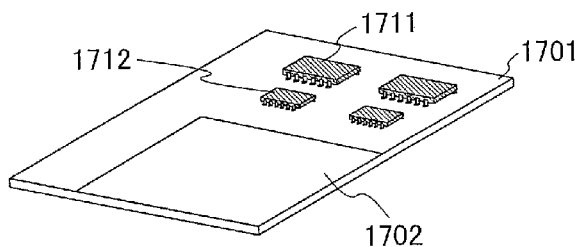

FIG. 17B is a view used for describing a case where an IC in which an overdrive circuit is formed is used. The display panel includes a substrate 1701, a display portion 1702, a peripheral driving circuit 1711, and an overdrive circuit 1712. In this manner, when the IC in which the overdrive circuit is formed is used, the peripheral driving circuit 1711 can use a general driver IC, so that the manufacturing costs can be reduced. In this case, it is desirable that each of an input video signal and an output video signal of the overdrive circuit 1712 be an analog value.

Figure 17C:
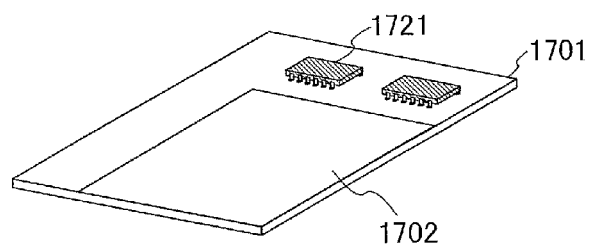

FIG. 17C is a view used for describing a case where an IC in which a peripheral driving circuit and an overdrive circuit are formed is used. The display panel includes a substrate 1701, a display portion 1702, and an IC 1721. In this manner, when the IC in which the peripheral driving circuit and the overdrive circuit are formed is used, the number of connection points can be reduced, so that the reliability of the display device can be improved. In addition, since the manufacturing process can be simplified, the manufacturing costs can be reduced. In this case, it is desirable that an output video signal of the overdrive circuit in the IC 1721 be an analog value.

Figure 17D:
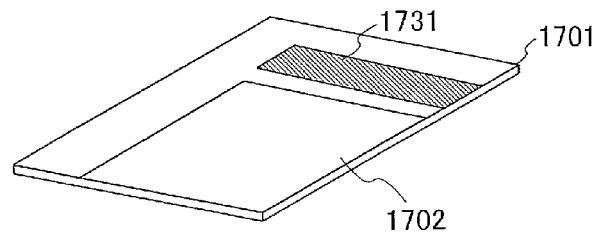

FIG. 17D is a view used for describing a case where a circuit in which a peripheral driving circuit and an overdrive circuit are formed using thin film transistors (TFT) is used. The display panel includes a substrate 1701, a display portion 1702, and a circuit 1731. In this manner, when the circuit in which the peripheral driving circuit and the overdrive circuit are formed is used, the number of connection points can be drastically reduced, so that the reliability of the display device can be significantly improved. In addition, since the manufacturing process can be simplified, the manufacturing costs can be reduced. In this case, an output video signal of the overdrive circuit in the circuit 1731 may be an analog value or a digital value.

It is to be noted that the driving method of a display device shown in FIGS. 1A and 1B may be carried out for a liquid crystal display device combined with a scanning backlight. Consequently, average luminance of the backlight can be lowered, and power consumption can be reduced.

Figure 15A:
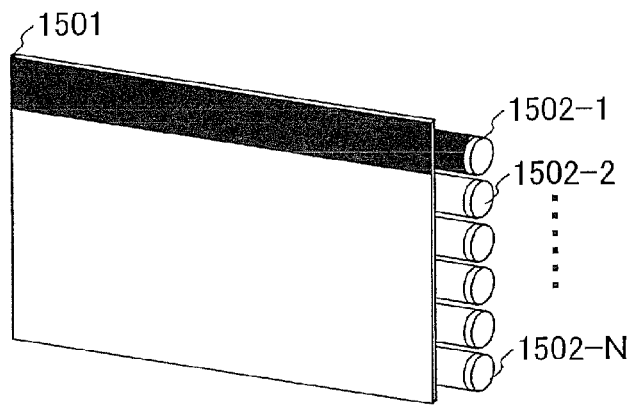
FIGS. 15A to 15C are diagrams used for describing a driving method of a display device of the present invention.
Figure 15B:
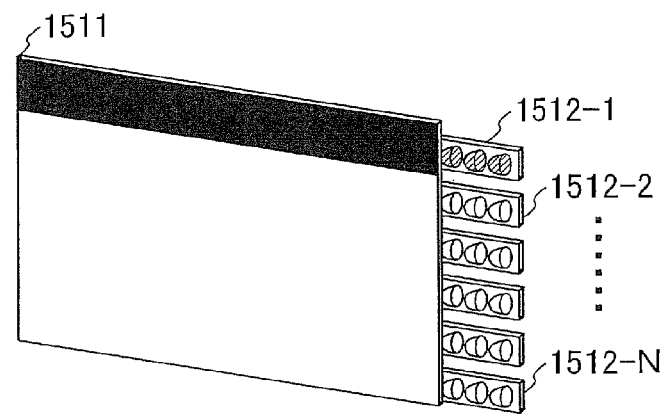
Figure 15C:
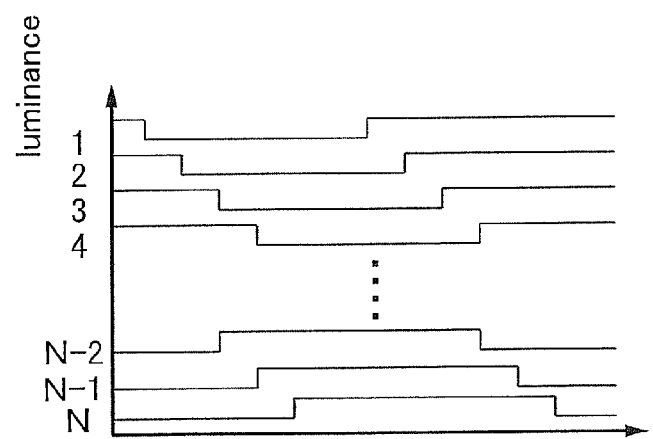

The scanning backlight will be described with reference to FIGS. 15A to 15C. FIG. 15A is a view showing a scanning backlight in which cold-cathode tubes are juxtaposed. The scanning backlight shown in FIG. 15A includes a diffuser plate 1501 and N pieces of cold-cathode tubes 1502-1 to 1502-N. When the N pieces of cold-cathode tubes 1502-1 to 1502-N are juxtaposed behind the diffuser plate 1501, the N pieces of cold-cathode tubes 1502-1 to 1502-N can be scanned while changing the luminance.

A change in luminance of each cold-cathode tube when scanning will be described with reference to FIG. 15C. First, the luminance of the cold-cathode tube 1502-1 is changed for a certain amount of time. In FIG. 15C, the luminance is made low for a certain period. After that, the luminance of the cold-cathode tube 1502-2 that is placed next to the cold-cathode tube 1502-1 is changed for the same amount of time. In this manner, the luminance of the cold-cathode tubes 1502-1 to 1502-N is changed in order. Although the luminance is changed to be lower than the original luminance for a certain amount of time in FIG. 15C, the luminance may be changed to be higher than the original luminance. In addition, although the cold-cathode tubes scan from 1502-1 to 1502-N here, the order may be reversed and the cold-cathode tubes 1502-N to 1502-1 may be scanned in this order.

By carrying out the driving method of a display device shown in FIGS. 1A and 1B in combination with the scanning backlight, a special effect can be obtained. That is, a subframe period in which a dark image is inserted in the driving method of a display device shown in FIGS. 1A and 1B and a period in which the luminance of each cold-cathode tube is lowered shown in FIG. 15C are synchronized, whereby display that is similar to display of a case where a scanning backlight is not used is obtained and the average luminance of the backlight can be lowered. Accordingly, power consumption of the backlight, which is a major part of power consumption of a liquid crystal display device as a whole, can be reduced.

It is preferable that the backlight luminance in a period with low luminance be approximately the same as the maximum luminance of the subframe in which a dark image is inserted. Specifically, it is preferable that the luminance be the maximum luminance Lmax1 of 1SF in the case where a dark image is inserted in 1SF, and the maximum luminance Lmax2 of 2SF in the case where a dark image is inserted in 2SF. Consequently, light quantity that is blocked by a liquid crystal element is reduced and the light emission luminance of the backlight can be lowered; therefore, power consumption can be reduced. In addition, by lowering the luminance of the backlight, light leakage can be reduced. Furthermore, in a liquid crystal element, it is impossible to perfectly block light, so that light leakage is generated and the contrast is decreased; however, when the luminance of the backlight is lowered, light leakage can be reduced and the contrast can be improved.

It is to be noted that LEDs may be used as a light source of the scanning backlight. A scanning backlight in this case is as shown in FIG. 15B. The scanning backlight shown in FIG. 15B includes a diffuser plate 1511 and light sources 1512-1 to 1512-N in each of which LEDs are juxtaposed. In the case where LEDs are used as a light source of the scanning backlight, there is an advantage in that the backlight can be formed to be thin and lightweight. Furthermore, there is an advantage in that color reproduction range can be widened. Furthermore, since the LEDs that are juxtaposed in each of the light sources 1512-1 to 1512-N can be scanned similarly, the backlight may be a point-scanning backlight. When the backlight is of a point-scanning type, the quality of moving images can further be improved. LEDs are particularly preferable for improving quality of moving images since the luminance change such as lighting and non-lighting of LEDs can be controlled at high speed.

It is to be noted that the driving method of a display device shown in FIGS. 1A and 1B may be carried out in combination with high frequency driving. In this way, the quality of moving images can further be improved.

Figure 18A:
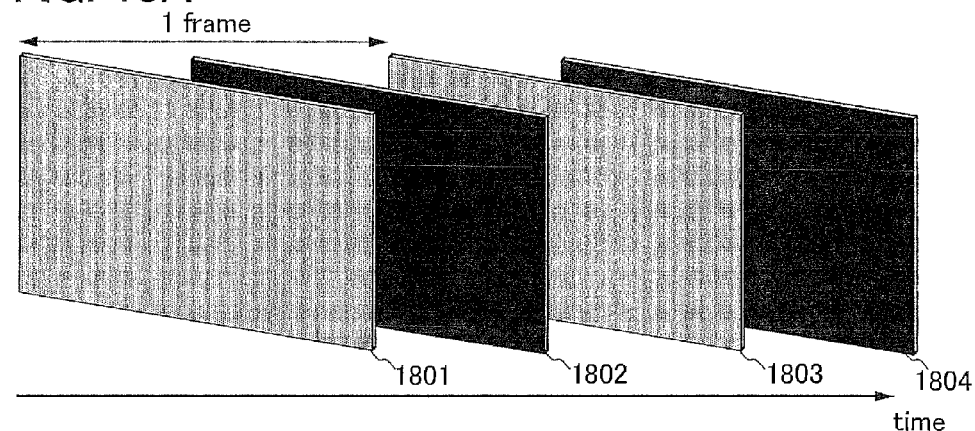
FIGS. 18A to 18C are views used for describing a driving method of a display device of the present invention.

The high frequency driving will be described with reference to FIGS. 18A to 18C. FIG. 18A is a view showing the driving with an insertion of a dark image when the frame frequency is 60 Hz. A reference numeral 1801 denotes a light image of the frame; 1802, a dark image of the frame; 1803, a light image of the next frame; and 1804, a dark image of the next frame. In the case where the driving is performed at 60 Hz, there are advantages in that consistency with a frame rate of video signals can be easily obtained and an image processing circuit is not complex.

Figure 18B:
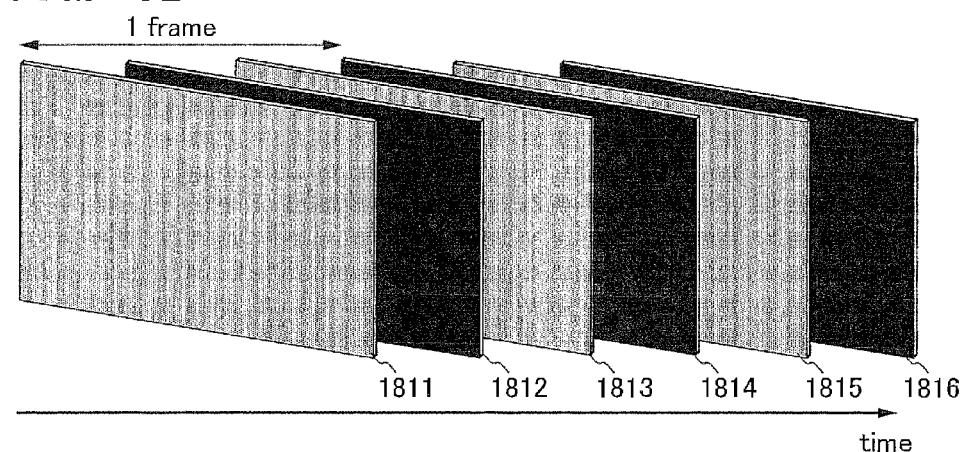

FIG. 18B is a view showing the driving with an insertion of a dark image when the frame frequency is 90 Hz. A reference numeral 1811 denotes a light image of the frame; 1812, a dark image of the frame; 1813, a light image of a first image formed by the frame, the next frame, and the after next frame; 1814, a dark image of the first image that is formed by the frame, the next frame, and the after next frame; 1815, a light image of a second image that is formed by the frame, the next frame, and the after next frame; and 1816, a dark image of the second image formed by the frame, the next frame, and the after next frame. In the case where the driving is performed at 90 Hz, there is an advantage in that the quality of moving images can be improved effectively without increasing the operating frequency of a peripheral driving circuit so much.

Figure 18C:
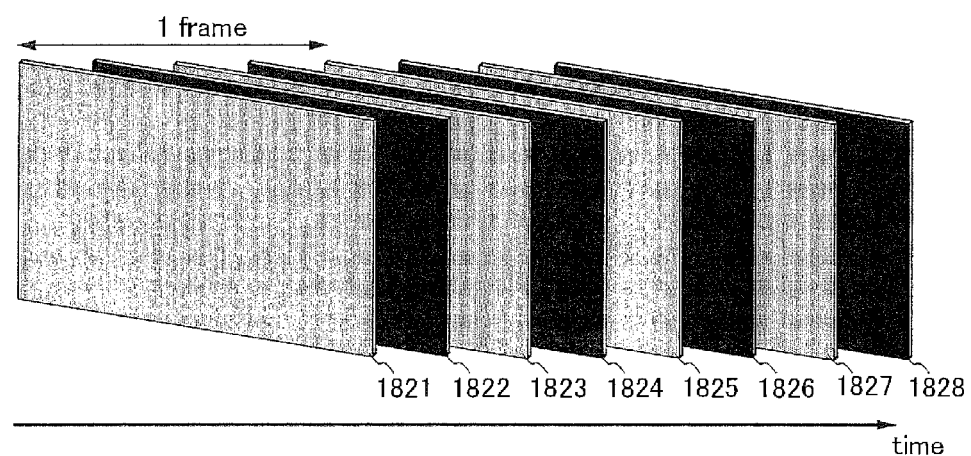

FIG. 18C is a view showing the driving with an insertion of a dark image when the frame frequency is 120 Hz. A reference numeral 1821 denotes a light image of the frame; 1822, a dark image of the frame; 1823, a light image of an image that is formed by the frame and the next frame; 1824, a dark image of an image that is formed by the frame and the next frame; 1825, a light image of the next frame; 1826, a dark image of the next frame; 1827, a light image of an image that is formed by the next frame and the after next frame; and 1828, a dark image of the image that is formed by the next frame and the after next frame. In the case where the driving is performed at 120 Hz, there is an advantage in that an effect of improving the quality of moving images is so significant that a residual image is hardly perceived.

The driving method of a display device shown in FIGS. 1A and 1B may be carried out in combination with a driving method in which an objective voltage is applied to a display element by operating a potential of a common line. Consequently, frequency of writing a video signal into a pixel is decreased, so that power that is consumed when the video signal is written into the pixel can be reduced. Here, a common line refers to a wiring to which an auxiliary capacitor element for increasing pixel capacitance is connected. Further, one pixel may be divided into a plurality of subpixels and a potential of each common line may be controlled separately for display. Consequently, the luminance of each subpixel can be different from each other, whereby a view angle can be improved.

Figure 14A:
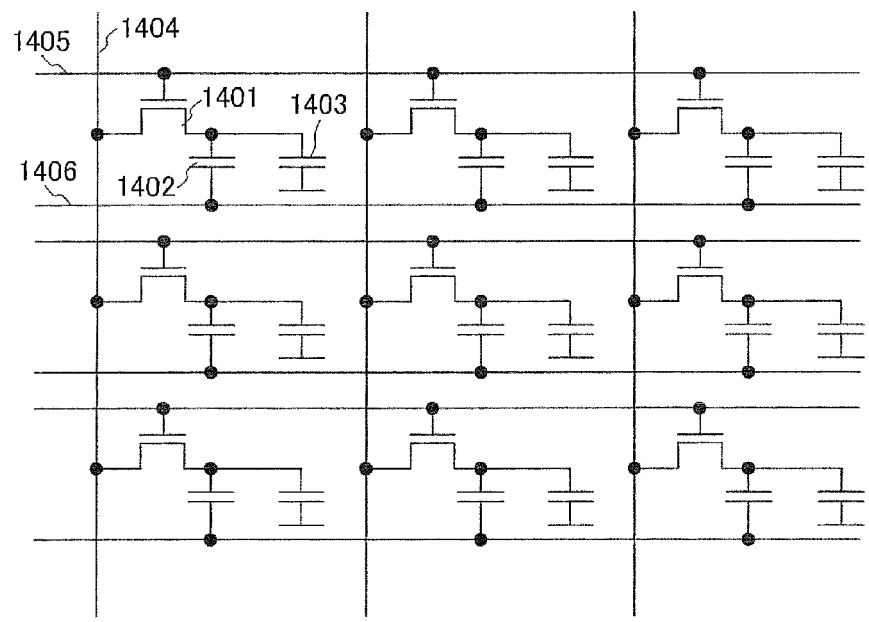
FIGS. 14A and 14B are diagrams used for describing a driving method of a display device of the present invention.

Driving with operation of a potential of a common line will be described with reference to FIGS. 14A and 14B. FIG. 14A is a diagram showing a plurality of pixel circuits in the case where one common line is arranged for one scan line in a display device using a display element having a capacitive property, such as a liquid crystal element. The pixel circuit shown in FIG. 14A includes a transistor 1401, an auxiliary capacitor 1402, a display element 1403, a video signal line 1404, a scan line 1405, and a common line 1406.

A gate electrode of the transistor 1401 is electrically connected to the scan line 1405. One of a source electrode or drain electrode of the transistor 1401 is electrically connected to the video signal line 1404, and the other one is electrically connected to one of electrodes of the auxiliary capacitor 1402 and one of electrodes of the display element 1403. The other electrode of the auxiliary capacitor 1402 is electrically connected to the common line 1406.

First, in a pixel which is selected by the scan line 1405, the transistor 1401 is turned on, so that a voltage corresponding to a video signal is applied to the display element 1403 and the auxiliary capacitor 1402 via the video signal line 1404. At this time, in the case where the video signal is to make all the pixels which are connected to the common line 1406 to display a minimum gray scale, or in the case where the video signal is to make all the pixels which are connected to the common line 1406 to display a maximum gray scale, it is not necessary to write the video signal into the each of the pixels via the video signal line 1404. Instead of writing the video signal via the video signal line 1404, by moving a potential of the common line 1406, a voltage to be applied to the display element 1403 can be changed.

The method in which a voltage to be applied to the display element 1403 is changed by moving a potential of the common line 1406 realizes a great effect particularly when it is combined with the driving method of a display device shown in FIGS. 1A and 1B. That is, when the whole image has a dark gray scale, gray scales in all the pixels connected to the common line 1406 are generally dark. At this time, in a subframe in which a dark image is inserted, a ratio of pixels which do not emit light at all becomes very high. This is because frequency of changing a voltage to be applied to the display element 1403 is significantly increased by moving a potential of the common line 1406 instead of writing a video signal via the video signal line 1404. Similarly, when the whole image has a light gray scale, by moving a potential of the common line 1406 instead of writing a video signal via the video signal line 1404, frequency of changing a voltage to be applied to the display element 1403 is significantly increased. This is because as follows. When the whole image has a light gray scale, gray scales in all the pixels connected to the common line 1406 are generally light. At this time, in a subframe in which a light image is inserted, a ratio of pixels which emit light with the maximum luminance in the subframe becomes very high.

Figure 14B:
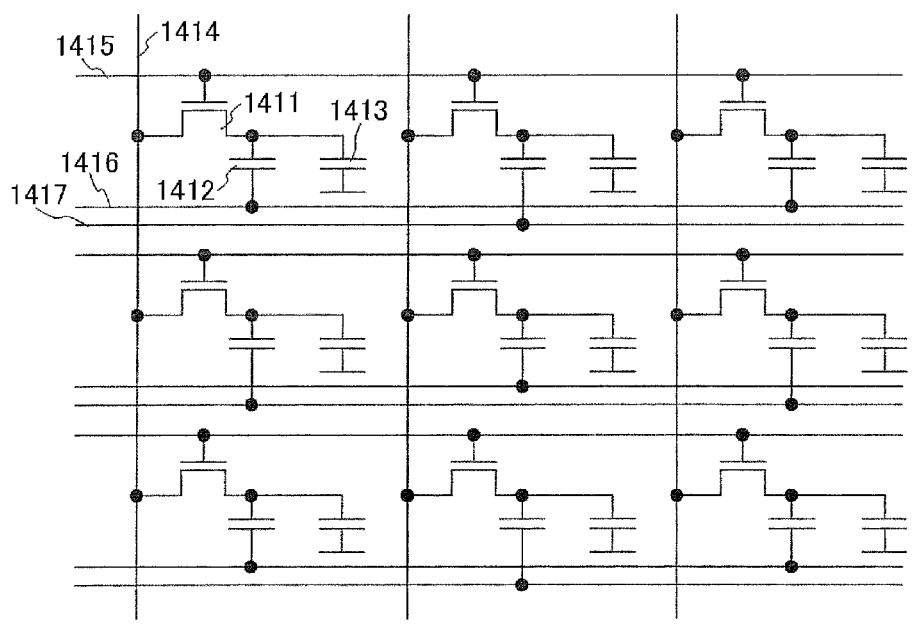

Next, FIG. 14B is a diagram showing a plurality of pixel circuits in the case where two common lines are arranged for one scan line in a display device using a display element having a capacitive property, such as a liquid crystal element. The pixel circuit shown in FIG. 14B includes a transistor 1411, an auxiliary capacitor 1412, a display element 1413, a video signal line 1414, a scan line 1415, a first common line 1416, and a second common line 1417.

A gate electrode of the transistor 1411 is electrically connected to the scan line 1415. One of a source electrode or drain electrode of the transistor 1411 is electrically connected to the video signal line 1414, and the other one is electrically connected to one of electrodes of the auxiliary capacitor 1412 and one of electrodes of the display element 1413. The other electrode of the auxiliary capacitor 1412 is electrically connected to the first common line 1416. Further, in a pixel which is adjacent to this pixel, the other electrode of the auxiliary capacitor 1412 is electrically connected to the second common line 1417.

In the pixel circuit shown in FIG. 14B, the number of pixels that are electrically connected to one common line is small; therefore, by moving a potential of the first common line 1416 or second common line 1417 instead of writing a video signal via the video signal line 1414, frequency of changing a voltage to be applied to the display element 1413 is significantly increased. In addition, a source inversion driving or a dot inversion driving becomes possible. By the source inversion driving or the dot inversion driving, flickering can be suppressed while the reliability of the element is improved.

As described above, when the driving method of a display device shown in FIGS. 1A and 1B is combined with a driving with operation of a potential of a common line, a particularly great effect can be obtained.

It is to be noted that the driving method of a display device shown in FIGS. 1A and 1B may be carried out in combination with a display element which is driven by a current, such as an organic EL element. Consequently, a video signal current can be large and a writing time can be short.

Figure 16:
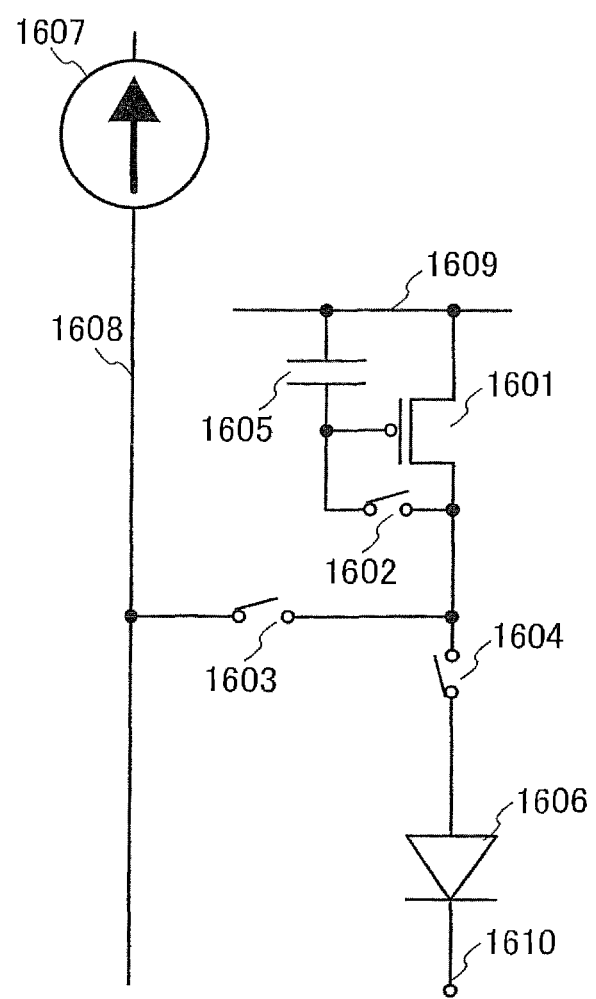
FIG. 16 is a diagram used for describing a driving method of a display device of the present invention.

A driving method of a display element which is driven by a current will be described with reference to FIG. 16. FIG. 16 is a diagram showing a pixel circuit in the case where a current is used as a video signal in a display device using a display element which is driven by a current, such as an organic EL element. The pixel circuit shown in FIG. 16 includes a transistor 1601, switching elements 1602, 1603, and 1604, a capacitor element 1605, a display element 1606, a video signal line 1608, a first wiring 1609, and a second wiring 1610. In addition, a current source 1607 may be provided outside the pixel region.

A gate electrode of the transistor 1601 is electrically connected to one of electrodes of the capacitor element 1605. One of a source electrode or drain electrode of the transistor 1601 is electrically connected to the first wiring 1609, and the other one is electrically connected to one of electrodes of the display element 1606. The other electrode of the capacitor element 1605 is electrically connected to the first wiring 1609. The other electrode of the display element 1606 is electrically connected to the second wiring 1610. The switching element 1602 may be arranged between the gate electrode of the transistor 1601 and the other one of the source electrode or drain electrode of the transistor 1601. Further, the switching element 1603 may be arranged between an electrode which electrically connects the other one of the source electrode or drain electrode of the transistor 1601 and one of electrodes of the display element 1606, and the video signal line 1608. Further, the switching element 1604 may be arranged between the other one of the source electrode or drain electrode of the transistor 1601 and one of electrodes of the display element 1606.

In the pixel circuit shown in FIG. 16, when a video signal is written, the switching elements 1602 and 1603 may be turned on and the switching element 1604 may be turned off. At this time, a current flowing between source and drain of the transistor 1601 becomes equal to a current flowing to the current source 1607. Further, when light is emitted, the switching element 1602 and 1603 may be turned off and the switching element 1604 may be turned on. At this time, a current that is comparable to a current written by the current source 1607 flows to the transistor 1601 and the display element 1606.

When a video signal is written by such a method, particularly when a gray scale on the lower gray scale side is written, if a current value to be written is small, the writing time becomes long because of parasitic capacitance accompanied by the video signal line. Therefore, the larger the current value to be written, the better. Then, by using the driving method of a display device shown in FIGS. 1A and 1B, the writing time can be shortened.

That is, in the driving method of a display device shown in FIGS. 1A and 1B, one of the subframe periods is in a non-lighting state on the lower gray scale side, and in the subframe in which light is emitted, the luminance is increased. In order to increase the luminance, a current to be written is increased. In this way, the writing time when a gray scale on the lower gray scale side is written can be shortened.

As described above, when the driving method of a display device shown in FIGS. 1A and 1B is combined with a display element which is driven by a current, such as an organic EL element, a particularly great effect can be obtained.

The driving method of a display device shown in FIGS. 1A and 1B may be carried out in combination with interlace scanning. Consequently, the operating frequency of a peripheral driving circuit can be decreased and power consumption can be reduced. This is particularly effective in the case of a dark image with many pixels in a non-lighting state or in the case of a light image with many pixels emitting light with the maximum luminance. This is because a decrease in resolution due to the interlace scanning is small for an image with a small change of gray scale.

The driving method of a display device shown in FIGS. 1A and 1B may be carried out in combination with a D/A converter circuit which can change a reference potential. Consequently, efficiency of the D/A converter circuit can be improved. It is particularly effective when the reference potential can be changed so as to be different between in a subframe displaying a light image and in a subframe displaying a dark image. This is because an average value of a potential of a video signal which is required is different between when a light image is displayed and when a dark image is displayed.

Embodiment Mode 2

In this embodiment mode, another embodiment mode of a method in which one frame is divided into a plurality of subframes, and some of the plurality of subframes are used mainly for image display (light image) and the others are used mainly for reducing residual images of moving images (dark image), which is described in Embodiment Mode 1, will be described.

When images to be displayed are divided into light images and dark images, there are several methods different in how the luminance which is needed to express a gray scale of an image to be displayed is distributed to a plurality of subframes. In order to describe this, in this embodiment mode, a graph whose horizontal axis shows a gray scale and vertical axis shows integrated luminance, which shows a relation between integrated luminance and gray scale in 1SF, a relation between integrated luminance and gray scale in 2SF, and relation between integrated luminance and gray scale of the sum of 1SF and 2SF, will be referred to.

Figure 3A:
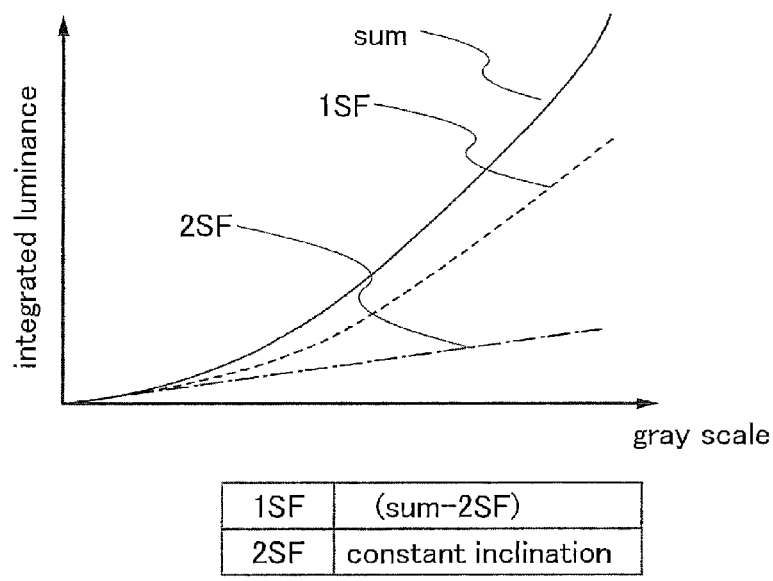
FIGS. 3A and 3B are graphs used for describing a mode of the present invention.

First, one mode of this embodiment mode will be described with reference to FIG. 3A. FIG. 3A shows an example of a method for distributing the total integrated luminance in one frame into 1SF and 2SF. Further, a table under the graph shows a feature of each subframe briefly. A subframe which is described as having constant inclination in the table means that a change of the integrated luminance with respect to gray scale is constant. That is, in the mode shown in FIG. 3A, a change of the integrated luminance with respect to the gray scale of 2SF is constant. Although a case where a value of inclination is positive is shown in FIG. 3A, the value of inclination may be 0, or negative. Furthermore, in the case where a subframe is described as (sum−xSF), the integrated luminance of the subframe depends on the integrated luminance of the other subframe. Here, various subframes may correspond to xSF, such as 1SF or 2SF. That is, in the mode shown in FIG. 3A, the integrated luminance of 1SF is a value obtained by subtracting the integrated luminance of 2SF from the total luminance. Here, the total luminance is otherwise determined, and in this embodiment mode, it is a curve which is convex downward. This is a case where gamma correction is performed in consideration of characteristics of human eyes. It is to be noted that the total luminance may be linear with respect to the gray scale, a curve which is convex upward, or a combination of a line segment and a curve. Furthermore, a mechanism in which the total luminance and the gamma correction are converted depending on a display image or a mechanism in which the total luminance and the gamma correction can be controlled by a user may be provided.

In the mode shown in FIG. 3A, a change of the integrated luminance with respect to the gray scale of 2SF is constant, which is advantageous in that image processing and an applied voltage become simple and the load on a peripheral driving circuit is reduced. In the mode shown in FIG. 3A, 1SF and 2SF are exchangeable, and even when the characteristics of 1SF and 2SF are exchanged, a similar effect can be obtained, as shown in FIGS. 1A and 1B. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily.

Figure 3B:
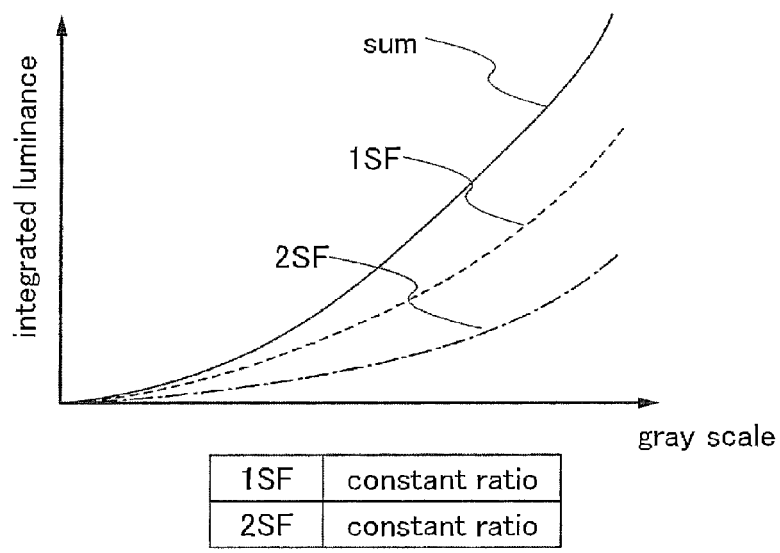

FIG. 3B shows an example of a method for distributing the total integrated luminance in one frame into 1SF and 2SF. As in FIG. 3B, a subframe which is described as having a constant ratio in the table under the graph means a case where the integrated luminance ratio between 1SF and 2SF is equal in each gray scale. That is, in the mode shown in FIG. 3B, a case where the ratio between the integrated luminance of 1SF and the integrated luminance of 2SF is equal in any gray scale is shown. It is preferable that a value of the ratio in this case (a ratio of the smaller luminance to the larger luminance) be greater than 0.5 and less than 1. Consequently, a blur of moving images can be efficiently reduced. It is to be noted that a case of having a characteristic of the constant ratio may refer to a case where each of the two subframes has a characteristic of a constant ratio. In other words, it may be said that there is no case where one of the subframes has a constant ratio and the other does not. In the mode shown in FIG. 3B, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily.

Next, another mode of this embodiment mode will be described with reference to FIGS. 4A to 4F. FIGS. 4A to 4F each show an example of a method for distributing the total integrated luminance in one frame into 1SF and 2SF in the case where gray scales that can be displayed are divided into a plurality of regions, two regions, for example, and each subframe can have different characteristics in each region. In this embodiment mode, each of the regions will be called region 1, region 2, . . . from a region on the lower gray scale side, for the explanation.

In the explanation below, "a value of integrated luminance is continuous at the boundary of regions" is defined as follows. Of two adjacent gray scales that are separated by the boundary of regions, when a gray scale that belongs to a region on the lower gray scale side is a boundary gray scale (low) and a gray scale that belongs to a region on the higher gray scale side is a boundary gray scale (high), and an absolute value of difference between the luminance in the boundary gray scale (high) and the luminance in the boundary gray scale (low) is boundary luminance difference; "a value of integrated luminance is continuous at the boundary of regions" means that the boundary luminance difference is less than or equal to a certain value $\Delta x$.

Here, the value of $\Delta x$ can be various values depending on the luminance in the boundary gray scale (high), the luminance in the boundary gray scale (low), and the like. However, it can be determined from a standpoint of continuousness of the gray scale-luminance characteristic to which attention is paid, seen from the human eyes (that is, whether or not the image is displayed smoothly on the boundary of the regions when the image corresponding to the gray scale-luminance characteristic to which attention is paid is displayed). Specifically, when an absolute value of difference between the luminance in the boundary gray scale (low) and the luminance which is lower than the boundary gray scale (low) by 1 is a first neighborhood boundary luminance difference (low), it is preferable that $\Delta x$ be about twice the first neighborhood boundary luminance difference (low).

In this embodiment mode and other embodiment modes, the explanation will be made regarding $\Delta x$ as twice the first neighborhood boundary luminance difference (low), as an example.

FIG. 4A shows an example of a method for distributing the total integrated luminance in one frame into 1SF and 2SF. Further, a table under the graph shows a feature of each subframe briefly. A subframe descried as having a constant inclination (continuous) (positive inclination) in a column of the region 2 in the table means that a change of the integrated luminance with respect to the gray scale is constant, a value of the integrated luminance at the boundary with the adjacent region on the lower gray scale side (region 1) is continuous, and a change of the integrated luminance with respect to the gray scale in this region has a positive sign. With such features, luminance difference between 1SF and 2SF in the maximum gray scale is decreased, which is advantageous in that flickering at the time of image display is reduced.

FIG. 4B shows an example of a method for distributing the total integrated luminance in one frame into 1SF and 2SF. Further, a table under the graph shows a feature of each subframe briefly. A subframe descried as having a constant inclination (continuous) (inclination 0) in a column of the region 2 in the table means that a change of the integrated luminance with respect to the gray scale is constant, a value of the integrated luminance at the boundary with the adjacent region on the lower gray scale side (region 1) is continuous, and a change of the integrated luminance with respect to the gray scale in this region is 0. With such features, an advantage in that image processing and an applied voltage become simple and the load on a peripheral driving circuit is reduced can be obtained.

FIG. 4C shows an example of a method for distributing the total integrated luminance in one frame into 1SF and 2SF. Further, a table under the graph shows a feature of each subframe briefly. A subframe descried as having a constant inclination (continuous) (negative inclination) in a column of the region 2 in the table means that a change of the integrated luminance with respect to the gray scale is constant, a value of the integrated luminance at the boundary with the adjacent region on the lower gray scale side (region 1) is continuous, and a change of the integrated luminance with respect to the gray scale in this region has a negative sign. With such features, luminance difference between 1SF and 2SF in the maximum gray scale is increased, whereby a blur in moving images can be efficiently reduced.

In the modes shown in FIGS. 4A, 4B, and 4C, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. Furthermore, replacement of the magnitude relation of luminance between 1SF and 2SF may separately occur in each region. A region or regions in which the magnitude relation of luminance is replaced may be only the region 1, only the region 2, or the region 1 and the region 2, for example.

In this manner, when gray scales which can be displayed are divided into a plurality of regions, a change of integrated luminance with respect to gray scale (a value of inclination) in each region can be various values. However, it is preferable that the value of inclination be smaller than the inclination of a tangent line of the total value of integrated luminance at the boundary of the regions, as shown in FIG. 4D. That is, when the inclination of a tangent line of a total value of integrated luminance at a boundary of regions is Amax, the value θ in this region is preferably in a range of −θmax<θ<θmax. (the hatched region in FIG. 4D) When θ is within this region, a phenomenon in which the gray scale at the boundary of the regions is intensified and an unnatural contour is generated which is caused when a change of integrated luminance with respect to gray scale is sharp can be reduced.

As a method for reducing a phenomenon in which the gray scale at the boundary of the regions is intensified and an unnatural contour is generated which is caused when a change of integrated luminance with respect to gray scale is sharp, methods shown in FIGS. 4E and 4F may be used, in addition to the method shown in FIG. 4D. A feature of each region of FIGS. 4E and 4F is the same as the mode shown in FIG. 4B, and the gray scale to be the boundary of the regions is different. By preparing a plurality of luminance distribution modes with different gray scales to be the boundaries of the regions and switching these in accordance with need, a phenomenon in which the gray scale at the boundary of the regions is intensified and an unnatural contour is generated can be reduced. Such methods can be applied to various luminance distribution modes, without being limited to the mode shown in FIG. 4B.

As for a method for switching the plurality of luminance distribution modes, for example, switching may be conducted per frame. Consequently, a phenomenon in which an unnatural contour is generated can be efficiently reduced. Alternatively, the luminance distribution modes may be switched in accordance with an image to be displayed. At this time, in the case where a threshold exists in gray scale distribution of an image, it is preferable that the boundary of the regions be set near the threshold. For example, in the case of a light image having little distribution of gray scales less than or equal to gray scale 100, it is preferable that the boundary of the regions be set near gray scale 100. Similarly, also in the case of a dark image having little distribution of gray scales greater than or equal to gray scale 100, it is preferable that the boundary of the regions be set near gray scale 100. Consequently, in an image to be displayed, gray scales which cross near the threshold are decreased, whereby a phenomenon in which the gray scale at the boundary of the regions is intensified and an unnatural contour is generated can be reduced. It is to be noted that the threshold may be set depending on light and dark of an image. For example, the boundary of the regions may be set on the higher gray scale side in the case of a generally dark image and the boundary of the regions may be set on the lower gray scale side in the case of a generally light image. Consequently, in an image to be displayed, gray scales which cross near the threshold are decreased, whereby a phenomenon in which the gray scale at the boundary of the regions is intensified and an unnatural contour is generated can be reduced. The method of switching the luminance distribution modes in accordance with an image to be displayed can be applied to various luminance distribution modes, without being limited to modes with different boundaries of the regions.

Next, another mode of this embodiment mode will be described with reference to FIGS. 5A to 5F. FIGS. 5A to 5F each show an example of a method for distributing the total integrated luminance in one frame into 1SF and 2SF in the case where gray scales that can be displayed are divided into a plurality of regions, two regions, for example, and each subframe can have different characteristics in each region. In particular, a case where a change of integrated luminance with respect to gray scale of one of subframes is constant in both of the two regions will be described.

Figure 5A:
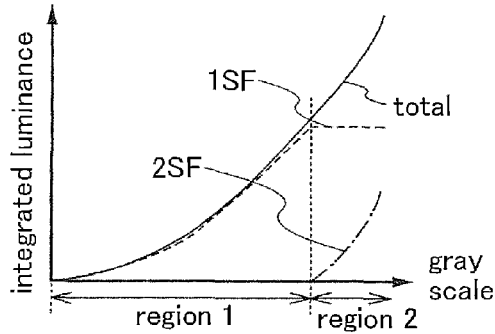
FIGS. 5A to 5F are graphs used for describing a mode of the present invention.

FIG. 5A shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 1SF in a region 2 is that a change of integrated luminance with respect to gray scale is constant and a value of integrated luminance is continuous at the boundary with an adjacent region on the lower gray scale side (region 1). A value of the inclination may be a positive value, 0, or a negative value. A feature of 2SF in the region 2 is that the luminance depends on the total luminance and the luminance of 1SF. With such features, an advantage in that image processing and an applied voltage become simple and the load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

Figure 5B:
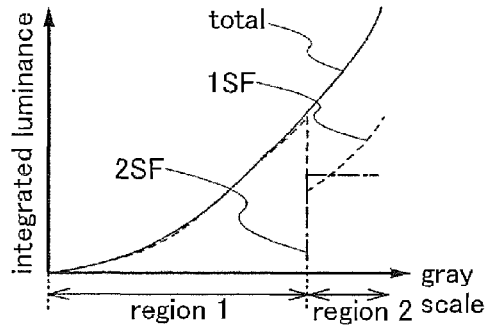

FIG. 5B shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 2SF in a region 2 is that a change of integrated luminance with respect to gray scale is constant and a value of integrated luminance changes discontinuously toward a direction of large value of integrated luminance at the boundary with an adjacent region on the lower gray scale side (region 1). A value of the inclination may be a positive value, 0, or a negative value. A feature of 1SF in the region 2 is that the luminance depends on the total luminance and the luminance of 2SF. With such features, luminance difference between 1SF and 2SF in the maximum gray scale is decreased, and an advantage in that flickering at the time of image display is reduced can be obtained. In addition, advantages in that image processing and an applied voltage become simple as the luminance change of 2SF becomes simple and the load on a peripheral driving circuit is reduced can be obtained. In particular, an advantage in that capacitance of a memory element can be reduced can be obtained in the case of performing overdriving.

Figure 5C:
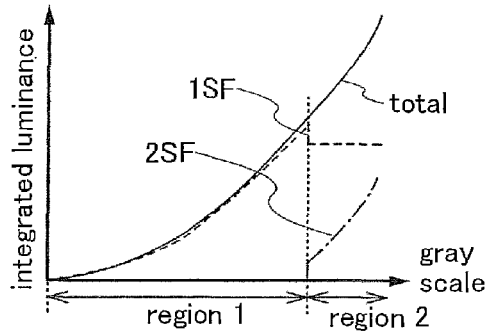

FIG. 5C shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 1SF in a region 2 is that a change of integrated luminance with respect to gray scale is constant and a value of integrated luminance changes discontinuously toward a direction of small value of integrated luminance at the boundary with an adjacent region on the lower gray scale side (region 1). A value of the inclination may be a positive value, 0, or a negative value. A feature of 2SF in the region 2 is that the luminance depends on the total luminance and the luminance of 1SF. With such features, luminance difference between 1SF and 2SF in the maximum gray scale is decreased, and an advantage in that flickering at the time of image display is reduced can be obtained.

Figure 5D:
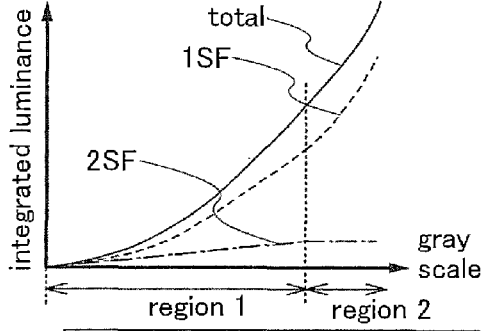

FIG. 5D shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 2SF in a region 2 is that a change of integrated luminance with respect to gray scale is constant and a value of integrated luminance is continuous at the boundary with an adjacent region on the lower gray scale side (region 1). A value of the inclination may be a positive value, 0, or a negative value. A feature of 1SF in the region 2 is that the luminance depends on the total luminance and the luminance of 2SF. With such features, an advantage in that image processing and an applied voltage become simple and the load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

Figure 5E:
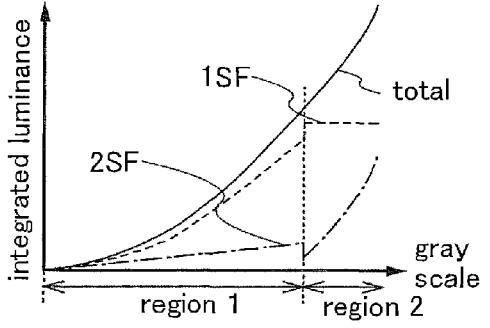

FIG. 5E shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 1SF in a region 2 is that a change of integrated luminance with respect to gray scale is constant and a value of integrated luminance changes discontinuously toward a direction of large value of integrated luminance at the boundary with an adjacent region on the lower gray scale side (region 1). A value of the inclination may be a positive value, 0, or a negative value. A feature of 2SF in the region 2 is that the luminance depends on the total luminance and the luminance of 1SF. With such features, luminance difference between 1SF and 2SF in the maximum gray scale is increased, and a blur of moving images can be efficiently reduced.

Figure 5F:
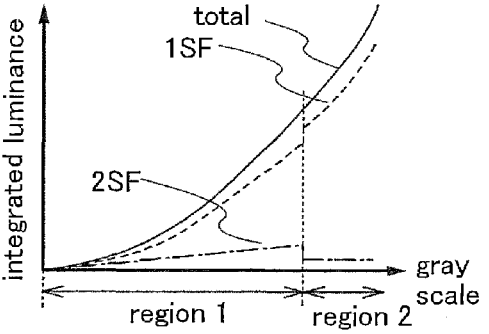

FIG. 5F shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 2SF in a region 2 is that a change of integrated luminance with respect to gray scale is constant and a value of integrated luminance changes discontinuously toward a direction of small value of integrated luminance at the boundary with an adjacent region on the lower gray scale side (region 1). A value of the inclination may be a positive value, 0, or a negative value. A feature of 1SF in the region 2 is that the luminance depends on the total luminance and the luminance of 2SF. With such features, luminance difference between 1SF and 2SF in the maximum gray scale is increased, and a blur of moving images can be efficiently reduced.

In the modes shown in FIGS. 5A, 5B, 5C, 5D, 5E, and 5F, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. The magnitude relation of luminance between 1SF and 2SF may be replaced. Furthermore, replacement of the magnitude relation of luminance between 1SF and 2SF may separately occur in each region. A region or regions in which the magnitude relation of luminance is replaced may be only the region 1, only the region 2, or the region 1 and the region 2, for example.

Next, another mode of this embodiment mode will be described with reference to FIGS. 6A to 6F. FIGS. 6A to 6F each show an example of a method for distributing the total integrated luminance in one frame into 1SF and 2SF in the case where gray scales that can be displayed are divided into a plurality of regions, two regions, for example, and each subframe can have different characteristics in each region. In particular, a case where a change of integrated luminance with respect to gray scale of one of subframes in one of the two regions is constant and the integrated luminance ratio between 1SF and 2SF is equal in each gray scale in the other region will be described.

Figure 6A:
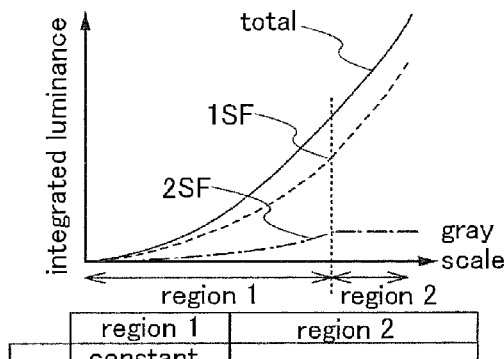
FIGS. 6A to 6F are graphs used for describing a mode of the present invention.

FIG. 6A shows an example of a method for distributing the total integrated luminance in one frame into 1SF and 2SF. Further, a table under the graph shows a feature of each subframe briefly. A feature of 1SF and 2SF in a region 1 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, luminance difference between 1SF and 2SF on the lower gray scale side can be increased, and a blur of moving images can be efficiently reduced. A feature of 2SF in a region 2 is that a change of integrated luminance with respect to gray scale is constant and a value of integrated luminance is continuous at the boundary with an adjacent region on the lower gray scale side (region 1). A value of the inclination may be a positive value, 0, or a negative value. A feature of 1SF in the region 2 is that the luminance depends on the total luminance and the luminance of 2SF. With such features, an advantage in that image processing and an applied voltage become simple and the load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

Figure 6B:
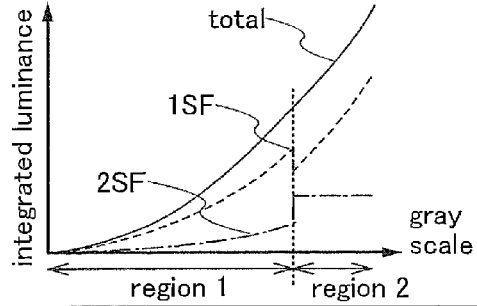

FIG. 6B shows an example of a method for distributing the total integrated luminance in one frame into 1SF and 2SF. Further, a table under the graph shows a feature of each subframe briefly. A feature of 1SF and 2SF in a region 1 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, luminance difference between 1SF and 2SF on the lower gray scale side can be increased, and a blur of moving images can be efficiently reduced. A feature of 2SF in a region 2 is that a change of integrated luminance with respect to gray scale is constant and a value of integrated luminance changes discontinuously toward a direction of large value of integrated luminance at the boundary with an adjacent region on the lower gray scale side (region 1). A value of the inclination may be a positive value, 0, or a negative value. A feature of 1SF in the region 2 is that the luminance depends on the total luminance and the luminance of 2SF. With such features, luminance difference between 1SF and 2SF in the maximum gray scale is decreased, which is advantageous in that flickering at the time of image display is reduced.

Figure 6C:
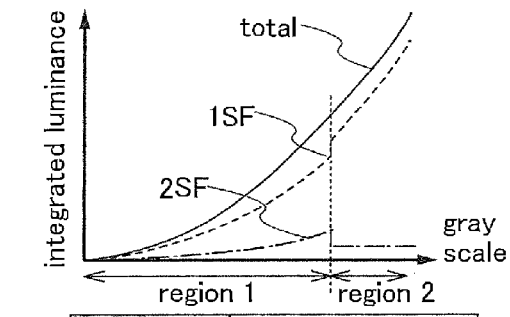

FIG. 6C shows an example of a method for distributing the total integrated luminance in one frame into 1SF and 2SF. Further, a table under the graph shows a feature of each subframe briefly. A feature of 1SF and 2SF in a region 1 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, luminance difference between 1SF and 2SF on the lower gray scale side can be increased, and a blur of moving images can be efficiently reduced. A feature of 2SF in a region 2 is that a change of integrated luminance with respect to gray scale is constant and a value of integrated luminance changes discontinuously toward a direction of small value of integrated luminance at the boundary with an adjacent region on the lower gray scale side (region 1). A value of the inclination may be a positive value, 0, or a negative value. A feature of 1SF in the region 2 is that the luminance depends on the total luminance and the luminance of 2SF. With such features, luminance difference between 1SF and 2SF in the maximum gray scale is increased, and a blur of moving images can be efficiently reduced.

Figure 6D:
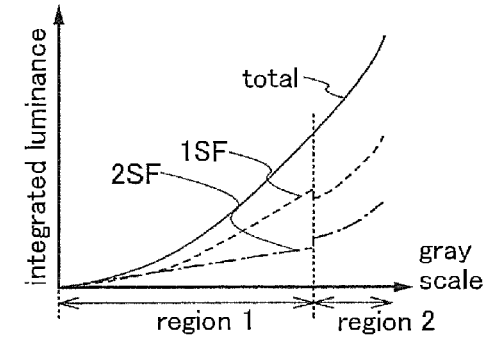

FIG. 6D shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 1SF and 2SF in a region 2 is that an integrated luminance ratio between 1SF and 2SF is equal in each gray scale; and a value of integrated luminance of 1SF changes discontinuously toward a direction of small value, and a value of integrated luminance of 2SF changes discontinuously toward a direction of large value at the boundary with an adjacent region on the lower gray scale side (region 1). With such features, luminance difference between 1SF and 2SF in the maximum gray scale is decreased, which is advantageous in that flickering at the time of image display is reduced. It is preferable that a value of the ratio in this case (a ratio of the smaller luminance to the larger luminance) be greater than 0.5 and less than 1. Consequently, a blur of moving images can be efficiently reduced.

Figure 6E:
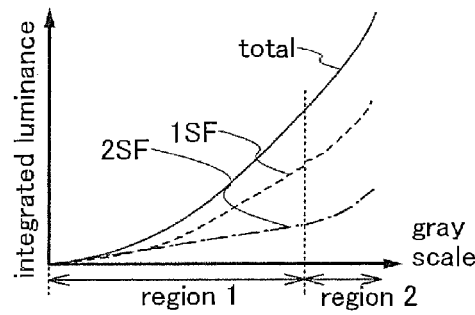

FIG. 6E shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 1SF and 2SF in a region 2 is that an integrated luminance ratio between 1SF and 2SF is equal in each gray scale, and a value of integrated luminance of each of 1SF and 2SF is continuous at the boundary with an adjacent region on the lower gray scale side (region 1). With such features, an advantage in that image processing and an applied voltage become simple and the load on a peripheral driving circuit is reduced can be obtained. In addition, a phenomenon in which an unnatural contour is generated can be reduced. It is preferable that a value of the ratio in this case (a ratio of the smaller luminance to the larger luminance) be greater than 0.5 and less than 1. Consequently, a blur of moving images can be efficiently reduced.

Figure 6F:
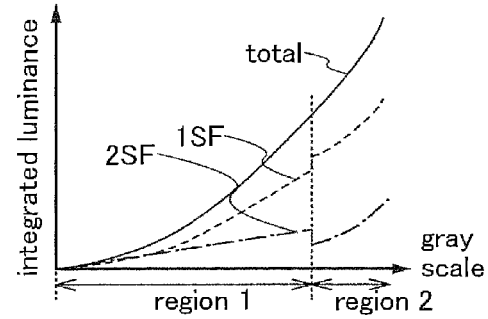

FIG. 6F shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A value of the inclination may be a positive value, 0, or a negative value. A feature of 1SF in the region 1 is that the luminance depends on the total luminance and the luminance of 2SF. A feature of 1SF and 2SF in a region 2 is that an integrated luminance ratio between 1SF and 2SF is equal in each gray scale; and a value of integrated luminance of 1SF changes discontinuously toward a direction of large value, and a value of integrated luminance of 2SF changes discontinuously toward a direction of small value at the boundary with an adjacent region on the lower gray scale side (region 1). With such features, luminance difference between 1SF and 2SF in the maximum gray scale is increased, and a blur in moving images can be efficiently reduced. It is preferable that a value' of the ratio in this case (a ratio of the smaller luminance to the larger luminance) be greater than 0.5 and less than 1. Consequently, a blur of moving images can be efficiently reduced.

In the modes shown in FIGS. 6A, 6B, 6C, 6D, 6E, and 6F, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. Furthermore, replacement of the magnitude relation of luminance between 1SF and 2SF may separately occur in each region. A region or regions in which the magnitude relation of luminance is replaced may be only the region 1, only the region 2, or the region 1 and the region 2, for example.

Figure 7A:
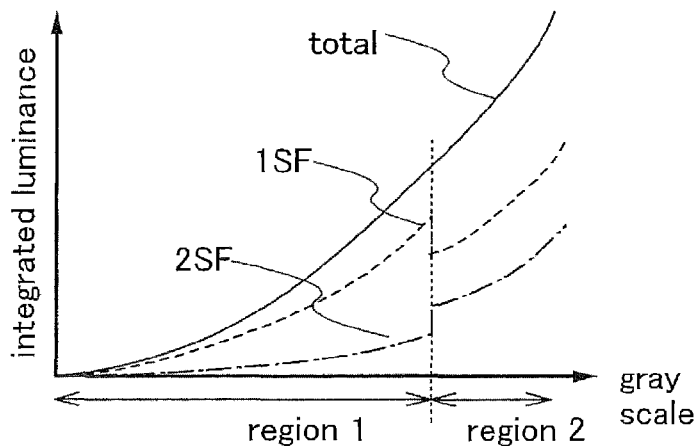
FIGS. 7A and 7B are graphs used for describing a mode of the present invention.
Figure 7B:
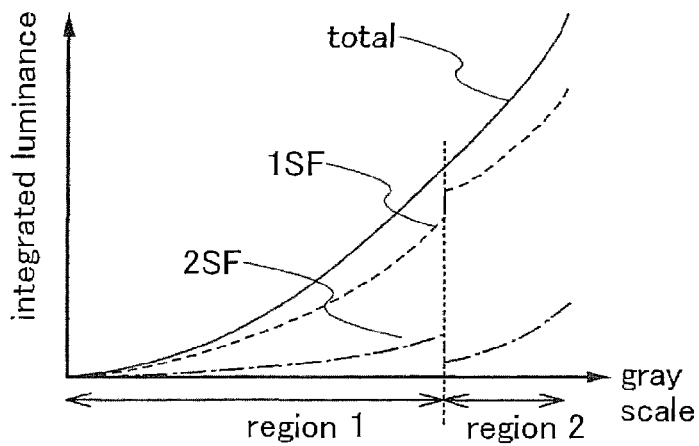

Next, another mode of this embodiment mode will be described with reference to FIGS. 7A and 7B. FIGS. 7A and 7B each show an example of a method for distributing the total integrated luminance in one frame into 1SF and 2SF in the case where gray scales that can be displayed are divided into a plurality of regions, two regions, for example, and each subframe can have different characteristics in each region. In particular, a case where an integrated luminance ratio between 1SF and 2SF is equal in each gray scale in the both regions will be described.

FIG. 7A shows an example of a method for distributing the total integrated luminance in one frame into 1SF and 2SF. Further, a table under the graph shows a feature of each subframe briefly. A feature of 1SF and 2SF in a region 1 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, luminance difference between 1SF and 2SF on the lower gray scale side can be increased, and a blur of moving images can be efficiently reduced. A feature of 1SF and 2SF in a region 2 is that an integrated luminance ratio between 1SF and 2SF is equal in each gray scale; and a value of integrated luminance of 1SF changes discontinuously toward a direction of small value, and a value of integrated luminance of 2SF changes discontinuously toward a direction of large value at the boundary with an adjacent region on the lower gray scale side (region 1). With such features, luminance difference between 1SF and 2SF in the maximum gray scale is decreased, which is advantageous in that flickering at the time of image display is reduced. It is preferable that a value of the ratio in this case (a ratio of the smaller luminance to the larger luminance) be greater than 0.5 and less than 1. Consequently, a blur of moving images can be efficiently reduced.

FIG. 7B shows an example of a method for distributing the total integrated luminance in one frame into 1SF and 2SF. Further, a table under the graph shows a feature of each subframe briefly. A feature of 1SF and 2SF in a region 1 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, luminance difference between 1SF and 2SF on the lower gray scale side can be increased, and a blur of moving images can be efficiently reduced. A feature of 1SF and 2SF in a region 2 is that an integrated luminance ratio between 1SF and 2SF is equal in each gray scale; and a value of integrated luminance of 1SF changes discontinuously toward a direction of large value, and a value of integrated luminance of 2SF changes discontinuously toward a direction of small value at the boundary with an adjacent region on the lower gray scale side (region 1). With such features, luminance difference between 1SF and 2SF in the maximum gray scale is increased, and a blur in moving images can be efficiently reduced. It is preferable that a value of the ratio in this case (a ratio of the smaller luminance to the larger luminance) be greater than 0.5 and less than 1. Consequently, a blur of moving images can be efficiently reduced.

In the modes shown in FIGS. 7A and 7B, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. Furthermore, replacement of the magnitude relation of luminance between 1SF and 2SF may separately occur in each region. A region or regions in which the magnitude relation of luminance is replaced may be only the region 1, only the region 2, or the region 1 and the region 2, for example.

Next, another mode of this embodiment mode will be described with reference to FIGS. 8A to 8D. FIGS. 8A to 8D each show an example of a method for distributing the total integrated luminance in one frame into 1SF and 2SF in the case where gray scales that can be displayed are divided into a plurality of regions, three regions, for example, and each subframe can have different characteristics in each region. In particular, a case where a change of integrated luminance with respect to gray scale of one of subframes is constant in every region will be described.

Figure 8A:
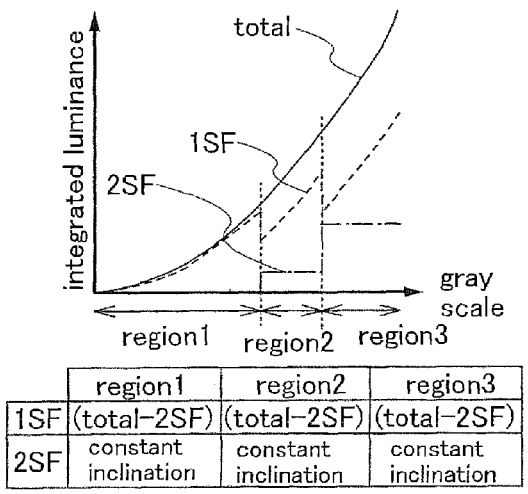
FIGS. 8A to 8D are graphs used for describing a mode of the present invention.

FIG. 8A shows an example of a method for distributing the total integrated luminance in one frame into 1SF and 2SF. Further, a table under the graph shows a feature of each subframe briefly. A feature of 2SF in a region 1, a region 2, and a region 3 is that a change of integrated luminance with respect to gray scale is constant. A feature of 1SF in the region 1, the region 2, and the region 3 is that the luminance depends on the total luminance and the luminance of the other subframe.

Figure 8B:
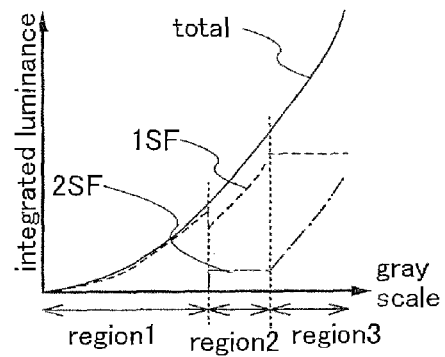

FIG. 8B shows an example of a method for distributing the total integrated luminance in one frame into 1SF and 2SF. Further, a table under the graph shows a feature of each subframe briefly. A feature of 2SF in a region 1 and a region 2 and 1SF in a region 3 is that a change of integrated luminance with respect to gray scale is constant. A feature of 1SF in the region 1 and the region 2 and 2SF in the region 3 is that the luminance depends on the total luminance and the luminance of the other subframe.

Figure 8C:
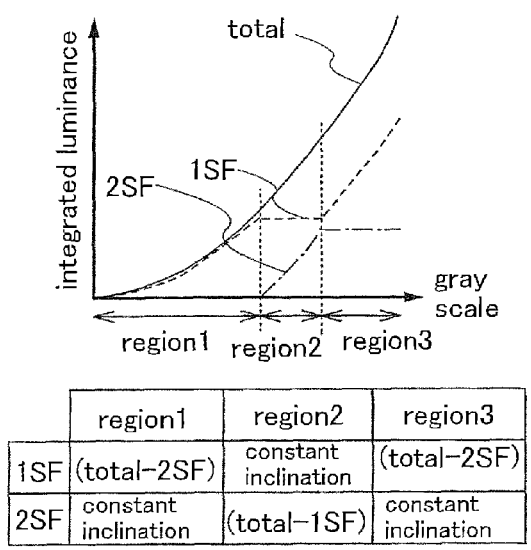

FIG. 8C shows an example of a method for distributing the total integrated luminance in one frame into 1SF and 2SF. Further, a table under the graph shows a feature of each subframe briefly. A feature of 2SF in a region 1 and a region 3 and 1SF in a region 2 is that a change of integrated luminance with respect to gray scale is constant. A feature of 1SF in the region 1 and the region 3 and 2SF in the region 2 is that the luminance depends on the total luminance and the luminance of the other subframe.

Figure 8D:
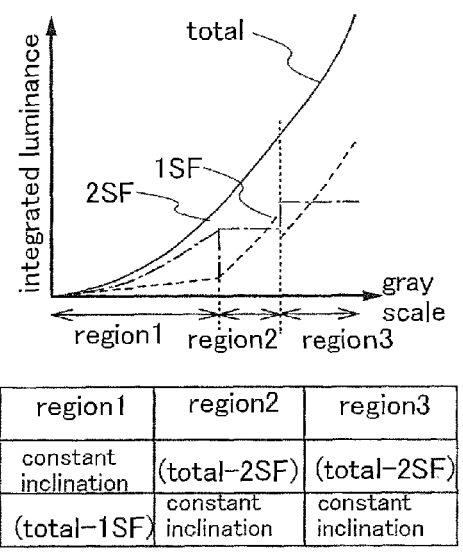

FIG. 8D shows an example of a method for distributing the total integrated luminance in one frame into 1SF and 2SF. Further, a table under the graph shows a feature of each subframe briefly. A feature of 1SF in a region 1 and 2SF in a region 2 and a region 3 is that a change of integrated luminance with respect to gray scale is constant. A feature of 2SF in the region 1 and 1SF in the region 2 and the region 3 is that the luminance depends on the total luminance and the luminance of the other subframe.

A value of the inclination may be a positive value, 0, or a negative value. Differences among these are not described in detail in FIGS. 8A to 8D, and a combination of these can be applied in every region. In the case where the inclination is a positive or negative value and luminance difference between 1SF and 2SF is increased, a blur of moving images can be efficiently reduced. In the case where the inclination is a positive or negative value and luminance difference between 1SF and 2SF is decreased, an advantage in that flickering at the time of image display is reduced can be obtained. Alternatively, in the case where the inclination is 0, an advantage in that image processing and an applied voltage become simple and a load on a peripheral circuit is reduced can be obtained. In addition, a phenomenon in which an unnatural contour is generated can be reduced. Furthermore, since the maximum luminance in 1SF and 2SF can be lowered, power consumption can be reduced.

As has been described above, a state of luminance at the boundary of regions can be any of: changing discontinuously toward a direction of high luminance; being continuous; or changing discontinuously toward a direction of low luminance, compared to that in an adjacent region on the lower gray scale side. Differences among these are not described in detail in FIGS. 8A to 8D, and a combination of these can be applied in every region boundary. In the case where the luminance changes discontinuously at the boundary of regions, and as a result, the luminance difference between 1SF and 2SF is increased; a blur of moving images can be efficiently reduced. In the case where the luminance changes discontinuously at the boundary of regions, and as a result, the luminance difference between 1SF and 2SF is decreased; an advantage in that flickering at the time of image display is reduced can be obtained. Alternatively, in the case where the luminance is continuous at the boundary of regions, an advantage in that image processing and an applied voltage become simple and a load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

In the modes shown in FIGS. 8A, 8B, 8C, and 8D, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. The magnitude relation of luminance between 1SF and 2SF may be replaced. Furthermore, replacement of the magnitude relation of luminance between 1SF and 2SF may separately occur in each region. A region or regions in which the magnitude relation of luminance is replaced may be only the region 1, only the region 2, only the region 3, the region 1 and the region 2, the region 2 and the region 3, the region 3 and the region 1, or the region 1, the region 2 and the region 3, for example.

Next, another mode of this embodiment mode will be described with reference to FIGS. 9A to 9F. FIGS. 9A to 9F each show an example of a method for distributing the total integrated luminance in one frame into 1SF and 2SF in the case where gray scales that can be displayed are divided into a plurality of regions, three regions, for example, and each subframe can have different characteristics in each region. In particular, a case where a change of integrated luminance with respect to gray scale of one of subframes is constant in two regions out of the three regions, and an integrated luminance ratio between 1SF and 2SF is equal in each gray scale in another region will be described.

Figure 9A:
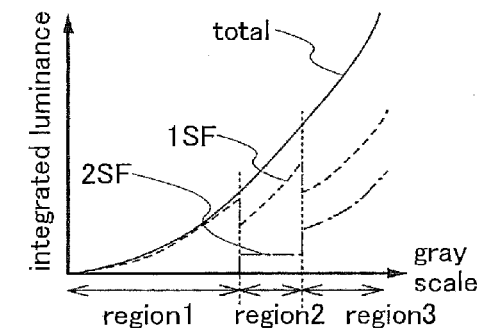
FIGS. 9A to 9F are graphs used for describing a mode of the present invention.

FIG. 9A shows an example of a method for distributing the total integrated luminance in one frame into 1SF and 2SF. Further, a table under the graph shows a feature of each subframe briefly. A feature of 2SF in a region 1 and a region 2 is that a change of integrated luminance with respect to gray scale is constant. A feature of 1SF in the region 1 and the region 2 is that the luminance depends on the total luminance and the luminance of the other subframe. A feature of 1SF in a region 3 and 2SF in the region 3 is that an integrated luminance ratio between 1SF and 2SF is equal in each gray scale. It is preferable that a value of the ratio in this case (a ratio of the smaller luminance to the larger luminance) be greater than 0.5 and less than 1. Consequently, a blur of moving images can be efficiently reduced.

Figure 9B:
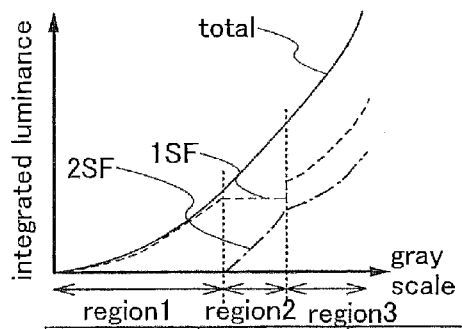

FIG. 9B shows an example of a method for distributing the total integrated luminance in one frame into 1SF and 2SF. Further, a table under the graph shows a feature of each subframe briefly. A feature of 2SF in a region 1 and 1SF in a region 2 is that a change of integrated luminance with respect to gray scale is constant. A feature of 1SF in the region 1 and 2SF the region 2 is that the luminance depends on the total luminance and the luminance of the other subframe. A feature of 1SF in a region 3 and 2SF in the region 3 is that an integrated luminance ratio between 1SF and 2SF is equal in each gray scale. It is preferable that a value of the ratio in this case (a ratio of the smaller luminance to the larger luminance) be greater than 0.5 and less than 1. Consequently, a blur of moving images can be efficiently reduced.

Figure 9C:
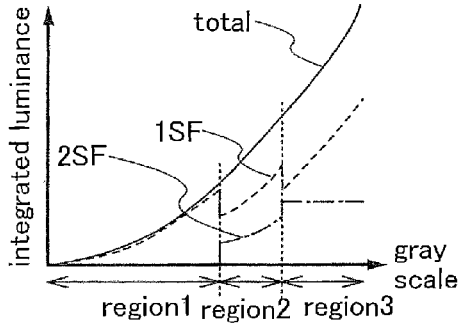

FIG. 9C shows an example of a method for distributing the total integrated luminance in one frame into 1SF and 2SF. Further, a table under the graph shows a feature of each subframe briefly. A feature of 2SF in a region 1 and a region 3 is that a change of integrated luminance with respect to gray scale is constant. A feature of 1SF in the region 1 and the region 3 is that the luminance depends on the total luminance and the luminance of the other subframe. A feature of 1SF in a region 2 and 2SF in the region 2 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced.

Figure 9D:
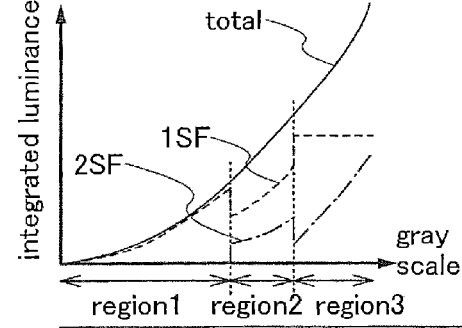

FIG. 9D shows an example of a method for distributing the total integrated luminance in one frame into 1SF and 2SF. Further, a table under the graph shows a feature of each subframe briefly. A feature of 2SF in a region 1 and 1SF in a region 3 is that a change of integrated luminance with respect to gray scale is constant. A feature of 1SF in the region 1 and 2SF in the region 3 is that the luminance depends on the total luminance and the luminance of the other subframe. A feature of 1SF in a region 2 and 2SF in the region 2 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced.

Figure 9E:
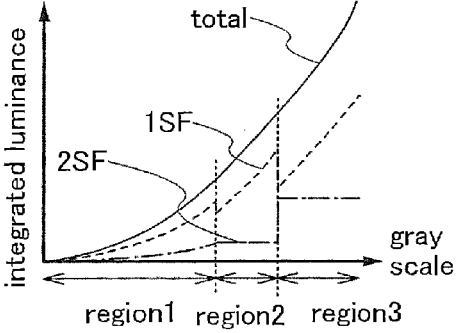

FIG. 9E shows an example of a method for distributing the total integrated luminance in one frame into 1SF and 2SF. Further, a table under the graph shows a feature of each subframe briefly. A feature of 2SF in a region 2 and a region 3 is that a change of integrated luminance with respect to gray scale is constant. A feature of 1SF in the region 2 and the region 3 is that the luminance depends on the total luminance and the luminance of the other subframe. A feature of 1SF in a region 1 and 2SF in the region 1 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced.

Figure 9F:
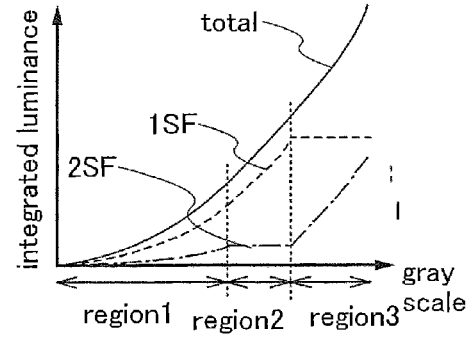

FIG. 9F shows an example of a method for distributing the total integrated luminance in one frame into 1SF and 2SF. Further, a table under the graph shows a feature of each subframe briefly. A feature of 2SF in a region 2 and 1SF in a region 3 is that a change of integrated luminance with respect to gray scale is constant. A feature of 1SF in the region 2 and 2SF in the region 3 is that the luminance depends on the total luminance and the luminance of the other subframe. A feature of 1SF in a region 1 and 2SF in the region 1 is that an integrated luminance ratio between 1SF and 2SF is equal in each gray scale. It is preferable that a value of the ratio in this case (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced.

A value of the inclination may be a positive value, 0, or a negative value. Differences among these are not described in detail in FIGS. 9A to 9F, and a combination of these can be applied in every region. In the case where the inclination is a positive or negative value and luminance difference between 1SF and 2SF is increased, a blur of moving images can be efficiently reduced. In the case where the inclination is a positive or negative value and luminance difference between 1SF and 2SF is decreased, an advantage in that flickering at the time of image display is reduced can be obtained. Alternatively, in the case where the inclination is 0, an advantage in that image processing and an applied voltage become simple and a load on a peripheral circuit is reduced can be obtained. In addition, a phenomenon in which an unnatural contour is generated can be reduced. Furthermore, since the maximum luminance in 1SF and 2SF can be lowered, power consumption can be reduced.

As has been described above, a state of luminance at the boundary of regions can be any of: changing discontinuously toward a direction of high luminance; being continuous; or changing discontinuously toward a direction of low luminance, compared to that in an adjacent region on the lower gray scale side. Differences among these are not described in detail in FIGS. 9A to 9F, and a combination of these can be applied in every region boundary. In the case where the luminance changes discontinuously at the boundary of regions, and as a result, the luminance difference between 1SF and 2SF is increased; a blur of moving images can be efficiently reduced. In the case where the luminance changes discontinuously at the boundary of regions, and as a result, the luminance difference between 1SF and 2SF is decreased; an advantage in that flickering at the time of image display is reduced can be obtained. Alternatively, in the case where the luminance is continuous at the boundary of regions, an advantage in that image processing and an applied voltage become simple and a load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

In the modes shown in FIGS. 9A, 9B, 9C, 9D, 9E and 9F, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. Furthermore, replacement of the magnitude relation of luminance between 1SF and 2SF may separately occur in each region. A region or regions in which the magnitude relation of luminance is replaced may be only the region 1, only the region 2, only the region 3, the region 1 and the region 2, the region 2 and the region 3, the region 3 and the region 1, or the region 1 and the region 2 and the region 3, for example.

Next, another mode of this embodiment mode will be described with reference to FIGS. 10A to 10D. FIGS. 10A to 10D each show an example of a method for distributing the total integrated luminance in one frame into 1SF and 2SF in the case where gray scales that can be displayed are divided into a plurality of regions, three regions, for example, and each subframe can have different characteristics in each region. In particular, a case where an integrated luminance ratio between 1SF and 2SF is equal in each gray scale in two regions out of the three regions, and a change of integrated luminance with respect to gray scale of one of subframes is constant in another region will be described. In addition, a case where an integrated luminance ratio between 1SF and 2SF is equal in each gray scale in every region will also be described.

Figure 10A:
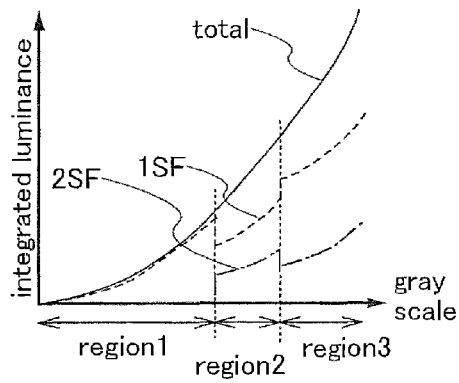
FIGS. 10A to 10D are graphs used for describing a mode of the present invention.

FIG. 10A shows an example of a method for distributing the total integrated luminance in one frame into 1SF and 2SF. Further, a table under the graph shows a feature of each subframe briefly. A feature of 2SF in a region 1 is that a change of integrated luminance with respect to gray scale is constant. A feature of 1SF in the region 1 is that the luminance depends on the total luminance and the luminance of the other subframe. A feature of 1SF in a region 2 and a region 3 and 2SF in the region 2 and the region 3 is that an integrated luminance ratio between 1SF and 2SF is equal in each gray scale. It is preferable that a value of the ratio in the region 2 (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced. Further, it is preferable that a value of the ratio in the region 3 be greater than 0.5 and less than 1. Consequently, a blur of moving images can be efficiently reduced.

Figure 10B:
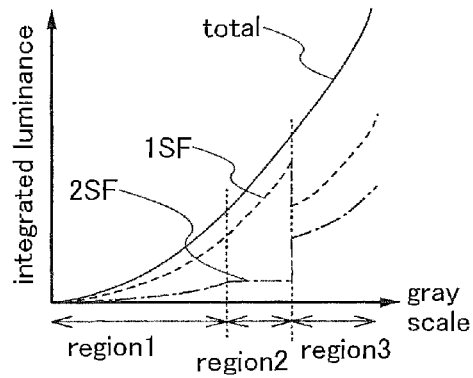

FIG. 10B shows an example of a method for distributing the total integrated luminance in one frame into 1SF and 2SF. Further, a table under the graph shows a feature of each subframe briefly. A feature of 2SF in a region 2 is that a change of integrated luminance with respect to gray scale is constant. A feature of 1SF in the region 2 is that the luminance depends on the total luminance and the luminance of the other subframe. A feature of 1SF in a region 1 and a region 3 and 2SF in the region 1 and the region 3 is that an integrated luminance ratio between 1SF and 2SF is equal in each gray scale. It is preferable that a value of the ratio in the region 1 (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced. Further, it is preferable that a value of the ratio in the region 3 be greater than 0.5 and less than 1. Consequently, a blur of moving images can be efficiently reduced.

Figure 10C:
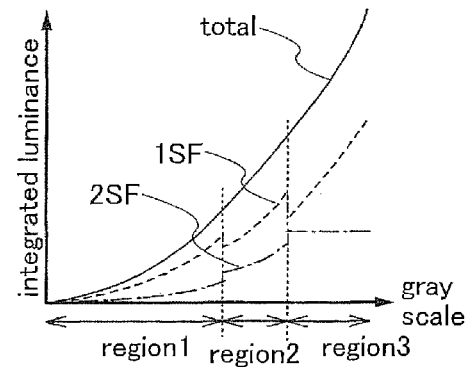

FIG. 10C shows an example of a method for distributing the total integrated luminance in one frame into 1SF and 2SF. Further, a table under the graph shows a feature of each subframe briefly. A feature of 2SF in a region 3 is that a change of integrated luminance with respect to gray scale is constant. A feature of 1SF in the region 3 is that the luminance depends on the total luminance and the luminance of the other subframe. A feature of 1SF in a region 1 and a region 2 and 2SF in the region 1 and the region 2 is that an integrated luminance ratio between 1SF and 2SF is equal in each gray scale. It is preferable that a value of the ratio in the region 1 and the region 2 (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced.

Figure 10D:
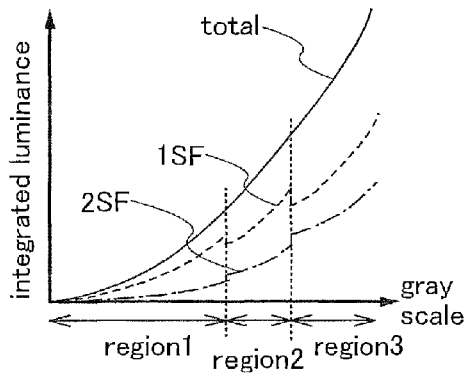

FIG. 10D shows an example of a method for distributing the total integrated luminance in one frame into 1SF and 2SF. Further, a table under the graph shows a feature of each subframe briefly. A feature of 1SF in a region 1, a region 2, and a region 3, and 2SF in the region 1, the region, and the region 3 is that an integrated luminance ratio between 1SF and 2SF is equal in each gray scale. It is preferable that a value of the ratio in the region 1 and the region 2 (a ratio of the smaller luminance to the larger luminance) be greater than 0.1 and less than 0.5. Consequently, the luminance difference between 1SF and 2SF on the lower gray scale side can be increased, and a blur of moving images can be efficiently reduced. It is preferable that a value of the ratio in the region 3 be greater than 0.5 and less than 1. Consequently, a blur of moving images can be efficiently reduced.

A value of the inclination may be a positive value, 0, or a negative value. Differences among these are not described in detail in FIGS. 10A to 10D, and a combination of these can be applied in every region. In the case where the inclination is a positive or negative value and luminance difference between 1SF and 2SF is increased, a blur of moving images can be efficiently reduced. In the case where the inclination is a positive or negative value and luminance difference between 1SF and 2SF is decreased, an advantage in that flickering at the time of image display is reduced can be obtained. Alternatively, in the case where the inclination is 0, an advantage in that image processing and an applied voltage become simple and a load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

As has been described above, a state of luminance at the boundary of regions can be any of: changing discontinuously toward a direction of high luminance; being continuous; or changing discontinuously toward a direction of low luminance, compared to that in an adjacent region on the lower gray scale side. Differences among, these are not described in detail in FIGS. 10A to 10D, and a combination of these can be applied in every region boundary. In the case where the luminance changes discontinuously at the boundary of regions, and as a result, the luminance difference between 1SF and 2SF is increased; a blur of moving images can be efficiently reduced. In the case where the luminance changes discontinuously at the boundary of regions, and as a result, the luminance difference between 1SF and 2SF is decreased; an advantage in that flickering at the time of image display is reduced can be obtained. Alternatively, in the case where the luminance is continuous at the boundary of regions, an advantage in that image processing and an applied voltage become simple and a load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

In the modes shown in FIGS. 10A, 10B, 10C, and 10D, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. Furthermore, replacement of the magnitude relation of luminance between 1SF and 2SF may separately occur in each region. A region or regions in which the magnitude relation of luminance is replaced may be only the region 1, only the region 2, only the region 3, the region 1 and the region 2, the region 2 and the region 3, the region 3 and the region 1, or the region 1 and the region 2 and the region 3, for example.

Figure 11A:
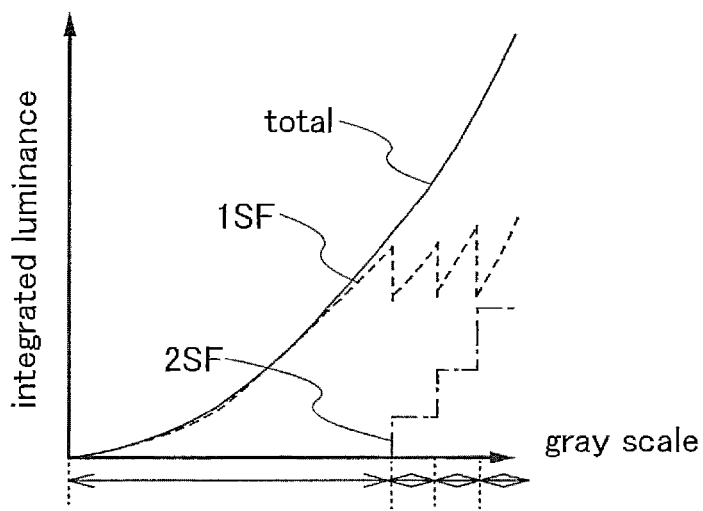
FIGS. 11A and 11B are graphs used for describing a mode of the present invention.
Figure 11B:
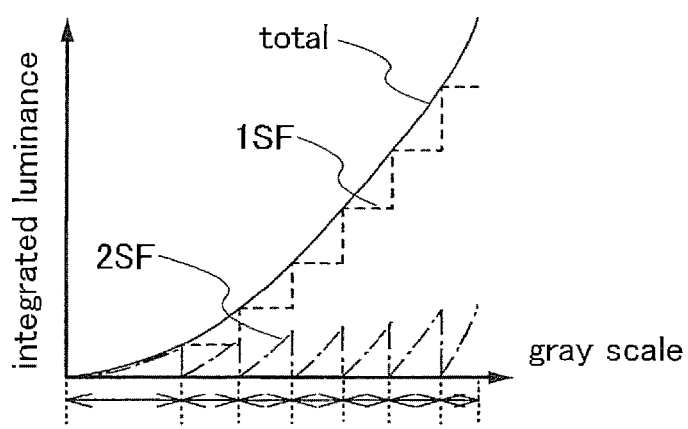

Next, another mode of this embodiment mode will be described with reference to FIGS. 11A and 11B. FIGS. 11A and 11B each show an example of a case where the number of regions into which gray scales that can be displayed are divided is 4 or more. The number of divided regions may be any number, as long as plural kinds of gray scales are included in each region. FIGS. 11A and 11B deal with characteristic examples among them.

FIG. 11A shows an example of a method for distributing the total integrated luminance in one frame into 1SF and 2SF. Features of the method shown in FIG. 11A are that the number of kinds of luminance of an image to be displayed in 2SF are limited to several and that the luminance is increased in stages as a gray scale becomes larger, as well as that an image to be displayed in 2SF is used as a dark image. Furthermore, a gray scale is complemented by using a light image in each region. Consequently, forming image data to display an image to be displayed in 2SF becomes easy, which is advantageous in that a load on a peripheral driving circuit is reduced. In addition, since the kinds of luminance to be displayed in 2SF are decreased when combined with overdriving, which is advantageous in that an overdrive circuit can be simplified. It is preferable that the number of kinds of luminance to be displayed in 2SF be approximately from 14 to 16. In addition, it is preferable that the number of divided gray scales that can be displayed be equal to the number of kinds of luminance to be displayed in SF.

FIG. 11B shows an example of a method for distributing the total integrated luminance in one frame into 1SF and 2SF. Features of the method shown in FIG. 11B are that the number of kinds of luminance of an image to be displayed in 1SF are limited to several and that the luminance is increased in stages as a gray scale becomes larger, as well as that an image to be displayed in 1SF is used as a light image. Furthermore, a gray scale is complemented by using a dark image in each region. Furthermore, the luminance of the dark image is made close to 0 at the boundary of regions. Consequently, forming image data to display an image to be displayed in 1SF becomes easy, which is advantageous in that a load on a peripheral driving circuit is reduced. In addition, since the kinds of luminance to be displayed in 1SF are decreased when combined with overdriving, which is advantageous in that an overdrive circuit can be simplified. Furthermore, since the average luminance of the dark image can be drastically reduced, an effect of reducing a blur in moving images is significant. It is preferable that the number of kinds of luminance to be displayed in 1SF be approximately from 16 to 64. In addition, it is preferable that the number of divided gray scales that can be displayed be equal to the number of kinds of luminance to be displayed in SF. Consequently, a configuration of a D/A converter can be simplified, for example. That is, a digital signal is treated as it is in one of the subframe periods, and the amplitude of an analog signal is decreased (kinds of discrete values are reduced) in the other subframe period, whereby power consumption can be reduced and the circuit size can also be reduced. It is to be noted that, even in the case where an analog signal is treated in both subframe periods, the amplitude of an analog signal is decreased in the both, whereby power consumption can be reduced and the circuit size can also be reduced.

In the modes shown in FIGS. 11A and 11B, 1SF and 2SF are exchangeable, and even when the characteristics of 1SF and 2SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. Furthermore, replacement of the magnitude relation of luminance between 1SF and 2SF may separately occur in each region. A region or regions in which the magnitude relation of luminance is replaced may be only the region 1, only the region 2, only the region 3, the region 1 and the region 2, the region 2 and the region 3, the region 3 and the region 1, or the region 1 and the region 2 and the region 3, for example. This can be similarly applied to the region 4 and regions thereafter.

Next, another mode of this embodiment mode will be described with reference to FIGS. 12A to 12D. FIGS. 12A to 12D show an example in which one frame is divided into three subframes. The number of subframes is not limited, but when it is 3, a particularly beneficial effect can be obtained. Here, a subframe period that is located in the first in one frame period is referred to as 1SF, a subframe period that is located in the second is referred to as 2SF, and a subframe period that is located in the third is referred to as 3SF.

Figure 12A:
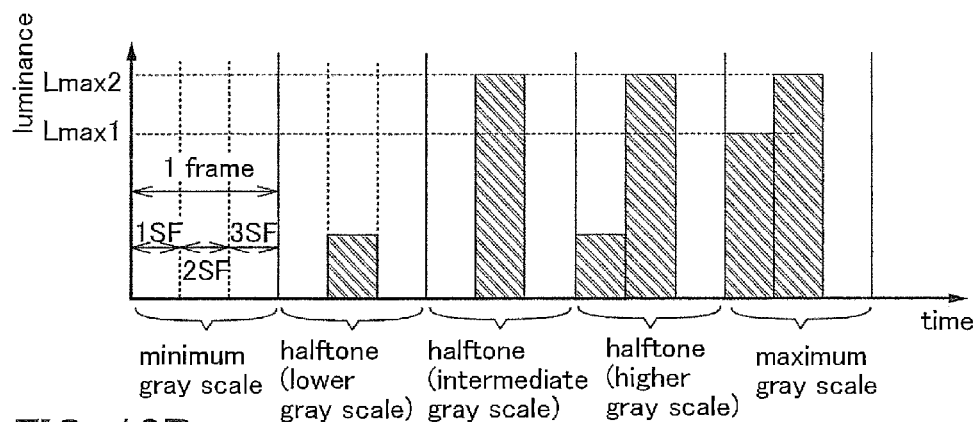
FIGS. 12A to 12D are graphs used for describing a mode of the present invention.
Figure 12B:
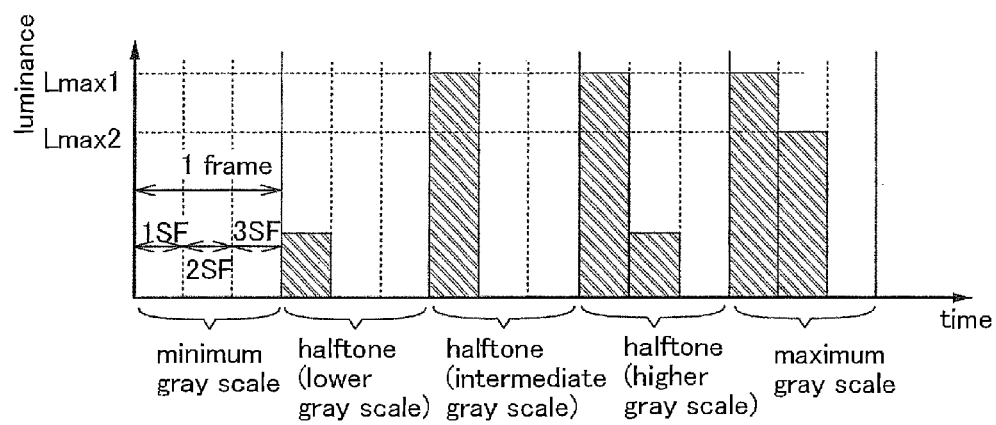

In graphs of FIGS. 12A and 12B, the horizontal axis shows time and the vertical solid lines show boundaries of frames. The vertical dashed lines show boundaries of subframes. The vertical axis shows luminance. That is, FIGS. 12A and 12B show a change of the luminance of a pixel with respect to time over five frames.

Under the horizontal axis, the degree of gray scale in each frame is written. That is, in FIGS. 12A and 12B, a change of the luminance of a pixel with respect to time in the case where a minimum gray scale is displayed first, and then, halftone on the lower gray scale side, halftone of an intermediate degree, halftone on the higher gray scale side, and a maximum gray scale are displayed in this order, is shown.

A feature of the method shown in FIGS. 12A and 12B is that a gray scale is expressed by changing the luminance in 1SF and 2SF and the luminance in 3SF is 0 or very low, whereby a pseudo impulsive driving becomes possible. FIG. 12A shows a case where a light image is displayed in 2SF and a dark image is displayed in 1SF. FIG. 12B shows a case where a light image is displayed in 1SF and a dark image is displayed in 2SF.

Since an effect of improving a blur of moving images can be obtained by making the luminance be 0 or very low in 3SF, Lmax1 and Lmax2 which are the maximum luminance of 1SF and the maximum luminance of 2SF, respectively, are not particularly limited. However, when a dark image is inserted in 1SF, it is preferable that Lmax1 be in a range represented as follows: ($1/2$) Lmax2<Lmax1<($9/10$) Lmax2, as described in Embodiment Mode 1. Furthermore, when a dark image is inserted in 2SF, it is preferable that Lmax2 be in a range represented as follows: ($1/2$) Lmax1<Lmax2<($9/10$) Lmax1.

Figure 12C:
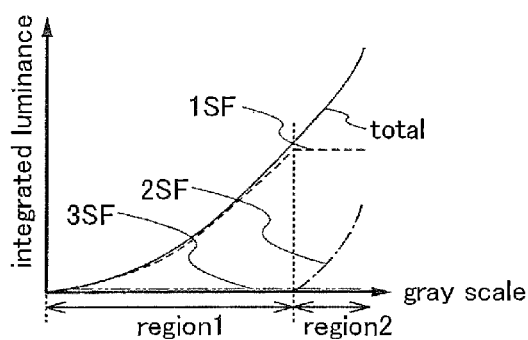

FIG. 12C shows an example of a method for distributing the total integrated luminance in one frame into 1SF, 2SF, and 3SF. Further, a table under the graph shows a feature of each subframe briefly. A feature of 2SF in the region 1 and 1SF in the region 2 is that a change of integrated luminance with respect to gray scale is constant. A feature of 1SF in the region 1 and 2SF in the region 2 is that the luminance depends on the total luminance and the luminance of the other subframe. Here, the luminance of 3SF in the region 1 and the region 2 may be constantly 0. Consequently, a blur of moving images can be effectively reduced in all the regions.

Figure 12D:
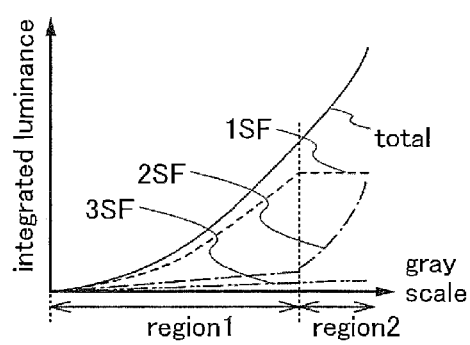

FIG. 12D shows an example of a method for distributing the total integrated luminance in one frame into 1SF, 2SF, and 3SF. Further, a table under the graph shows a feature of each subframe briefly. A feature of 2SF in the region 1 and 1SF in the region 2 is that a change of integrated luminance with respect to gray scale is constant. A feature of 1SF in the region 1 and 2SF in the region 2 is that the luminance depends on the total luminance and the luminance of the other subframe. Further, the inclination of luminance of 3SF in the region 1 and the region 2 may be constantly a small value. When the maximum luminance of 3SF is Lmax3, it is preferable that Lmax3 be less than or equal to $1/10$ of the maximum luminance of 1SF and the maximum luminance of 2SF. Consequently, a blur of moving images can be effectively reduced in all the gray scale regions.

A value of the inclination may be a positive value, 0, or a negative value. Differences among these are not described in detail in FIGS. 12A to 12D, and a combination of these can be applied in every region. In the case where the inclination is a positive or negative value and luminance difference between 1SF and 2SF is increased, a blur of moving images can be efficiently reduced. In the case where the inclination is a positive or negative value and luminance difference between 1SF and 2SF is decreased, an advantage in that flickering at the time of image display is reduced can be obtained. Alternatively, in the case where the inclination is 0, an advantage in that image processing and an applied voltage become simple and a load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

As has been described above, a state of luminance at the boundary of regions can be any of: changing discontinuously toward a direction of high luminance; being continuous; or changing discontinuously toward a direction of low luminance, compared to that in an adjacent region on the lower gray scale side. Differences among these are not described in detail in FIGS. 12A to 12D, and a combination of these can be applied in every region boundary. In the case where the luminance changes discontinuously at the boundary of regions, and as a result, the luminance difference between 1SF and 2SF is increased; a blur of moving images can be efficiently reduced. In the case where the luminance changes discontinuously at the boundary of regions, and as a result, the luminance difference between 1SF and 2SF is decreased; an advantage in that flickering at the time of image display is reduced can be obtained. Alternatively, in the case where the luminance is continuous at the boundary of regions, an advantage in that image processing and an applied voltage become simple and a load on a peripheral driving circuit is reduced can be obtained. In addition, a phenomenon in which an unnatural contour is generated can be reduced. Furthermore, since the maximum luminance in 1SF and 2SF can be lowered, power consumption can be reduced.

In the modes shown in FIGS. 12A, 12B, 12C, and 12D, 1SF, 2SF and 3SF are exchangeable, and even when the characteristics of 1SF, 2SF and 3SF are exchanged, a similar effect can be obtained. Although the luminance in 1SF is higher than the luminance in 2SF, the present invention is not limited to this. The luminance in 1SF may be lower than the luminance in 2SF. However, in the case where the total luminance is nonlinear, it is desirable that the luminance in 2SF be lower than that in 1SF since the gray scale can be controlled more easily. The magnitude relation of luminance between 1SF and 2SF may be replaced. Furthermore, a region or regions in which the magnitude relation of luminance between 1SF and 2SF is replaced may be only the region 1, only the region 2, or the region 1 and the region 2.

All the modes described in this embodiment mode may be carried out in combination with overdriving. Consequently, response speed of a liquid crystal display device can be increased and the quality of moving images can be improved.

All the modes described in this embodiment mode may be carried out as a liquid crystal display device combined with a scanning backlight. Consequently, the average luminance of a backlight can be reduced, whereby power consumption can be reduced.

All the modes described in this embodiment mode may be carried out in combination with high frequency driving. Consequently, the quality of moving images can further be improved.

All the modes described in this embodiment mode may be carried out in combination with a driving method in which an objective voltage is applied to a display element by operating a potential of a common line. Consequently, frequency of writing a video signal into a pixel is decreased, so that power that is consumed when the video signal is written into the pixel can be reduced.

All the modes described in this embodiment mode may be carried out in combination with a display element driven by a current such as an organic EL element. Consequently, a video signal current can be increased and a writing time can be reduced.

All the modes described in this embodiment mode may be carried out in combination with interlace scanning. Consequently, operating frequency of a peripheral driving circuit can be decreased and power consumption can be reduced. This is particularly effective in the case of a dark image with many pixels in a non-lighting state or in the case of a light image with many pixels emitting light with the maximum luminance. This is because a decrease in resolution due to the interlace scanning is small for an image with a small change of gray scale.

All the modes described in this embodiment mode may be carried out in combination with a D/A converter circuit which can change a reference potential. Consequently, efficiency of the D/A converter circuit can be improved. It is particularly effective when the reference potential can be changed so as to be different between in a subframe displaying a light image and in a subframe displaying a dark image. This is because an average value of a potential of a video signal which is required is different between when a light image is displayed and when a dark image is displayed.

It is to be noted that this embodiment mode can be carried out freely combined with any of the other embodiment modes.

Embodiment Mode 3

In this embodiment mode, a pixel structure of a display device will be described. In particular, a pixel structure of a liquid crystal display device will be described.

Figure 19A:
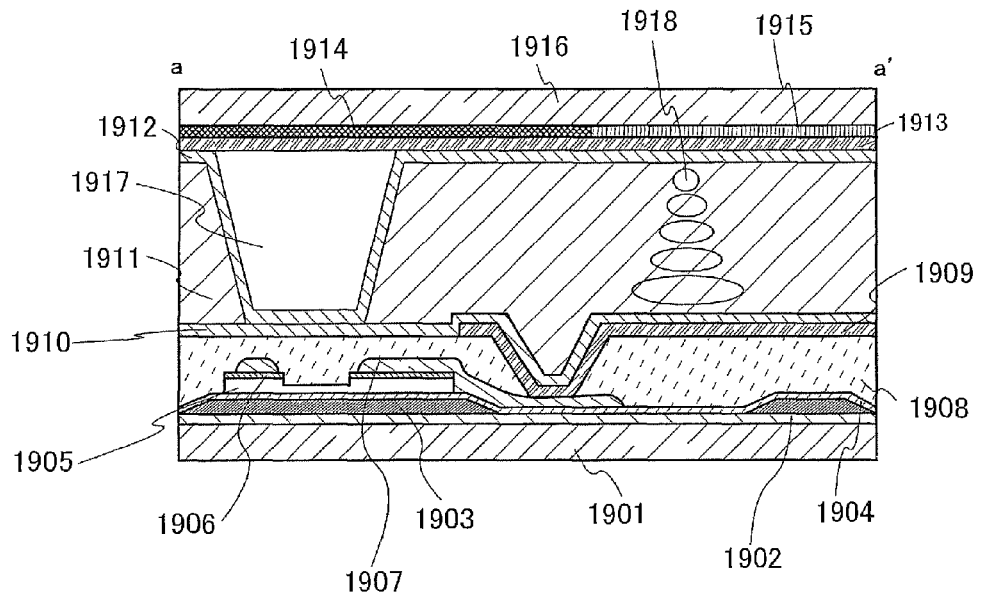
FIGS. 19A and 19B are views used for describing a structure of a display portion of a display device of the present invention.
Figure 19B:
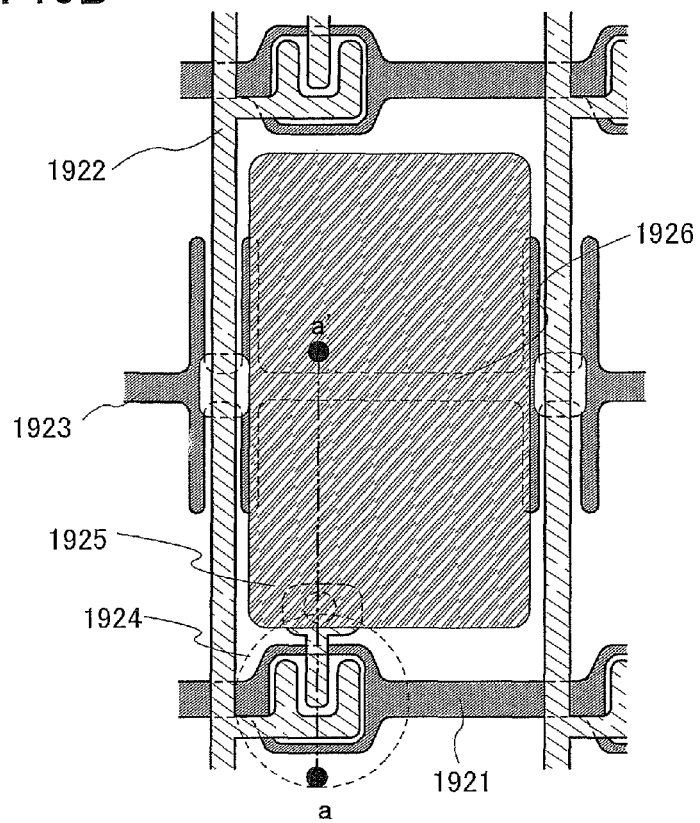

FIGS. 19A and 19B are a cross-sectional view and a top view, respectively, showing a pixel structure of a liquid crystal display device in which a so-called TN mode is combined with a thin film transistor (TFT). FIG. 19A is a cross-sectional view of a pixel, and FIG. 19B is a top view of the pixel. Further, the cross-sectional view of the pixel shown in FIG. 19A corresponds to a line segment a-a' in the top view of the pixel shown in FIG. 19B. By using a liquid crystal display device having the pixel structure shown in FIGS. 19A and 19B, the liquid crystal display device can be manufactured at low costs. Furthermore, by using the liquid crystal display device having the pixel structure shown in FIGS. 19A and 19B in combination with other embodiment modes such as Embodiment Mode 1 and Embodiment Mode 2, a liquid crystal display device in which the quality of moving images is improved can be realized at low costs.

A pixel structure of a TN-mode liquid crystal display device will be described with reference to FIG. 19A. The liquid crystal display device includes a basic portion that displays images, which is called a liquid crystal panel. The liquid crystal panel is manufactured in the following way: two processed substrates are attached to each other with a gap of several and a space between the two substrates is filled with a liquid crystal material and sealed. In FIG. 19A, the two substrates correspond to a first substrate 1901 and a second substrate 1916. A TFT and a pixel electrode may be formed over the first substrate; and a light shielding film 1914, a color filter 1915, a fourth conductive layer 1913, a spacer 1917, and a second orientation film 1912 may be provided for the second substrate.

It is to be noted that a TFT need not necessarily be formed over the first substrate 1901. In the case where a TFT is not formed, the number of steps is reduced, so that the manufacturing costs can be reduced. In addition, since the structure becomes simple, a yield can be improved. On the other hand, in the case where a TFT is formed, a larger-sized display device can be obtained.

The TFT shown in FIGS. 19A and 19B is a bottom gate TFT using an amorphous semiconductor, which has an advantage in that it can be manufactured by using a large-area substrate at low costs. However, the present invention is not limited to this. As for structures of TFT which can be used in the present invention, there are a channel-etch type, a channel-protect type, and the like for a bottom gate TFT. Alternatively, a top gate type may be used. Furthermore, not only the amorphous semiconductor but also a polycrystalline semiconductor may be used.

It is to be noted that the light shielding film 1914 need not necessarily be formed over the second substrate 1916. In the case where the light shielding film 1914 is not formed, the number of steps is reduced, so that the manufacturing costs can be reduced. In addition, since the structure becomes simple, a yield can be improved. On the other hand, in the case where the light shielding film 1914 is formed, a display device with little light leakage at the time of black display can be obtained.

It is to be noted that the color filter 1915 need not necessarily be formed over the second substrate 1916. In the case where the color filter 1915 is not formed, the number of steps is reduced, so that the manufacturing costs can be reduced. In addition, since the structure becomes simple, a yield can be improved. On the other hand, in the case where the color filter 1915 is formed, a display device capable of color display can be obtained.

It is to be noted that spherical spacers may be dispersed instead of providing the spacer 1917 for the second substrate 1916. In the case where the spherical spacers are dispersed, the number of steps is reduced, so that the manufacturing costs can be reduced. In addition, since the structure becomes simple, a yield can be improved. On the other hand, in the case where the spacer 1917 is formed, there is no variation of spacer's position; therefore, the distance between the two substrates can be uniform and a display device with little display unevenness can be obtained.

Next, a process to be performed on the first substrate 1901 will be described. A substrate having a light-transmitting property is preferably used as the first substrate 1901. For example, a quartz substrate, a glass substrate, or a plastic substrate may be used. Alternatively, the first substrate 1901 may be a light shielding substrate such as a semiconductor substrate or an SOI (Silicon on Insulator) substrate.

First, a first insulating film 1902 may be formed over the first substrate 1901. The first insulating film 1902 may be an insulating film such as a silicon oxide film, a silicon nitride film, or a silicon oxynitride film ($SiO_xN_y$) film. Alternatively, an insulating film having a stacked structure in which at least two of these films are combined may be used. In the case where the first insulating film 1902 is formed, a change in the properties of the TFT due to an impurity from the substrate which affects a semiconductor layer can be prevented; therefore, a display device with high reliability can be obtained. On the other hand, in the case where the first insulating film 1902 is not formed, the number of steps is reduced, so that the manufacturing costs can be reduced. In addition, since the structure is simple, a yield can be improved.

Next, a first conductive layer 1903 is formed over the first substrate 1901 or the first insulating film 1902. The first conductive layer 1903 may be formed with a processed shape. The step of processing the shape may be as follows. First, the first conductive layer is formed over the entire surface. At this time, a film formation apparatus such as a sputtering apparatus or a CVD apparatus may be used. Next, a photosensitive resist material is formed over the entire surface of the first conductive layer that is formed over the entire surface. Next, the resist material is exposed to light in accordance with an intended shape by a photolithography method, a laser drawing method, or the like. Next, either part of the resist material which is exposed to light or part of the resist material which is not exposed to light is removed by etching, whereby a mask for processing the shape of the first conductive layer 1903 can be obtained. After that, a part of the first conductive layer 1903 is removed by etching in accordance with the formed mask pattern, whereby the first conductive layer 1903 can be processed into a desired pattern. As for methods for etching the part of the first conductive layer 1903, there are a chemical method (wet etching) and a physical method (dry etching); therefore, the method is appropriately selected considering the properties of the material of the first conductive layer 1903 and the property of the materials used under the first conductive layer 1903. As a material used for the first conductive layer 1903, Mo, Ti, Al, Nd, Cr, or the like is preferable. Alternatively, a stacked structure including these may be used. Further alternatively, the first conductive layer 1903 may be formed as a single layer or stacked structure of an alloy of these.

Next, a second insulating film 1904 is formed. At this time, a film formation apparatus such as a sputtering apparatus or a CVD apparatus may be used. As a material used for the second insulating film 1904, a thermal oxidation film, a silicon oxide film, a silicon nitride film, a silicon oxynitride film, or the like is preferable. Alternatively, a stacked structure including these may be used. It is particularly preferable that part of the second insulating film 1904 which is in contact with a first semiconductor layer 1905 be a silicon oxide film. This is because, when a silicon oxide film is used, trap level in an interface with the semiconductor film 1905 is decreased. When the first conductive layer 1903 is formed of Mo, it is preferable that part of the second insulating film 1904 which is in contact with the first conductive layer 1903 be a silicon nitride film. This is because a silicon nitride film does not oxidize Mo.

Next, the first semiconductor layer 1905 is formed. It is preferable that a second semiconductor layer 1906 be formed consecutively after that. The first semiconductor layer 1905 and the second semiconductor layer 1906 may be formed with processed shapes. As for the method for processing the shapes, the above-described photolithography method, for example, is preferable. As a material used for the first semiconductor layer 1905, silicon, silicon germanium, or the like is preferable. Further, as a material used for the second semiconductor layer 1906, silicon that contains phosphorus, or the like is preferable.

Next, a second conductive layer 1907 is formed. It is preferable that a sputtering method or a printing method be used at this time. A material used for the second conductive layer 1907 may have transparency or reflectivity. In the case where the second conductive layer 1907 has transparency, an indium tin oxide (ITO) film formed by mixing tin oxide into indium oxide, an indium tin silicon oxide film formed by mixing silicon oxide into indium tin oxide (ITO), an indium zinc oxide (IZO) film formed by mixing zinc oxide into indium oxide, a zinc oxide film, or a tin oxide film can be used. It is to be noted that IZO is a transparent conductive material formed by sputtering using a target of ITO in which 2 to 20 wt % of zinc oxide is mixed. On the other hand, in the case where the second conductive layer 1907 has reflectivity, Ti, Mo, Ta, Cr, W, Al, or the like can be used. Furthermore, a two-layer structure in which Al and Ti, Mo, Ta, Cr, or W are stacked, a three-layer structure in which Al is sandwiched by metals such as Ti, Mo, Ta, Cr, and W may be employed. The second conductive layer 1907 may be formed with a processed shape. As for the method for processing the shape, the above-described photolithography method, for example, is preferable. In addition, it is preferable that the etching be performed by dry etching. The dry etching may be performed by a dry etching apparatus using high density plasma source such as ECR (Electron Cycrotron Resonance) or ICP (Inductive Coupled Plasma).

A wiring and an electrode are formed so as to include one or more elements selected from a group including aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), tin (Sn), and oxygen (O); a compound or an alloy material containing one or more elements selected from the above group (for example, indium tin oxide (ITO), indium zinc oxide (IZO), indium tin oxide to which silicon oxide is added, zinc oxide, aluminum-neodymium (Al—Nd), magnesium-silver (Mg—Ag), or the like); a substance in which these compounds are combined; or the like. Alternatively, the wiring and the electrode are formed so as to include a compound of these and silicon (silicide) (for example, aluminum silicon, molybdenum silicon, nickel silicide, or the like), or a compound of these and nitrogen (for example, titanium nitride, tantalum nitride, molybdenum nitride, or the like). It is to be noted that silicon (Si) may contain a large amount of n-type impurity (phosphorus or the like) or p-type impurity (boron or the like). When silicon contains such impurities, its conductivity increases and it behaves in a similar way to a general conductor; therefore, it can be used easily as a wiring and an electrode. Silicon may be single crystal, polycrystal (polysilicon), or amorphous (amorphous silicon). When single crystal silicon or polycrystal silicon is used, the resistance can be reduced. When amorphous silicon is used, the manufacturing process becomes simple. Since the conductivity of aluminum or silver is high, signal delay can be reduced; and since aluminum and silver are easy to be etched, a minute processing can be performed. In addition, since the conductivity of copper is high, signal delay can be reduced. Molybdenum is desirable since it can be manufactured without a problem in that a defect is generated in the material even when it is in contact with an oxide semiconductor such as ITO or IZO, or silicon; it can be etched easily; and its heat resistance is high. Titanium is desirable since it can be manufactured without a problem in that a defect is generated in the material even when it is in contact with an oxide semiconductor such as ITO or IZO, or silicon; and its heat resistance is high. Tungsten is preferable since its heat resistance is high. Neodymium is preferable since its heat resistance is high. In particular, when an alloy of neodymium and aluminum is used, the heat resistance is increased and a hillock is hardly generated in aluminum; therefore, it is desirable. Silicon is preferable since it can be formed concurrently with a semiconductor layer included in a transistor and its heat resistance is high. Indium tin oxide (ITO), indium zinc oxide (IZO), indium tin oxide to which silicon oxide is added, zinc oxide, and silicon (Si) are desirable since they have a light-transmitting property so that they can be used for a portion where light is to be transmitted. For example, they can be used as a pixel electrode or a common electrode.

These materials may form the wiring and the electrode as a single layer or a multilayer structure. When a single-layer structure is employed, the manufacturing process can be simplified, the number of days taken for the process can be decreased, and the costs can be reduced. On the other hand, when a multilayer structure is employed, a merit of each material is utilized and a demerit of each material is reduced, whereby a wiring and an electrode with a good performance can be formed. For example, when a material with low resistance (such as aluminum) is included in the multi-layer structure, the resistance of the wiring can be lowered. Furthermore, when a material with high heat resistance is included in the multi-layer structure, for example, when a material whose heat resistance is low but which has other merits is sandwiched by a material with high resistance in the stacked structure, the heat resistance of the wiring or electrode as a whole can be increased. For example, a stacked structure in which a layer containing aluminum is sandwiched by layers containing molybdenum or titanium is desirable. Furthermore, when the wiring or the electrode has some portion that is in direct contact with a wiring or an electrode formed of a different material, an adverse effect may be brought to each other. For example, one material enters into the other material to change the property, whereby the original object cannot be achieved, or a problem is caused during the manufacture and the manufacture does not proceed normally. In such a case, the problem can be solved by sandwiching one layer by other layers or covering one layer with another layer. For example, in the case where indium tin oxide (ITO) and aluminum are to be in contact with each other, it is desirable that titanium or molybdenum be interposed therebetween. Further, in the case where silicon and aluminum are to be in contact with each other, it is desirable that titanium or molybdenum be interposed therebetween.

Next, a channel region of a TFT is formed. At this time, etching of the second semiconductor layer 1906 may be performed using the second conductive layer 1907 as a mask. Consequently, the number of masks can be reduced, so that the manufacturing costs can be reduced. By performing etching of the second semiconductor layer 1906 that has conductivity, the second semiconductor layer 1906 is selectively removed. As a result, the first semiconductor layer 1905 which has been overlapped with the removed second semiconductor layer 1906 becomes a channel region. It is to be noted that there may be a case where part of the first semiconductor layer 1905 is etched when the second semiconductor layer 1906 is etched. It is to be noted that, without consecutively forming the first semiconductor layer 1905 and the second semiconductor layer 1906, a film to be a stopper may be formed and patterned in a portion to be a channel region of the TFT after the formation of the first semiconductor layer 1905 and the second semiconductor layer 1906 may be formed thereafter. Consequently, the channel region of the TFT can be formed without using the second conductive layer 1907 as a mask; therefore, a degree of freedom of layout pattern is increased, which is advantageous. In addition, since the first semiconductor layer 1905 is not etched when the second semiconductor layer 1906 is etched; therefore, a channel region of the TFT can be surely formed without causing an etching defect.

Next, a third insulating film 1908 is formed. It is preferable that the third insulating film 1908 have a light-transmitting property. As a material used for the third insulating film 1908, an inorganic material (silicon oxide, silicon nitride, silicon oxynitride, or the like), an organic compound material with low permittivity (a photosensitive or nonphotosensitive organic resin material), or the like is preferable. Alternatively, a material that contains siloxane may be used. Siloxane is a material which has a skeleton structure that contains a bond of silicon (Si) and oxygen (O). As a substituent, an organic group containing at least hydrogen (e.g., an alkyl group or aromatic hydrocarbon) can be used. As a substituent, a fluoro group may also be used. Alternatively, as a substituent, an organic group containing at least hydrogen and a fluoro group may be used. The third insulating film 1908 may have a stacked structure. The third insulating film 1908 may be formed with a processed shape. As for the method for processing the shape, the above-described photolithography method, for example, is preferable. At this time, by etching the second insulating film 1904 concurrently, a contact hole reaching the first conductive layer 1903 can be formed as well as a contact hole reaching the second conductive layer 1907. It is preferable that the surface of the third insulating film 1908 be as flat as possible. This is because, when the surface to be in contact with liquid crystal is uneven, alignment of liquid crystal molecules is affected.

Next, a third conductive layer 1909 is formed. It is preferable that a sputtering method or a printing method be used at this time. A material used for the third conductive layer 1909 may have transparency or reflectivity, in the same way as the second conductive layer 1907. A material which can be used for the third conductive layer 1909 may be similar to that of the second conductive layer 1907. In addition, the third conductive layer 1909 may be formed with a processed shape. The method for processing the shape of the third conductive layer 1909 may be similar to that of the second conductive layer 1907.

Next, a first orientation film 1910 is formed. As the orientation film 1910, a polymer film such as polyimide can be used. After the first orientation film 1910 is formed, rubbing may be performed so as to control the orientation of liquid crystal molecules. Rubbing is a step for forming stripes on an orientation film by rubbing the orientation film with a cloth. By performing the rubbing, the orientation film can be provided with an orientation property.

The first substrate 1901 that is manufactured as described above is attached to the second substrate 1916 provided with the light shielding film 1914, the color filter 1915, the fourth conductive layer 1913, the spacer 1917, and the second orientation film 1912, by a sealant, with a gap of several μm, and then, a space between the two substrates is filled with a liquid crystal material 1911 and sealed; whereby the liquid crystal panel can be manufactured. It is to be noted that, in the TN-mode liquid crystal panel as shown in FIGS. 19A and 19B, the fourth conductive layer 1913 may be formed over the entire surface of the second substrate 1916.

Next, a feature of the TN-mode liquid crystal panel shown in FIGS. 19A and 19B will be described. The liquid crystal molecule 1918 shown in FIG. 19A is a long and slim molecule having a major axis and a miner axis. In FIG. 19A, the direction of each liquid crystal molecule 1918 is expressed by its length. That is, the direction of the major axis of the liquid crystal molecule 1918 which is expressed as a long molecule is parallel to the page; and as the liquid crystal molecule 1918 is expressed to be shorter, the direction of the major axis of the liquid crystal molecule becomes closer to the normal line direction of the page. That is, among the liquid crystal molecules 1918 shown in FIG. 19A, the direction of the major axis of the one which is close to the first substrate 1901 and the direction of the major axis of the one which is close to the second substrate 1916 are different from each other by 90 degrees, and the directions of the major axes of liquid crystal molecules therebetween are arranged so as to link the above two directions smoothly. In other words, the liquid crystal molecules 1918 shown in FIG. 19A are aligned to be twisted 90 degrees between the first substrate 1901 and the second substrate 1916.

Next, an example of a layout of a pixel of a TN-mode liquid crystal display device will be described with reference to FIG. 19B. The pixel of the TN-mode liquid crystal display device may include a scan line 1921, a video signal line 1922, a capacitor line 1923, a TFT 1924, a pixel electrode 1925, and a pixel capacitor 1926.

The scan line 1921 is electrically connected to a gate electrode of the TFT 1924; therefore, it is preferable that the scan line 1921 be constituted of the first conductive layer 1903.

The video signal line 1922 is electrically connected to a source electrode or drain electrode of the TFT 1924; therefore, it is preferable that the video signal line 1922 be constituted of the second conductive layer 1907. Furthermore, since the scan line 1921 and the video signal line 1922 are arranged in a matrix, it is preferable that the scan line 1921 and the video signal line 1922 be formed of conductive layers different from each other, at least.

The capacitor line 1923 is a wiring arranged so as to be parallel to the pixel electrode 1925 for forming the pixel capacitor 1926, and it is preferable that the capacitor line 1923 be constituted of the first conductive layer 1903. The capacitor line 1923 may be extended along the video signal line 1922 so as to surround the video signal line 1922, as shown in FIG. 19B. Consequently, a cross talk, which is a phenomenon in which a potential of an electrode, which is supposed to be held, is changed accompanied by a potential change of the video signal line 1922, can be reduced. In order to reduce cross capacitance with the video signal line 1922, the first semiconductor layer 1905 may be provided in a cross region of the capacitor line 1923 and the video signal line 1922, as shown in FIG. 19B.

The TFT 1924 operates as a switch for making the video signal line 1922 and the pixel electrode 1925 conductive. As shown in FIG. 19B, one of a source region or drain region of the TFT 1924 may be arranged so as to surround the other one of the source region or drain region of the TFT 1924. Consequently, a wide channel width can be obtained even in a small area and the switching capability can be increased. The gate electrode of the TFT 1924 may be arranged so as to surround the first semiconductor layer 1905, as shown in FIG. 19B.

The pixel electrode 1925 is electrically connected to one of the source electrode or drain electrode of the TFT 1924. The pixel electrode 1925 is an electrode for giving a signal voltage which is transmitted by the video signal line 1922 to the liquid crystal element. In addition, the pixel electrode 1925 and the capacitor line 1923 may form the pixel capacitor 1926 together. Consequently, the pixel electrode 1925 can also have a function of holding the signal voltage which is transmitted by the video signal line 1922. The pixel electrode 1925 may be rectangular as shown in FIG. 19B. With this shape, an aperture ratio of the pixel can be increased and efficiency of the liquid crystal display device can be improved. Furthermore, in the case where the pixel electrode 1925 is formed using a material having transparency, a transmissive liquid crystal display device can be obtained. A transmissive liquid crystal display device can display images with high color reproducibility and high image quality. Alternatively, in the case where the pixel electrode 1925 is formed using a material having reflectivity, a reflective liquid crystal display device can be obtained. A reflective liquid crystal display device has high visibility in a bright environment such as outside. In addition, since a backlight is not necessary, the power consumption can be drastically reduced. It is to be noted that, in the case where the pixel electrode 1925 is formed by using both a material having transparency and a material having reflectivity, a semi-transmissive liquid crystal display device which has advantages of the both can be obtained. In the case where the pixel electrode 1925 is formed using a material having reflectivity, the surface of the pixel electrode 1925 may be uneven. When the surface is uneven, light is reflected diffusely, and an advantage in that angular dependency of intensity distribution of reflected light is decreased can be obtained. In other words, a reflective liquid crystal display device whose luminance is uniform regardless of the angle where it is seen can be obtained.

Figure 20A:
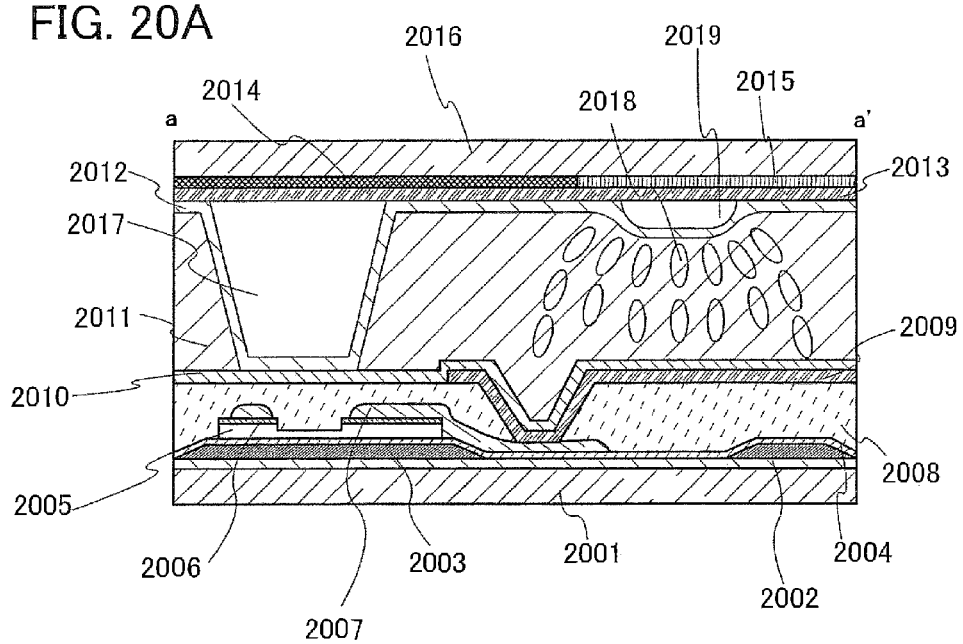
FIGS. 20A and 20B are views used for describing a structure of a display portion of a display device of the present invention.
Figure 20B:
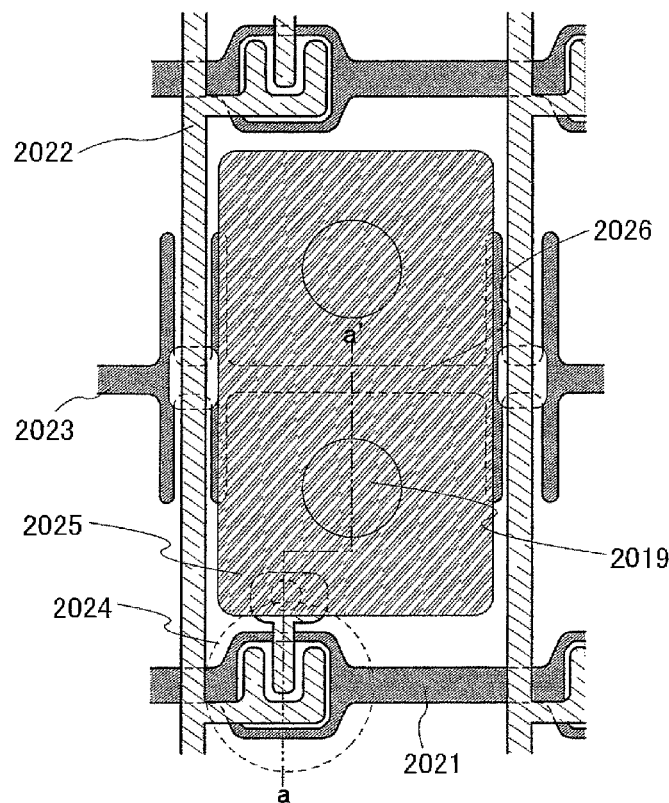

Next, a VA (Vertical Alignment) mode liquid crystal display device will be described with reference to FIGS. 20A and 20B. FIGS. 20A and 20B are a cross-sectional view and a top view, respectively, showing a pixel structure of a VA-mode liquid crystal display device, specifically, a pixel of a so-called MVA (Multi-domain Vertical Alignment) mode in which an orientation-controlling projection is used such that liquid crystal molecules are controlled to have various directions, and that the view angle is widened. FIG. 20A is a cross-sectional view of a pixel, and FIG. 20B is a top view of the pixel. Further, the cross-sectional view of the pixel shown in FIG. 20A corresponds to a line segment a-a' in the top view of the pixel shown in FIG. 20B. By using a liquid crystal display device having the pixel structure shown in FIGS. 20A and 20B, a liquid crystal display device with a wide view angle, a high response speed, and a high contrast can be obtained. Furthermore, by combining a liquid crystal display device having the pixel structure shown in FIGS. 20A and 20B with other embodiment modes such as Embodiment Mode 1 and Embodiment Mode 2, a liquid crystal display device with improved quality of moving images, a wide view angle, a high response speed, and a high contrast can be realized.

A pixel structure of an MVA-mode liquid crystal display device will be described with reference to FIG. 20A. The liquid crystal display device includes a basic portion that displays images, which is called a liquid crystal panel. The liquid crystal panel is manufactured in the following way: two processed substrates are attached to each other with a gap of several μm, and a space between the two substrates is filled with a liquid crystal material and sealed. In FIG. 20A, the two substrates correspond to a first substrate 2001 and a second substrate 2016. A TFT and a pixel electrode may be formed over the first substrate; and a light shielding film 2014, a color filter 2015, a fourth conductive layer 2013, a spacer 2017, a second orientation film 2012, and an orientation-controlling projection 2019 may be provided for the second substrate.

It is to be noted that a TFT need not necessarily be formed over the first substrate 2001. In the case where a TFT is not formed, the number of steps is reduced, so that the manufacturing costs can be reduced. In addition, since the structure becomes simple, a yield can be improved. On the other hand, in the case where a TFT is formed, a larger-sized display device can be obtained.

The TFT shown in FIGS. 20A and 20B is a bottom gate TFT using an amorphous semiconductor, which has an advantage in that it can be manufactured by using a large-area substrate at low costs. However, the present invention is not limited to this. As for structures of TFT which can be used in the present invention, there are a channel-etch type, a channel-protect type, and the like for a bottom gate TFT. Alternatively, a top gate type may be used. Furthermore, not only the amorphous semiconductor but also a polycrystalline semiconductor may be used.

It is to be noted that the light shielding film 2014 need not necessarily be formed over the second substrate 2016. In the case where the light shielding film 2014 is not formed, the number of steps is reduced, so that the manufacturing costs can be reduced. In addition, since the structure becomes simple, a yield can be improved. On the other hand, in the case where the light shielding film 2014 is formed, a display device with little light leakage at the time of black display can be obtained.

It is to be noted that the color filter 2015 need not necessarily be formed over the second substrate 2016. In the case where the color filter 2015 is not formed, the number of steps is reduced, so that the manufacturing costs can be reduced. In addition, since the structure becomes simple, a yield can be improved. On the other hand, in the case where the color filter 2015 is formed, a display device capable of color display can be obtained.

It is to be noted that spherical spacers may be dispersed instead of providing the spacer 2017 for the second substrate 2016. In the case where the spherical spacers are dispersed, the number of steps is reduced, so that the manufacturing costs can be reduced. In addition, since the structure becomes simple, a yield can be improved. On the other hand, in the case where the spacer 2017 is formed, there is no variation of spacer's position; therefore, the distance between the two substrates can be uniform and a display device with little display unevenness can be obtained.

Next, as for a process to be performed on the first substrate 2001, the method described with reference to FIGS. 19A and 19B may be used; therefore, the description is omitted. Here, the first substrate 2001, a first insulating film 2002, a first conductive layer 2003, a second insulating film 2004, a first semiconductor layer 2005, a second semiconductor layer 2006, a second conductive layer 2007, a third insulating film 2008, a third conductive layer 2009, and a first orientation film 2010 correspond to the first substrate 1901, the first insulating film 1902, the first conductive layer 1903, the second insulating film 1904, the first semiconductor layer 1905, the second semiconductor layer 1906, the second conductive layer 1907, the third insulating film 1908, the third conductive layer 1909, and the first orientation film 1910 in FIG. 19A, respectively. Although not shown in the view, an orientation-controlling projection may be provided also on the first substrate side. Consequently, orientation of liquid crystal molecules can be controlled more surely. In addition, the first orientation film 2010 and the second orientation film 2012 may be vertical alignment films. Consequently, liquid crystal molecules 2018 can be aligned vertically.

The first substrate 2001 that is manufactured as described above is attached to the second substrate 2016 provided with the light shielding film 2014, the color filter 2015, the fourth conductive layer 2013, the spacer 2017, and the second orientation film 2012, by a sealant, with a gap of several μm, and then, a space between the two substrates is filled with a liquid crystal material 2011 and sealed; whereby the liquid crystal panel can be manufactured. It is to be noted that, in the MVA-mode liquid crystal panel as shown in FIGS. 20A and 20B, the fourth conductive layer 2013 may be formed over the entire surface of the second substrate 2016. Furthermore, the orientation-controlling projection 2019 may be formed so as to be in contact with the fourth conductive layer 2013. The shape of the orientation-controlling projection 2019 is not limited, but a shape with a smooth curve is preferable. When the orientation-controlling projection 2019 is shaped in this way, the orientations of the adjacent liquid crystal molecules 2018 are extremely close to each other, and the orientation defect can be reduced. Furthermore, a defect in which the second orientation film 2012 is cut off by the orientation-controlling projection 2019 can be reduced.

Next, a feature of the pixel structure of the MVA-mode liquid crystal panel shown in FIGS. 20A and 20B will be described. The liquid crystal molecule 2018 shown in FIG. 20A is a long and slim molecule having a major axis and a minor axis. In FIG. 20A, the direction of each liquid crystal molecule 2018 is expressed by its length. That is, the direction of the major axis of the liquid crystal molecule 2018 which is expressed as a long molecule is parallel to the page; and as the liquid crystal molecule 2018 is expressed to be shorter, the direction of the major axis of the liquid crystal molecule becomes closer to the normal line direction of the page. That is, the liquid crystal molecules 2018 shown in FIG. 20A are aligned such that the direction of the major axis accords with the direction of the normal line of the orientation film. Accordingly, the liquid crystal molecules 2018 in a portion where the orientation-controlling projection 2019 is placed are aligned radially from the orientation-controlling projection 2019 as a center. With this state, a liquid crystal display device having a wide view angle can be obtained.

Next, an example of a layout of a pixel of an MVA-mode liquid crystal display device will be described with reference to FIG. 20B. The pixel of the MVA-mode liquid crystal display device may include a scan line 2021, a video signal line 2022, a capacitor line 2023, a TFT 2024, a pixel electrode 2025, a pixel capacitor 2026, and an orientation-controlling projection 2019.

The scan line 2021 is electrically connected to a gate electrode of the TFT 2024; therefore, it is preferable that the scan line 2021 be constituted of the first conductive layer 2003.

The video signal line 2022 is electrically connected to a source electrode or drain electrode of the TFT 2024; therefore, it is preferable that the video signal line 2022 be constituted of the second conductive layer 2007. Furthermore, since the scan line 2021 and the video signal line 2022 are arranged in a matrix, it is preferable that the scan line 2021 and the video signal line 2022 be formed of conductive layers different from each other, at least.

The capacitor line 2023 is a wiring arranged so as to be parallel to the pixel electrode 2025 for forming the pixel capacitor 2026, and it is preferable that the capacitor line 2023 be constituted of the first conductive layer 2003. The capacitor line 2023 may be extended along the video signal line 2022 so as to surround the video signal line 2022, as shown in FIG. 20B. Consequently, a cross talk, which is a phenomenon in which a potential of an electrode, which is supposed to be held, is changed accompanied by a potential change of the video signal line 2022, can be reduced. In order to reduce cross capacitance with the video signal line 2022, the first semiconductor layer 2005 may be provided in a cross region of the capacitor line 2023 and the video signal line 2022, as shown in FIG. 20B.

The TFT 2024 operates as a switch for making the video signal line 2022 and the pixel electrode 2025 conductive. As shown in FIG. 20B, one of a source region or drain region of the TFT 2024 may be arranged so as to surround the other one of the source region or drain region of the TFT 2024. Consequently, a wide channel width can be obtained even in a small area and the switching capability can be increased. The gate electrode of the TFT 2024 may be arranged so as to surround the first semiconductor layer 2005, as shown in FIG. 20B.

The pixel electrode 2025 is electrically connected to one of the source electrode or drain electrode of the TFT 2024. The pixel electrode 2025 is an electrode for giving a signal voltage which is transmitted by the video signal line 2022 to the liquid crystal element. In addition, the pixel electrode 2025 and the capacitor line 2023 may form the pixel capacitor 2026 together. Consequently, the pixel electrode 2025 can also have a function of holding the signal voltage which is transmitted by, the video signal line 2022. The pixel electrode 2025 may be rectangular as shown in FIG. 20B. With this shape, an aperture ratio of the pixel can be increased and efficiency of the liquid crystal display device can be improved. Furthermore, in the case where the pixel electrode 2025 is formed using a material having transparency, a transmissive liquid crystal display device can be obtained. A transmissive liquid crystal display device can display images with high color reproducibility and high image quality. Alternatively, in the case where the pixel electrode 2025 is formed using a material having reflectivity, a reflective liquid crystal display device can be obtained. A reflective liquid crystal display device has high visibility in a bright environment such as outside. In addition, since a backlight is not necessary, the power consumption can be drastically reduced. It is to be noted that, in the case where the pixel electrode 2025 is formed by using both a material having transparency and a material having reflectivity, a semi-transmissive liquid crystal display device which has advantages of the both can be obtained. In the case where the pixel electrode 2025 is formed using a material having reflectivity, the surface of the pixel electrode 2025 may be uneven. When the surface is uneven, light is reflected diffusely, and an advantage in that angular dependency of intensity distribution of reflected light is decreased can be obtained. In other words, a reflective liquid crystal display device whose luminance is uniform regardless of the angle where it is seen can be obtained.

Figure 21A:
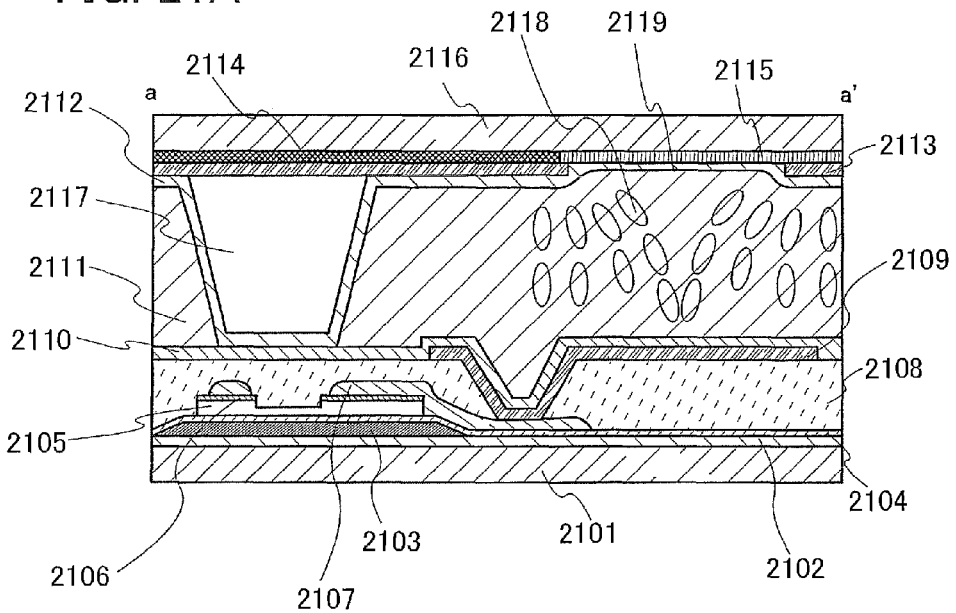
FIGS. 21A and 21B are views used for describing a structure of a display portion of a display device of the present invention.
Figure 21B:
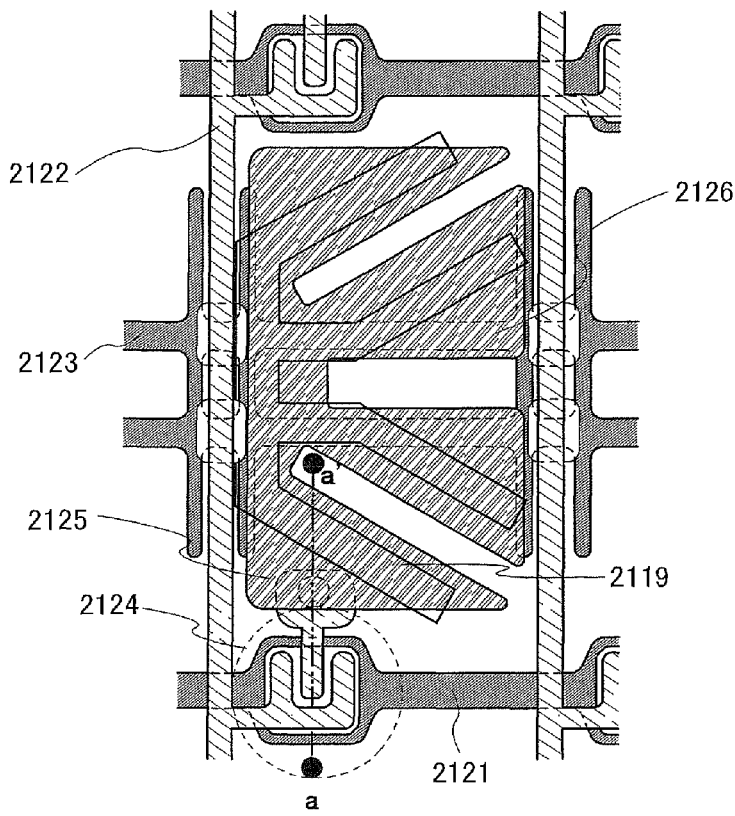

Next, another example of a VA (vertical alignment) mode liquid crystal display device will be described with reference to FIGS. 21A and 21B. FIGS. 21A and 21B are a cross-sectional view and a top view, respectively, showing a pixel structure of a VA-mode liquid crystal display device, specifically, a pixel of a so-called PVA (Patterned Vertical Alignment) mode in which a fourth conductive layer 2113 is patterned such that liquid crystal molecules are controlled to have various directions, and that the view angle is widened. FIG. 21A is a cross-sectional view of a pixel, and FIG. 21B is a top view of the pixel. Further, the cross-sectional view of the pixel shown in FIG. 21A corresponds to a line segment a-a' in the top view of the pixel shown in FIG. 21B. By using a liquid crystal display device having the pixel structure shown in FIGS. 21A and 21B, a liquid crystal display device with a wide view angle, a high response speed, and a high contrast can be obtained. Furthermore, by combining a liquid crystal display device having the pixel structure shown in FIGS. 21A and 21B with other embodiment modes such as Embodiment Mode 1 and Embodiment Mode 2, a liquid crystal display device with improved quality of moving images, a wide view angle, a high response speed, and a high contrast can be realized.

A pixel structure of a PVA-mode liquid crystal display device will be described with reference to FIG. 21A. The liquid crystal display device includes a basic portion that displays images, which is called a liquid crystal panel. The liquid crystal panel is manufactured in the following way: two processed substrates are attached to each other with a gap of several μm, and a space between the two substrates is filled with a liquid crystal material and sealed. In FIG. 21A, the two substrates correspond to a first substrate 2101 and a second substrate 2116. A TFT and a pixel electrode may be formed over the first substrate; and a light shielding film 2114, a color filter 2115, the fourth conductive layer 2113, a spacer 2117, and a second orientation film 2112 may be provided for the second substrate.

It is to be noted that a TFT need not necessarily be formed over the first substrate 2101. In the case where a TFT is not formed, the number of steps is reduced, so that the manufacturing costs can be reduced. In addition, since the structure becomes simple, a yield can be improved. On the other hand, in the case where a TFT is formed, a larger-sized display device can be obtained.

The TFT shown in FIGS. 21A and 21B is a bottom gate TFT using an amorphous semiconductor, which has an advantage in that it can be manufactured by using a large-area substrate at low costs. However, the present invention is not limited to this. As for structures of YET which can be used in the present invention, there are a channel-etch type, a channel-protect type, and the like for a bottom gate TFT. Alternatively, a top gate type may be used. Furthermore, not only the amorphous semiconductor but also a polycrystalline semiconductor may be used.

It is to be noted that the light shielding film 2114 need not necessarily be formed over the second substrate 2116. In the case where the light shielding film 2114 is not formed, the number of steps is reduced, so that the manufacturing costs can be reduced. In addition, since the structure becomes simple, a yield can be improved. On the other hand, in the case where the light shielding film 2114 is formed, a display device with little light leakage at the time of black display can be obtained.

It is to be noted that the color filter 2115 need not necessarily be formed over the second substrate 2116. In the case where the color filter 2115 is not formed, the number of steps is reduced, so that the manufacturing costs can be reduced. In addition, since the structure becomes simple, a yield can be improved. On the other hand, in the case where the color filter 2115 is formed, a display device capable of color display can be obtained.

It is to be noted that spherical spacers may be dispersed instead of providing the spacer 2117 for the second substrate 2116. In the case where the spherical spacers are dispersed, the number of steps is reduced, so that the manufacturing costs can be reduced. In addition, since the structure becomes simple, a yield can be improved. On the other hand, in the case where the spacer 2117 is formed, there is no variation of spacer's position; therefore, the distance between the two substrates can be uniform and a display device with little display unevenness can be obtained.

Next, as for a process to be performed on the first substrate 2101, the method described with reference to FIGS. 19A and 19B may be used; therefore, the description is omitted. Here, the first substrate 2101, a first insulating film 2102, a first conductive layer 2103, a second insulating film 2104, a first semiconductor layer 2105, a second semiconductor layer 2106, a second conductive layer 2107, a third insulating film 2108, a third conductive layer 2109, and a first orientation film 2110 correspond to the first substrate 1901, the first insulating film 1902, the first conductive layer 1903, the second insulating film 1904, the first semiconductor layer 1905, the second semiconductor layer 1906, the second conductive layer 1907, the third insulating film 1908, the third conductive layer 1909, and the first orientation film 1910 in FIG. 19A, respectively. It is to be noted that an electrode notch portion may be provided in the third conductive layer 2109 on the first substrate 2101 side. Consequently, orientation of liquid crystal molecules can be controlled more surely. In addition, the first orientation film 2110 and the second orientation film 2112 may be vertical alignment films. Consequently, liquid crystal molecules 2118 can be aligned vertically.

The first substrate 2101 that is manufactured as described above is attached to the second substrate 2116 provided with the light shielding film 2114, the color filter 2115, the fourth conductive layer 2113, the spacer 2117, and the second orientation film 2112, by a sealant, with a gap of several μm, and then, a space between the two substrates is filled with a liquid crystal material 2111 and sealed; whereby the liquid crystal panel can be manufactured. It is to be noted that, in the PVA-mode liquid crystal panel as shown in FIGS. 21A and 21B, the fourth conductive layer 2113 may be patterned so as to have an electrode notch portion 2119. Although the shape of the electrode notch portion 2119 is not limited, a shape that is formed by combining a plurality of rectangles having different directions is preferable. Consequently, a plurality of regions with different orientations can be formed, whereby a liquid crystal display device with a wide view angle can be obtained. Furthermore, it is preferable that the shape of the fourth conductive layer 2113 at the boundary between the electrode notch portion 2119 and the fourth conductive layer 2113 be a smooth curve. Consequently, the orientations of the adjacent liquid crystal molecules 2118 are extremely close to each other, and the orientation defect can be reduced. Furthermore, a defect in which the second orientation film 2112 is cut off by the electrode notch portion 2119 can be reduced.

Next, a feature of the pixel structure of the PVA-mode liquid crystal panel shown in FIGS. 21A and 21B will be described. The liquid crystal molecule 2118 shown in FIG. 21A is a long and slim molecule having a major axis and a miner axis. In FIG. 21A, the direction of each liquid crystal molecule 2118 is expressed by its length. That is, the direction of the major axis of the liquid crystal molecule 2018 which is expressed as a long molecule is parallel to the page; and as the liquid crystal molecule 2018 is expressed to be shorter, the direction of the major axis of the liquid crystal molecule becomes closer to the normal line direction of the page. That is, the liquid crystal molecules 2118 shown in FIG. 21A are aligned such that the direction of the major axis accords with the direction of the normal line of the orientation film. Accordingly, the liquid crystal molecules 2118 in a portion where the electrode notch portion 2119 is placed are aligned radially from the boundary between the electrode notch portion 2119 and the fourth conductive layer 2113 as a center. With this state, a liquid crystal display device having a wide view angle can be obtained.

Next, an example of a layout of a pixel of a PVA-mode liquid crystal display device will be described with reference to FIG. 21B. The pixel of the PVA-mode liquid crystal display device may include a scan line 2121, a video signal line 2122, a capacitor line 2123, a TFT 2124, a pixel electrode 2125, a pixel capacitor 2126, and an electrode notch portion 2119.

The scan line 2121 is electrically connected to a gate electrode of the TFT 2124; therefore, it is preferable that the scan line 2121 be constituted of the first conductive layer 2103.

The video signal line 2122 is electrically connected to a source electrode or drain electrode of the TFT 2124; therefore, it is preferable that the video signal line 2122 be constituted of the second conductive layer 2107. Furthermore, since the scan line 2121 and the video signal line 2122 are arranged in a matrix, it is preferable that the scan line 2121 and the video signal line 2122 be formed of conductive layers different from each other, at least.

The capacitor line 2123 is a wiring arranged so as to be parallel to the pixel electrode 2125 for forming the pixel capacitor 2126, and it is preferable that the capacitor line 2123 be constituted of the first conductive layer 2103. The capacitor line 2123 may be extended along the video signal line 2122 so as to surround the video signal line 2122, as shown in FIG. 21B. Consequently, a cross talk, which is a phenomenon in which a potential of an electrode, which is supposed to be held, is changed accompanied by a potential change of the video signal line 2122, can be reduced. In order to reduce cross capacitance with the video signal line 2122, the first semiconductor layer 2105 may be provided in a cross region of the capacitor line 2123 and the video signal line 2122, as shown in FIG. 21B.

The TFT 2124 operates as a switch for making the video signal line 2122 and the pixel electrode 2125 conductive. As shown in FIG. 21B, one of a source region or drain region of the TFT 2124 may be arranged so as to surround the other one of the source region or drain region of the TFT 2124. Consequently, a wide channel width can be obtained even in a small area and the switching capability can be increased. The gate electrode of the TFT 2124 may be arranged so as to surround the first semiconductor layer 2105, as shown in FIG. 21B.

The pixel electrode 2125 is electrically connected to one of the source electrode or drain electrode of the TFT 2124. The pixel electrode 2125 is an electrode for giving a signal voltage which is transmitted by the video signal line 2122 to the liquid crystal element. In addition, the pixel electrode 2125 and the capacitor line 2123 may form the pixel capacitor 2126 together. Consequently, the pixel electrode 2125 can also have a function of holding the signal voltage which is transmitted by the video signal line 2122. It is preferable that the pixel electrode 2125 have a notched portion in a portion where the electrode notch portion 2119 does not exist, in accordance with the shape of the electrode notch portion 2119 provided for the fourth conductive layer 2113. Consequently, a plurality of regions with different orientations of the liquid crystal molecules 2118 can be formed; whereby a liquid crystal display device with a wide view angle can be obtained. Furthermore, in the case where the pixel electrode 2125 is formed using a material having transparency, a transmissive liquid crystal display device can be obtained. A transmissive liquid crystal display device can display images with high color reproducibility and high image quality. Alternatively, in the case where the pixel electrode 2125 is formed using a material having reflectivity, a reflective liquid crystal display device can be obtained. A reflective liquid crystal display device has high visibility in a bright environment such as outside. In addition, since a backlight is not necessary, the power consumption can be drastically reduced. It is to be noted that, in the case where the pixel electrode 2125 is formed by using both a material having transparency and a material having reflectivity, a semi-transmissive liquid crystal display device which has advantages of the both can be obtained. In the case where the pixel electrode 2125 is formed using a material having reflectivity, the surface of the pixel electrode 2125 may be uneven. When the surface is uneven, light is reflected diffusely, and an advantage in that angular dependency of intensity distribution of reflected light is decreased can be obtained. In other words, a reflective liquid crystal display device whose luminance is uniform regardless of the angle where it is seen can be obtained.

Figure 22A:
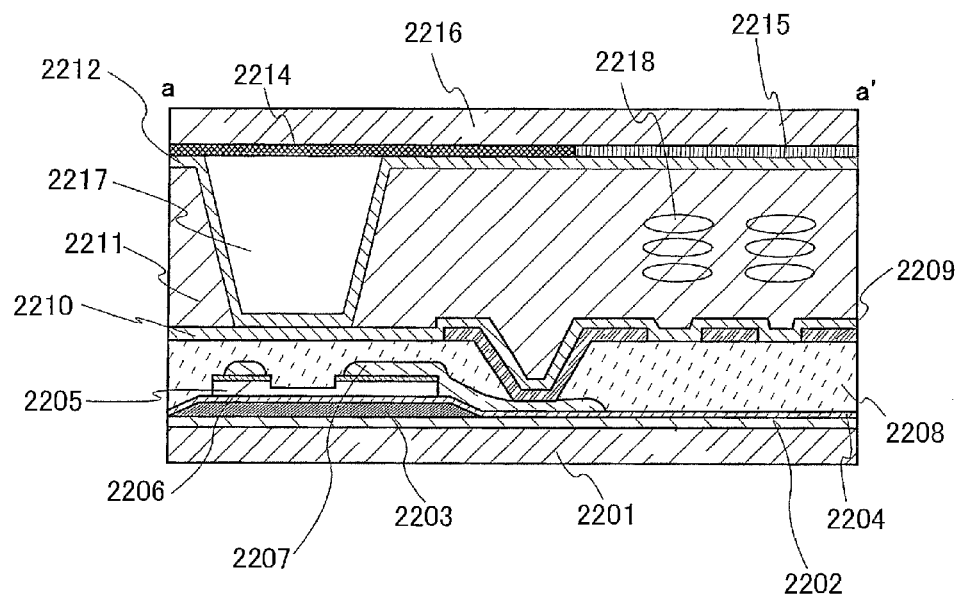
FIGS. 22A and 22B are views used for describing a structure of a display portion of a display device of the present invention.
Figure 22B:
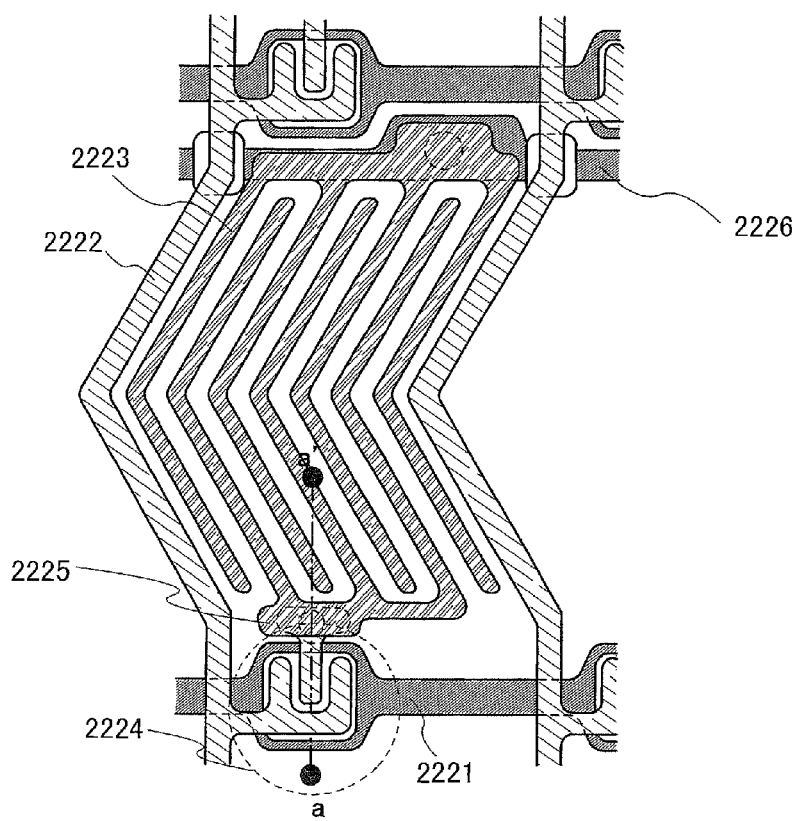

Next, a horizontal electric field liquid crystal display device will be described with reference to FIGS. 22A and 22B. FIGS. 22A and 22B are a cross-sectional view and a top view, respectively, showing a pixel structure of a liquid crystal display device in which an electric field is applied horizontally in order to perform switching such that the orientation of liquid crystal molecules is always parallel to the substrate, specifically, a pixel of a so-called IPS (In-Plane-Switching) mode in which a pixel electrode 2225 and a common electrode 2223 are patterned into comb shapes so that an electrical field is applied horizontally. FIG. 22A is a cross-sectional view of a pixel, and FIG. 22B is a top view of the pixel. Further, the cross-sectional view of the pixel shown in FIG. 22A corresponds to a line segment a-a' in the top view of the pixel shown in FIG. 22B. By using a liquid crystal display device having the pixel structure shown in FIGS. 22A and 22B, a liquid crystal display device whose view angle is wide and the response speed's dependency on gray scale is small in principle can be obtained. Further-more, by combining a liquid crystal display device having the pixel structure shown in FIGS. 22A and 22B with other embodiment modes such as Embodiment Mode 1 and Embodiment Mode 2, a liquid crystal display device in which quality of moving images is improved, a view angle is wide, and the response speed's dependency on gray scale is small in principle can be realized.

A pixel structure of an IPS-mode liquid crystal display device will be described with reference to FIG. 22A. The liquid crystal display device includes a basic portion that displays images, which is called a liquid crystal panel. The liquid crystal panel is manufactured in the following way: two processed substrates are attached to each other with a gap of several µm, and a space between the two substrates is filled with a liquid crystal material and sealed. In FIG. 22A, the two substrates correspond to a first substrate 2201 and a second substrate 2216. A TFT and a pixel electrode may be formed over the first substrate; and a light shielding film 2214, a color filter 2215, a spacer 2217, and a second orientation film 2212 may be provided for the second substrate.

It is to be noted that a TFT need not necessarily be formed over the first substrate 2201. In the case where a TFT is not formed, the number of steps is reduced, so that the manu-facturing costs can be reduced. In addition, since the struc-ture becomes simple, a yield can be improved. On the other hand, in the case where a TFT is formed, a larger-sized display device can be obtained.

The TFT shown in FIGS. 22A and 22B is a bottom gate TFT using an amorphous semiconductor, which has an advantage in that it can be manufactured by using a large-area substrate at low costs. However, the present invention is not limited to this. As for structures of TFT which can be used in the present invention, there are a channel-etch type, a channel-protect type, and the like for a bottom gate TFT. Alternatively, a top gate type may be used. Furthermore, not only the amorphous semiconductor but also a polycrystalline semiconductor may be used.

It is to be noted that the light shielding film 2214 need not necessarily be formed over the second substrate 2216. In the case where the light shielding film 2214 is not formed, the number of steps is reduced, so that the manufacturing costs can be reduced. In addition, since the structure becomes simple, a yield can be improved. On the other hand, in the case where the light shielding film 2214 is formed, a display device with little light leakage at the time of black display can be obtained.

It is to be noted that the color filter 2215 need not necessarily be formed over the second substrate 2216. In the case where the color filter 2215 is not formed, the number of steps is reduced, so that the manufacturing costs can be reduced. In addition, since the structure becomes simple, a yield can be improved. On the other hand, in the case where the color filter 2215 is formed, a display device capable of color display can be obtained.

It is to be noted that spherical spacers may be dispersed instead of providing the spacer 2217 for the second substrate 2216. In the case where the spherical spacers are dispersed, the number of steps is reduced, so that the manufacturing costs can be reduced. In addition, since the structure becomes simple, a yield can be improved. On the other hand, in the case where the spacer 2217 is formed, there is no variation of spacer's position; therefore, the distance between the two substrates can be uniform and a display device with little display unevenness can be obtained.

Next, as for a process to be performed on the first substrate 2201, the method described with reference to FIGS. 19A and 19B may be used; therefore, the description is omitted. Here, the first substrate 2201, a first insulating film 2202, a first conductive layer 2203, a second insulating film 2204, a first semiconductor layer 2205, a second semiconductor layer 2206, a second conductive layer 2207, a third insulating film 2208, a third conductive layer 2209, and a first orientation film 2210 correspond to the first substrate 1901, the first insulating film 1902, the first conductive layer 1903, the second insulating film 1904, the first semiconductor layer 1905, the second semiconductor layer 1906, the second conductive layer 1907, the third insulating film 1908, the third conductive layer 1909, and the first orientation film 1910 in FIG. 19A, respectively. It is to be noted that the third conductive layer 2209 on the first substrate 2201 side may be patterned so as to have two comb shapes which engage with each other. Furthermore, one of comb-shaped electrodes may be electrically connected to one of a source electrode or drain electrode of the TFT 2224 and the other comb-shaped electrode may be electrically connected to the common electrode 2223. Consequently, a horizontal electric field can be applied to the liquid crystal molecules 2218 effectively.

The first substrate 2201 that is manufactured as described above is attached to the second substrate 2216 provided with the light shielding film 2214, the color filter 2215, the spacer 2217, and the second orientation film 2212, by a sealant, with a gap of several μm, and then, a space between the two substrates is filled with a liquid crystal material 2211 and sealed; whereby the liquid crystal panel can be manufactured. Although not shown in the view, a conductive layer may be formed over the second substrate 2216 side. By forming a conductive layer on the second substrate 2216 side, an effect of an electromagnetic wave noise from external can be prevented.

Next, a feature of the pixel structure of the IPS-mode liquid crystal panel shown in FIGS. 22A and 22B will be described. The liquid crystal molecule 2218 shown in FIG. 22A is a long and slim molecule having a major axis and a miner axis. In FIG. 22A, the direction of each liquid crystal molecule 2218 is expressed by its length. That is, the direction of the major axis of the liquid crystal molecule 2218 which is expressed as a long molecule is parallel to the page; and as the liquid crystal molecule 2218 is expressed to be shorter, the direction of the major axis of the liquid crystal molecule becomes closer to the normal line direction of the page. That is, the liquid crystal molecules 2218 shown in FIG. 22A are aligned such that the direction of the major axis always accords with the direction parallel to the substrate. In FIG. 22A, the orientation in a condition where an electric field is not applied is shown. When an electric field is applied to the liquid crystal molecules 2218, the liquid crystal molecules rotate in the horizontal plane while the direction of the major axes always stays parallel to the substrate. With this state, a liquid crystal display device having a wide view angle can be obtained.

Next, an example of a layout of a pixel of an IPS-mode liquid crystal display device will be described with reference to FIG. 22B. The pixel of the IPS-mode liquid crystal display device may include a scan line 2221, a video signal line 2222, a common electrode 2223, a 2224, a pixel electrode 2225, and a common line 2226.

The scan line 2221 is electrically connected to a gate electrode of the TFT 2224; therefore, it is preferable that the scan line 2221 be constituted of the first conductive layer 2203.

The video signal line 2222 is electrically connected to a source electrode or drain electrode of the TFT 2224; therefore, it is preferable that the video signal line 2222 be constituted of the second conductive layer 2207. Furthermore, since the scan line 2221 and the video signal line 2222 are arranged in a matrix, it is preferable that the scan line 2221 and the video signal line 2222 be formed of conductive layers different from each other, at least. It is to be noted that the video signal line 2222 may be bent so as to fit in the shapes of the pixel electrode 2225 and the common electrode 2223 in the pixel, as shown in FIG. 22B. Consequently, an aperture ratio of the pixel can be increased, so that efficiency of the liquid crystal display device can be improved.

The common electrode 2223 is an electrode arranged so as to be parallel to the pixel electrode 2225 for generating a horizontal electric field, and it is preferable that the common electrode 2223 be constituted of the third conductive layer 2209. The common electrode 2223 may be extended along the video signal line 2222 so as to surround the video signal line 2222, as shown in FIG. 22B. Consequently, a cross talk, which is a phenomenon in which a potential of an electrode, which is supposed to be held, is changed accompanied by a potential change of the video signal line 2222, can be reduced. In addition, the common electrode 2223 is electrically connected to the common line 2226. In order to reduce cross capacitance of the video signal line 2222, the first semiconductor layer 2205 may be provided in a cross region of the common line 2226 and the video signal line 2222, as shown in FIG. 22B.

The TFT 2224 operates as a switch for making the video signal line 2222 and the pixel electrode 2225 conductive. As shown in FIG. 22B, one of a source region or drain region of the TFT 2224 may be arranged so as to surround the other one of the source region or drain region of the TFT 2224. Consequently, a wide channel width can be obtained even in a small area and the switching capability can be increased. The gate electrode of the TFT 2224 may be arranged so as to surround the first semiconductor layer 2205, as shown in FIG. 22B.

The pixel electrode 2225 is electrically connected to one of the source electrode or drain electrode of the TFT 2224. The pixel electrode 2225 and the common electrode 2223 are electrodes for giving a signal voltage which is transmitted by the video signal line 2222 to the liquid crystal element. In addition, the pixel electrode 2225 and the common electrode 2223 may form a pixel capacitor together. Consequently, the pixel electrode 2225 can also have a function of holding the signal voltage which is transmitted by the video signal line 2222. It is preferable that the pixel electrode 2225 and the common electrode 2223 be formed into bent comb shapes as shown in FIG. 22B. Consequently, a plurality of regions with different orientations of the liquid crystal molecules 2218 can be formed, whereby a liquid crystal display device with a wide view angle can be obtained. Furthermore, in the case where the pixel electrode 2225 and the common electrode 2223 are formed using materials having transparency, a transmissive liquid crystal display device can be obtained. A transmissive liquid crystal display device can display images with high color reproducibility and high image quality. Alternatively, in the case where the pixel electrode 2225 and the common electrode 2223 are formed using materials having reflectivity, a reflective liquid crystal display device can be obtained. A reflective liquid crystal display device has high visibility in a bright environment such as outside. In addition, since a backlight is not necessary, the power consumption can be drastically reduced. It is to be noted that, in the case where the pixel electrode 2225 and the common electrode 2223 are formed by using both a material having transparency and a material having reflectivity, a semi-transmissive liquid crystal display device which has advantages of the both can be obtained. In the case where the pixel electrode 2225 and the common electrode 2223 are formed using materials having reflectivity, the surfaces of the pixel electrode 2225 and the common electrode 2223 may be uneven. When the surfaces are uneven, light is reflected diffusely, and an advantage in that angular dependency of intensity distribution of reflected light is decreased can be obtained. In other words, a reflective liquid crystal display device whose luminance is uniform regardless of the angle where it is seen can be obtained.

Although it is explained that the pixel electrode 2225 and the common electrode 2223 are both formed of the third conductive layer 2209, an applicable pixel structure can be appropriately selected without being limited to this. For example, the pixel electrode 2225 and the common electrode 2223 may be both formed of the second conductive layer 2207, or may be both formed of the first conductive layer 2203. Alternatively, one of them may be formed of the third conductive layer 2209 and the other may be formed of the second conductive layer 2207. Alternatively, one of them may be formed of the third conductive layer 2209 and the other may be formed of the first conductive layer 2203. Further alternatively, one of them may be formed of the second conductive layer 2207 and the other may be formed of the first conductive layer 2203.

Figure 23A:
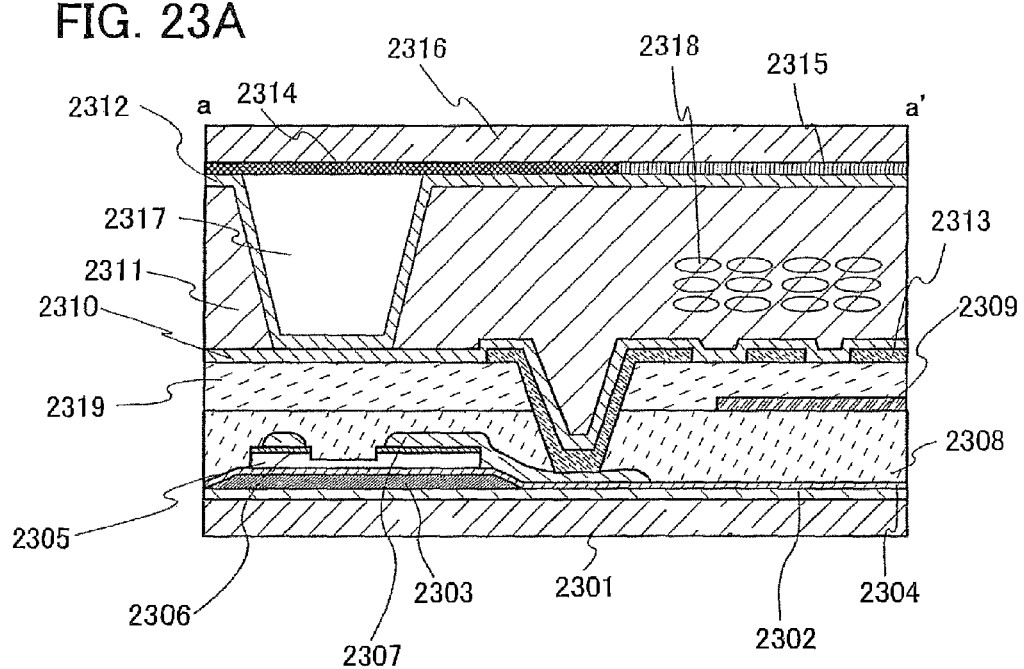
FIGS. 23A and 23B are views used for describing a structure of a display portion of a display device of the present invention.
Figure 23B:
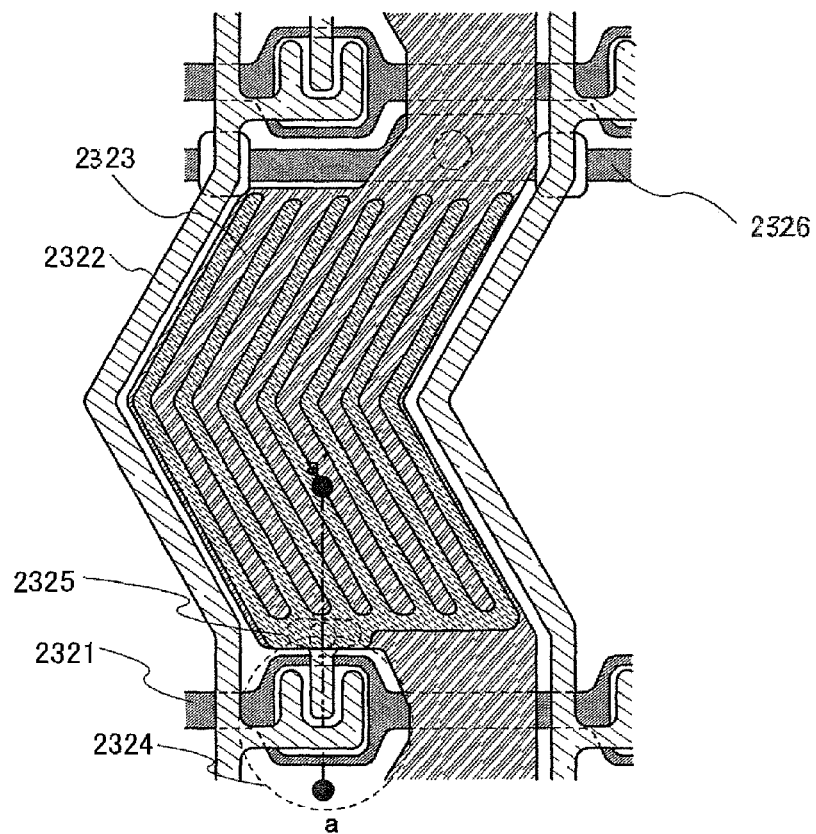

Next, another horizontal electric field liquid crystal display device will be described with reference to FIGS. 23A and 23B. FIGS. 23A and 23B are a cross-sectional view and a top view, respectively, showing another pixel structure of a liquid crystal display device in which an electric field is applied horizontally in order to perform switching such that the orientation of liquid crystal molecules is always parallel to the substrate. More specifically, FIGS. 23A and 23B are a cross-sectional view and a top view, respectively, of a pixel of a so-called FFS (Fringe Field Switching) mode in which one of a pixel electrode 2325 or a common electrode 2323 is patterned into a comb shape and the other is formed as a sheet-like electrode in a region overlapping the comp shape so that an electric field is applied horizontally. FIG. 23A is a cross-sectional view of a pixel, and FIG. 23B is a top view of the pixel. Further, the cross-sectional view of the pixel shown in FIG. 23A corresponds to a line segment a-a' in the top view of the pixel shown in FIG. 23B. By using a liquid crystal display device having the pixel structure shown in FIGS. 23A and 23B, a liquid crystal display device whose view angle is wide and the response speed's dependency on gray scale is small in principle can be obtained. Furthermore, by combining a liquid crystal display device having the pixel structure shown in FIGS. 23A and 23B with other embodiment modes such as Embodiment Mode 1 and Embodiment Mode 2, a liquid crystal display device in which the quality of moving images is improved, a view angle is wide, and the response speed's dependency on gray scale is small in principle can be realized.

A pixel structure of an IPS-mode liquid crystal display device will be described with reference to FIG. 23A. The liquid crystal display device includes a basic portion that displays images, which is called a liquid crystal panel. The liquid crystal panel is manufactured in the following way: two processed substrates are attached to each other with a gap of several µm, and a space between the two substrates is filled with a liquid crystal material and sealed. In FIG. 23A, the two substrates correspond to a first substrate 2301 and a second substrate 2316. A TFT and a pixel electrode may be formed over the first substrate; and a light shielding film 2314, a color filter 2315, a spacer 2317, and a second orientation film 2312 may be provided for the second substrate.

It is to be noted that a TFT need not necessarily be formed over the first substrate 2301. In the case where a TFT is not formed, the number of steps is reduced, so that the manufacturing costs can be reduced. In addition, since the structure becomes simple, a yield can be improved. On the other hand, in the case where a TFT is formed, a larger-sized display device can be obtained.

The TFT shown in FIGS. 23A and 23B is a bottom gate TFT using an amorphous semiconductor, which has an advantage in that it can be manufactured by using a large-area substrate at low costs. However, the present invention is not limited to this. As for structures of TFT which can be used in the present invention, there are a channel-etch type, a channel-protect type, and the like for a bottom gate TFT. Alternatively, a top gate type may be used. Furthermore, not only the amorphous semiconductor but also a polycrystalline semiconductor may be used.

It is to be noted that the light shielding film 2314 need not necessarily be formed over the second substrate 2316. In the case where the light shielding film 2314 is not formed, the number of steps is reduced, so that the manufacturing costs can be reduced. In addition, since the structure becomes simple, a yield can be improved. On the other hand, in the case where the light shielding film 2314 is formed, a display device with little light leakage at the time of black display can be obtained.

It is to be noted that the color filter 2315 need not necessarily be formed over the second substrate 2316. In the case where the color filter 2315 is not formed, the number of steps is reduced, so that the manufacturing costs can be reduced. In addition, since the structure becomes simple, a yield can be improved. On the other hand, in the case where the color filter 2315 is formed, a display device capable of color display can be obtained.

It is to be noted that spherical spacers may be dispersed instead of providing the spacer 2317 for the second substrate 2316. In the case where the spherical spacers are dispersed, the number of steps is reduced, so that the manufacturing costs can be reduced. In addition, since the structure becomes simple, a yield can be improved. On the other hand, in the case where the spacer 2317 is formed, there is no variation of spacer's position; therefore, the distance between the two substrates can be uniform and a display device with little display unevenness can be obtained.

Next, as for a process to be performed on the first substrate 2301, the method described with reference to FIGS. 19A and 19B may be used; therefore, the description is omitted. Here, the first substrate 2301, a first insulating film 2302, a first conductive layer 2303, a second insulating film 2304, a first semiconductor layer 2305, a second semiconductor layer 2306, a second conductive layer 2307, a third insulating film 2308, a third conductive layer 2309, and a first orientation film 2310 correspond to the first substrate 1901, the first insulating film 1902, the first conductive layer 1903, the second insulating film 1904, the first semiconductor layer 1905, the second semiconductor layer 1906, the second conductive layer 1907, the third insulating film 1908, the third conductive layer 1909, and the first orientation film 1910 in FIG. 19A, respectively.

However, the difference from FIGS. 19A and 19B is that a fourth insulating film 2319 and a fourth conductive layer 2313 may be formed over the first substrate 2301 side. More specifically, the film formation may be performed in the following way: after the third conductive layer 2309 is patterned, the fourth insulating film 2319 is formed, and then, it is patterned so as to form a contact hole. After that, the fourth conductive layer 2313 is formed and patterned similarly, and then, the first orientation film 2310 is formed. As materials and processing methods of the fourth insulating film 2319 and the fourth conductive layer 2313, materials and processing methods which are similar to the material and the processing method of the third insulating film 2308 and the third conductive layer 2309 may be used. Furthermore, one comb-shaped electrode may be electrically connected to one of a source electrode or drain electrode of the TFT 2324 and the other sheet-like electrode may be electrically connected to the common line 2326. Consequently, a horizontal electric field can be applied to the liquid crystal molecules 2318 effectively.

The first substrate 2301 that is manufactured as described above is attached to the second substrate 2316 provided with the light shielding film 2314, the color filter 2315, the spacer 2317, and the second orientation film 2312, by a sealant, with a gap of several μm, and then, a space between the two substrates is filled with a liquid crystal material 2311 and sealed; whereby the liquid crystal panel can be manufactured. Although not shown in the view, a conductive layer may be formed over the second substrate 2316 side. By forming a conductive layer on the second substrate 2316 side, an effect of an electromagnetic wave noise from external can be prevented.

Next, a feature of the pixel structure of the FFS-mode liquid crystal panel shown in FIGS. 23A and 23B will be described. The liquid crystal molecule 2318 shown in FIG. 23A is a long and slim molecule having a major axis and a miner axis. In FIG. 23A, the direction of each liquid crystal molecule 2318 is expressed by its length. That is, the direction of the major axis of the liquid crystal molecule 2318 which is expressed as a long molecule is parallel to the page; and as the liquid crystal molecule 2318 is expressed to be shorter, the direction of the major axis of the liquid crystal molecule becomes closer to the normal line direction of the page. That is, the liquid crystal molecules 2318 shown in FIG. 23A are aligned such that the direction of the major axis always accords with the direction parallel to the substrate. In FIG. 23A, the orientation in a condition where an electric field is not applied is shown. When an electric field is applied to the liquid crystal molecules 2318, the liquid crystal molecules rotate in the horizontal plane while the direction of the major axis always stays parallel to the substrate. With this state, a liquid crystal display device having a wide view angle can be obtained.

Next, an example of a layout of a pixel of an FFS-mode liquid crystal display device will be described with reference to FIG. 23B. The pixel of the FFS-mode liquid crystal display device may include a scan line 2321, a video signal line 2322, a common electrode 2323, a TFT 2324, a pixel electrode 2325, and a common line 2326.

The scan line 2321 is electrically connected to a gate electrode of the TFT 2324; therefore, it is preferable that the scan line 2321 be constituted of the first conductive layer 2303.

The video signal line 2322 is electrically connected to a source electrode or drain electrode of the TFT 2324; therefore, it is preferable that the video signal line 2322 be constituted of the second conductive layer 2307. Furthermore, since the scan line 2321 and the video signal line 2322 are arranged in a matrix, it is preferable that the scan line 2321 and the video signal line 2322 be formed of conductive layers different from each other, at least. It is to be noted that the video signal line 2322 may be bent so as to fit in the shape of the pixel electrode 2325 in the pixel, as shown in FIG. 23B. Consequently, an aperture ratio of the pixel can be increased, so that efficiency of the liquid crystal display device can be improved.

The common electrode 2323 is an electrode arranged so as to be parallel to the pixel electrode 2325 for generating a horizontal electric field, and it is preferable that the common electrode 2323 be constituted of the third conductive layer 2309. The common electrode 2323 may be shaped along the video signal line 2322, as shown in FIG. 23B. Consequently, a cross talk, which is a phenomenon in which a potential of an electrode, which is supposed to be held, is changed accompanied by a potential change of the video signal line 2322, can be reduced. In addition, the common electrode 2323 is electrically connected to the common line 2326. In order to reduce cross capacitance of the video signal line 2322, the first semiconductor layer 2305 may be provided in a cross region of the common line 2326 and the video signal line 2322, as shown in FIG. 23B.

The TFT 2324 operates as a switch for making the video signal line 2322 and the pixel electrode 2325 conductive. As shown in FIG. 23B, one of a source region or drain region of the TFT 2324 may be arranged so as to surround the other one of the source region or drain region of the TFT 2324. Consequently, a wide channel width can be obtained even in a small area and the switching capability can be increased. The gate electrode of the TFT 2324 may be arranged so as to surround the first semiconductor layer 2305, as shown in FIG. 23B.

The pixel electrode 2325 is electrically connected to one of the source electrode or drain electrode of the TFT 2324. The pixel electrode 2325 and the common electrode 2323 are electrodes for giving a signal voltage which is transmitted by the video signal line 2322 to the liquid crystal element. In addition, the pixel electrode 2325 and the common electrode 2323 may form a pixel capacitor together. Consequently, the pixel electrode 2325 can also have a function of holding the signal voltage which is transmitted by the video signal Line 2322. It is preferable that the pixel electrode 2325 be formed into bent comb shape as shown in FIG. 23B. Consequently, a plurality of regions with different orientations of the liquid crystal molecules 2318 can be formed, whereby a liquid crystal display device with a wide view angle can be obtained. Furthermore, in the case where the pixel electrode 2325 and the common electrode 2323 are formed using materials having transparency, a transmissive liquid crystal display device can be obtained. A transmissive liquid crystal display device can display images with high color reproducibility and high image quality. Alternatively, in the case where the pixel electrode 2325 and the common electrode 2323 are formed using materials having reflectivity, a reflective liquid crystal display device can be obtained. A reflective liquid crystal display device has high visibility in a bright environment such as outside. In addition, since a backlight is not necessary, the power consumption can be drastically reduced. It is to be noted that, in the case where the pixel electrode 2325 and the common electrode 2323 are formed by using both a material having transparency and a material having reflectivity, a semi-transmissive liquid crystal display device which has advantages of the both can be obtained. In the case where the pixel electrode 2325 and the common electrode 2323 are formed using materials having reflectivity, the surfaces of the pixel electrode 2325 and the common electrode 2323 may be uneven. When the surfaces are uneven, light is reflected diffusely, and an advantage in that angular dependency of intensity distribution of reflected light is decreased can be obtained. In other words, a reflective liquid crystal display device whose luminance is uniform regardless of the angle where it is seen can be obtained.

Although it is explained that the pixel electrode 2325 is formed of the fourth conductive layer 2313 and the common electrode 2323 is formed of the third conductive layer 2309, an applicable pixel structure can be appropriately selected without being limited to this, as long as the structure meets a certain condition. More specifically, it is acceptable as long as the comb-shaped electrode is located closer to the liquid crystal than the sheet-like electrode is, seen from the first substrate 2301. This is because a horizontal electric field is always generated on the side opposite to the sheet-like electrode, with the comb-shaped electrode as a center. That is, the comb-shaped electrode needs to be located closer to the liquid crystal than the sheet-like electrode is, in order to apply a horizontal electric field to the liquid crystal.

For meeting this condition, for example, the comb-shaped electrode may be formed of the fourth conductive layer 2313 and the sheet-like electrode may be formed of the third conductive layer 2309. Alternatively, the comb-shaped electrode may be formed of the fourth conductive layer 2313 and the sheet-like electrode may be formed of the second conductive layer 2307. Alternatively, the comb-shaped electrode may be formed of the fourth conductive layer 2313 and the sheet-like electrode may be formed of the first conductive layer 2303. Alternatively, the comb-shaped electrode may be formed of the third conductive layer 2309 and the sheet-like electrode may be formed of the second conductive layer 2307. Alternatively, the comb-shaped electrode may be formed of the third conductive layer 2309 and the sheet-like electrode may be formed of the first conductive layer 2303. Alternatively, the comb-shaped electrode may be formed of the second conductive layer 2307 and the sheet-like electrode may be formed of the first conductive layer 2303. Although it is explained that the comb-shaped electrode is electrically connected to one of the source region or drain region of the TFT 2324 and the sheet-like electrode is electrically connected to the common electrode 2323, the connections may be opposite. In that case, the sheet-like electrode may be formed independently for each pixel.

It is to be noted that this embodiment mode may be carried out freely combined with any of the other embodiment modes.

Embodiment Mode 4

In this embodiment mode, a polarizing plate and a backlight which are used for a liquid crystal display device will be described.

First, an arrangement method of a polarizing plate and a backlight will be described with reference to FIG. 24. A reference numeral 2407 denotes a liquid crystal panel, to which the one described in other embodiment modes can be applied. As shown in FIG. 24, a first polarizing plate 2408 and a second polarizing plate 2409 may be provided adjacent to the liquid crystal panel 2407. Further, a backlight unit 2401 may be provided adjacent to the first polarizing plate 2408 or the second polarizing plate 2409. Here, a polarizing plate corresponds to a layer containing a polarizer, and is also referred to as a polarizing film or a polarizing filter.

A prism sheet may be arranged between the backlight unit 2401 and the liquid crystal panel 2407. Consequently, luminance of a screen of the liquid crystal display device can be improved.

Next, the structure of the backlight unit 2401 will be described. The backlight unit 2401 may be a side illumination type backlight unit. The side illumination type backlight unit may include a diffuser plate 2402, a light guide plate 2403, a reflector plate 2404, and a light source unit 2411. Furthermore, the light source unit 2411 may include a lamp reflector 2405 and a light source 2406. It is to be noted that the backlight unit 2401 may be an underneath-illumination type backlight unit in which the light source unit 2411 is arranged just under the light guide plate 2403.

As the light source 2406, a cold-cathode tube, a hot cathode fluorescent lamp, a light emitting diode, an inorganic EL, an organic EL, or the like can be used. It is to be noted that the light source 2406 may be provided with a function of controlling its light emission amount according to need as well as its lighting or non-lighting.

The lamp reflector 2405 may have a function of guiding light that is emitted from the light source 2406 to the light guide plate 2403. Consequently, light that is emitted from the light source 2406 can be utilized efficiently.

The light guide plate 2403 may have a function of scattering light. Consequently, light can be led to the entire surface of the liquid crystal panel 2407. Furthermore, by using the diffuser plate 2402, unevenness of luminance can be reduced.

The reflector plate 2404 may have a function of reflecting light. Consequently, light that is leaked from the light guide plate 2403 in a direction opposite to the liquid crystal panel 2407 can be reflected and reused.

It is to be noted that a control circuit for controlling the luminance of the light source 2406 may be connected to the backlight unit 2401. Consequently, the luminance of the light source 2406 can be controlled by a signal from the control circuit.

In the case where liquid crystal of the liquid crystal panel 2407 is of a TN-mode, it is preferable that the first polarizing plate 2408 and the second polarizing plate 2409 be arranged in a cross nicol state. Consequently, a normally white mode can be realized. The normally white mode has an advantage in that a good black level is made by application of a sufficient voltage and the contrast is improved. In the case where the liquid crystal of the liquid crystal panel 2407 is of a VA-mode, it is preferable that the first polarizing plate 2408 and the second polarizing plate 2409 be arranged in a cross nicol state. Furthermore, in the case where the liquid crystal of the liquid crystal panel 2407 is of an IPS-mode or an FFS-mode, the first polarizing plate 2408 and the second polarizing plate 2409 may be arranged in a cross nicol state or in a parallel nicol state.

A quarter wave plate may be provided between the first polarizing plate 2408 and the liquid crystal panel 2407 and between the second polarizing plate 2409 and the liquid crystal panel 2407, each. Consequently, reflection of external light can be reduced, whereby a liquid crystal display device with high contrast can be obtained.

A slit may be provided between the second polarizing plate 2409 and the backlight unit 2401. Consequently, three-dimensional display can be performed. The slit transmits light that is incident thereon from the light source in stripes, and makes the light be incident on the liquid crystal panel 2407. By this slit, a parallax can be made for both eyes of an observer. That is, the observer sees only pixels for a right eye by the right eye and only pixels for a left eye by the left eye at the same time. Accordingly, the observer recognizes the display as three-dimensional. In other words, light to which a particular view angle is given by the slit passes through pixels corresponding to an image for the right eye and an image for the left eye, whereby the image for the right eye and the image for the left eye are separated into different view angles. In this manner, three-dimensional display can be performed.

Figure 25A:
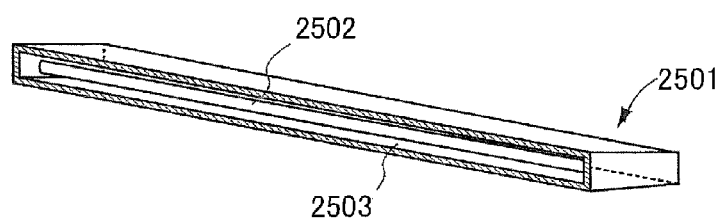
FIGS. 25A to 25D are views used for describing a structure of a display device of the present invention.

Next, a detailed structure of a light source unit which can be used for a backlight unit will be described with reference to FIGS. 25A to 25D. FIG. 25A shows a light source unit 2501 in the case where a cold-cathode tube 2502 is used as a light source. By using the cold-cathode tube 2502 as the light source, a large-sized liquid crystal display device can be obtained. This is because a cold-cathode tube can emit light with high intensity. The light source unit 2501 may include a lamp reflector 2503. By using the lamp reflector 2503, light from the light source can be reflected efficiently.

Figure 25B:
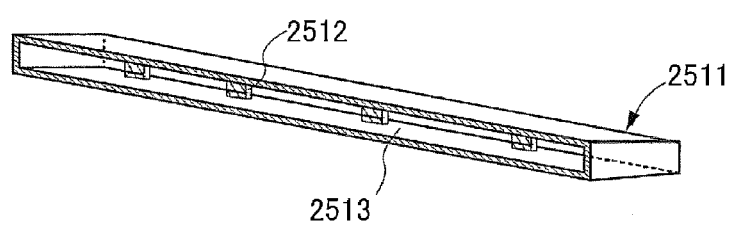

FIG. 25B shows a light source unit 2511 in which a light emitting diode (LED) 2512 is used as a light source. By using the light emitting diode 2512 as the light source, a small-sized liquid crystal display device can be obtained. This is because a light emitting diode can be manufactured with small volume. The light emitting diode 2512 may be a light emitting diode that emits white light. By using a light emitting diode that emits white light, the light source unit 2511 with small volume can be obtained. Furthermore, the light emitting diodes 2512 may be arranged with predetermined intervals, as shown in FIG. 25B. The light source unit 2511 may include a lamp reflector 2513. By using the lamp reflector 2513, light from the light source can be reflected efficiently.

Figure 25C:
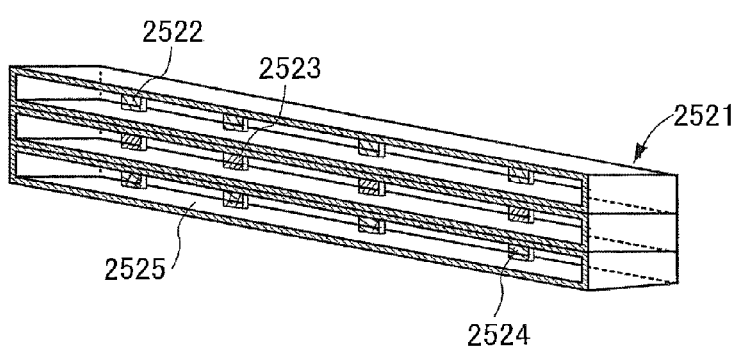

FIG. 25C shows a light source unit 2521 in which light emitting diodes 2522, 2523, and 2524 are used as light sources. By using the light emitting diodes 2522, 2523, and 2524 as the light sources, a small-sized liquid crystal display device can be obtained. This is because a light emitting diode can be manufactured with small volume. The light emitting diodes 2522, 2523, and 2524 may be light emitting diodes that emit light of RGB. By using light emitting diodes that emit light of RGB, the light source unit 2521 with high color reproducibility can be obtained. Furthermore, the light emitting diodes 2522, 2523, and 2524 may be arranged with predetermined intervals, as shown in FIG. 25C. The light source unit 2521 may include a lamp reflector 2525. By using the lamp reflector 2525, light from the light source can be reflected efficiently.

Figure 25D:
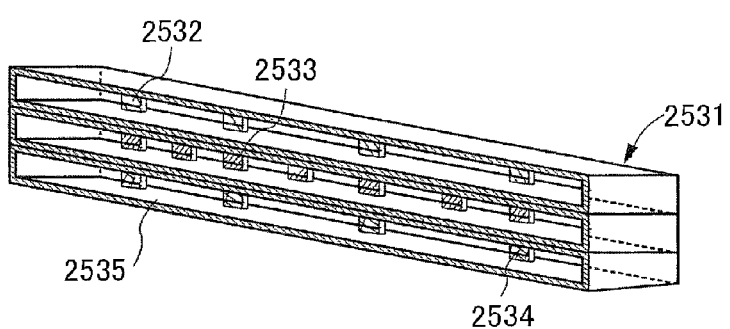

FIG. 25D shows a light source unit 2531 in which light emitting diodes 2532, 2533, and 2534 are used as light sources. By using the light emitting diodes 2532, 2533, and 2534 as the light sources, a small-sized liquid crystal display device can be obtained. This is because a light emitting diode can be manufactured with small volume. The light emitting diodes 2532, 2533, and 2534 may be light emitting diodes that emit light of RGB. By using light emitting diodes that emit light of RGB, the light source unit 2531 with high color reproducibility can be obtained. Furthermore, the light emitting diodes 2532, 2533, and 2534 which emit light of RGB may be arranged with different intervals, as shown in FIG. 25D. For example, the light emitting diodes that emit light with lower light emission intensity (for example, green) may be arranged with smaller intervals. Consequently, a sufficient light emission intensity as a whole can be obtained even with a color whose light emission intensity is low; therefore, the white balance can be improved. The light source unit 2531 may include a lamp reflector 2535. By using the lamp reflector 2535, light from the light source can be reflected efficiently.

In the light source units shown in FIGS. 25C and 25D, a light emitting diode which emits white light and light emitting diodes which emit light of RGB may be used in combination. For example, a light source unit in which four kinds of light emitting diodes, that is, light emitting diodes which emit light of RGB and a light emitting diode which emits white light, can reduce power consumption since the luminance is complemented by the light emitting diode which emits white light.

In the case where the light emitting diodes which emit light of RGB are used, a field sequential mode in which the RGB light emitting diodes are sequentially lighted in accordance with time so as to perform color display can be applied.

The light source units shown in FIGS. 25A to 25D each can be used as side illumination type backlight. Furthermore, by arranging the light source units shown in FIGS. 25A to 25D each on the back face of the substrate, an underneath-illumination type backlight can be obtained. At this time, the light emitting diodes which emit light of RGB can be used. By arranging the light emitting diodes which emit light of RGB in order, the color reproducibility can be increased.

Next, the structure of the polarizing plate will be described with reference to FIG. 26.

Figure 26:
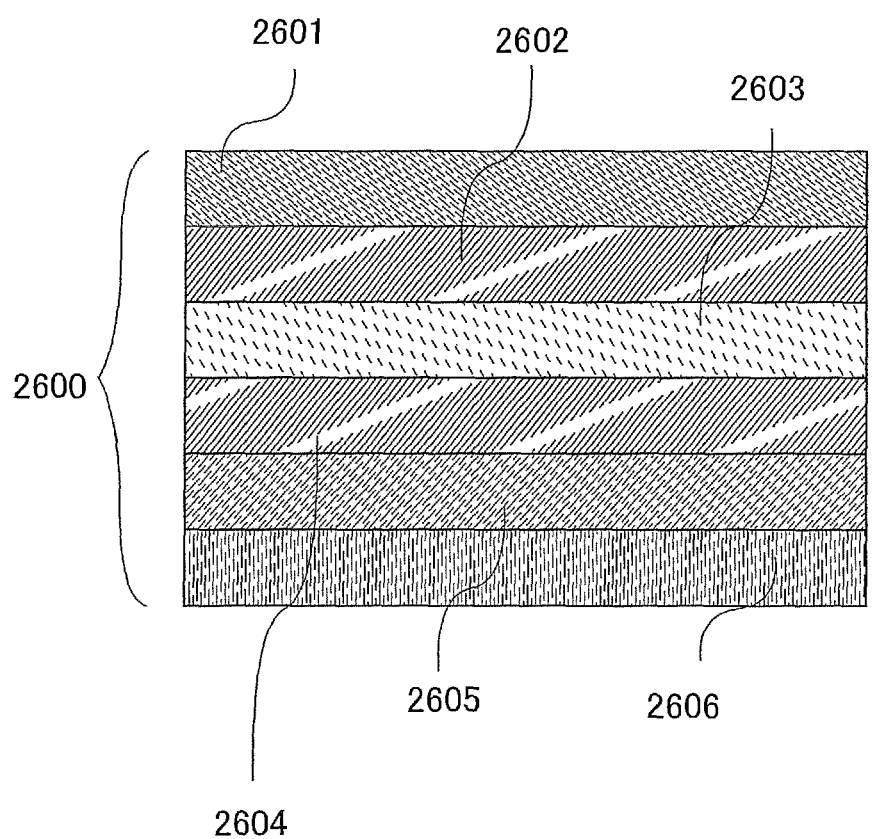
FIG. 26 is a view used for describing a structure of a display device of the present invention.

As shown in FIG. 26, a polarizing plate 2600 may include a protective film 2601, a first substrate film 2602, a PVA polarizing film 2603, a second substrate film 2604, an adhesive layer 2605, and a mold release film 2606.

The PVA polarizing film 2603 has a function of forming light in only a certain vibration direction (linear polarization). Specifically, the PVA polarizing film 2603 includes a molecule (polarizer) in which lengthwise electron density and widthwise electron density are greatly different from each other. The PVA polarizing film 2603 can form linear polarization by uniforming the direction of the molecules in which lengthwise electron density and widthwise electron density are greatly different from each other.

For example, as for the PVA polarizing film 2603, a polymer film of polyvinyl alcohol is doped with an iodine compound and the PVA film is pulled in a certain direction; whereby a film in which iodine molecules are aligned in a certain direction can be obtained. Then, light which is parallel to the major axis of the iodine molecule is absorbed by the iodine molecule. Alternatively, a dichroic dye may be used instead of iodine for high durability use and high heat resistance use. It is desirable that the dye be used for liquid crystal display devices which need to have durability and heat resistance such as an in-car LCD or an LCD for a projector.

When the PVA polarizing film 2603 is sandwiched by films to be base materials (the first substrate film 2602 and the second substrate film 2604) from the both sides, the reliability can be improved. Alternatively, the PVA polarizing film 2603 may be sandwiched by triacetylcellulose (TAC) films with high transparency and high durability. The substrate film and the TAC film function as protective films of the polarizer included in the PVA polarizing film 2603.

The adhesive layer 2605 which is to be attached to a glass substrate of a liquid crystal panel may be attached to the second substrate film 2604. The adhesive layer 2605 may be formed by applying an adhesive on the second substrate film 2602. Furthermore, the adhesive layer 2605 may be provided with the mold release film 2606 (separate film).

In addition, the protective film 2601 may be arranged adjacent to the first substrate film 2602.

A hard coating scattering layer (anti-glare layer) may be provided on the surface of the polarizing plate 2600. The surface of the hard coating scattering layer has minute unevenness that is formed by an AG treatment; therefore, the hard coating scattering layer has an anti-glare function which scatters external light and can prevent reflection of external light in the liquid crystal panel and the surface reflection.

Furthermore, a plurality of optical thin layers with different refractive indexes may be layered (referred to as anti-reflection treatment or AR treatment) on the surface of the polarizing plate 2600. The plurality of layered optical thin layers with different refractive indexes can reduce reflectivity on the surface by an effect of interference of light.

It is to be noted that this embodiment mode can be carried out freely combined with any of the other embodiment modes.

Embodiment Mode 5

In this embodiment mode, a method for mounting a driving circuit of a display device will be described with reference to FIGS. 27A to 27C.

Figure 27A:
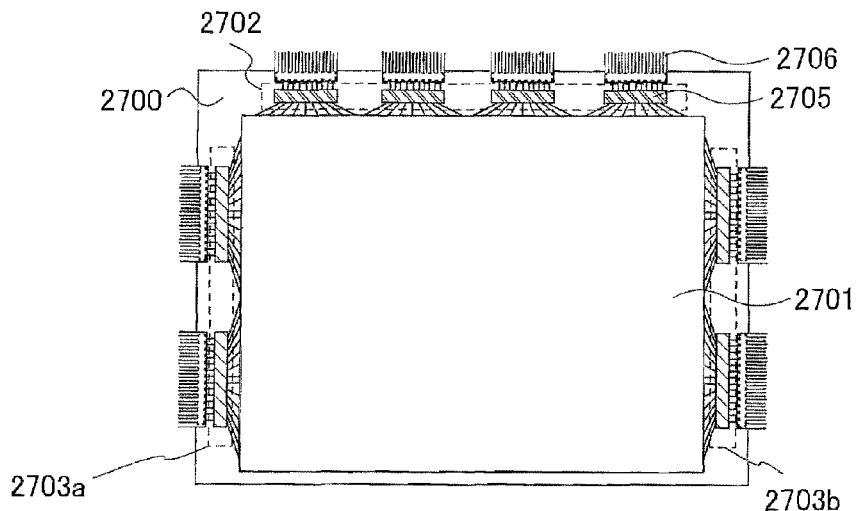
FIGS. 27A to 27C are views used for describing a structure of a peripheral driving circuit of a display device of the present invention.

In a case of FIG. 27A, a source signal line driving circuit 2702 and gate signal line driving circuits 2703*a* and 2703*b* are mounted at the periphery of a pixel portion 2701. That is, the source signal line driving circuit 2702, the gate signal line driving circuits 2703*a* and 2703*b*, and the like are mounted by mounting IC chips 2705 on the substrate 2701 by a known mounting method using an anisotropic conductive adhesive and an anisotropic conductive film, a COG method, a wire bonding method, reflow treatment using a solder bump, or the like. Further, the IC chip 2705 is connected to an external circuit through an FPC (flexible print circuit) 2706.

Part of the source signal line driving circuit 2702, for example, an analog switch may be integrated over the substrate, and the other portion thereof may be mounted by the IC chip separately.

Figure 27B:
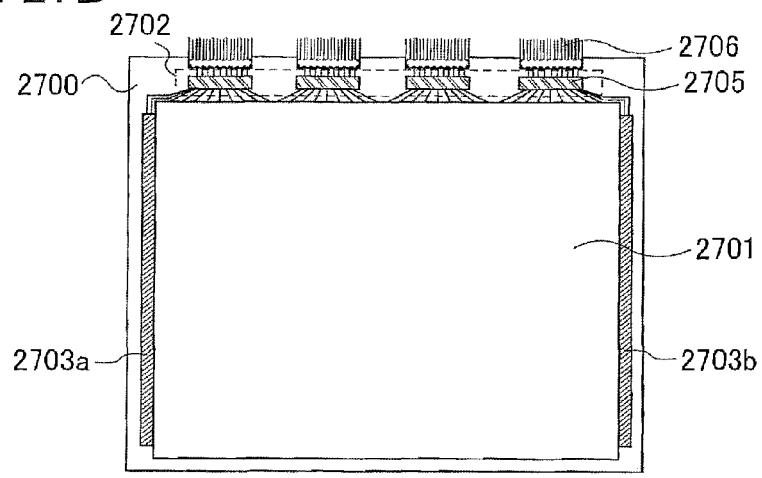

In addition, in a case of FIG. 27B, the pixel portion 2701, the gate signal line driving circuits 2703*a* and 2703*b*, and the like are integrated over the substrate, and the source signal line driving circuit 2702 and the like are separately mounted by the IC chip. That is, the IC chip 2705 is mounted on the substrate 2700 over which the pixel portion 2701, the gate signal line driving circuits 2703*a* and 2703*b*, and the like are integrated by a mounting method such as a COG method; accordingly, the source signal line driving circuit 2702 and the like are mounted. Further, the IC chip 2705 is connected to an external circuit through the FPC 2706.

Part of the source signal line driving circuit 2702, for example, an analog switch may be integrated over the substrate, and the other portion thereof may be mounted by the IC chip separately.

Figure 27C:
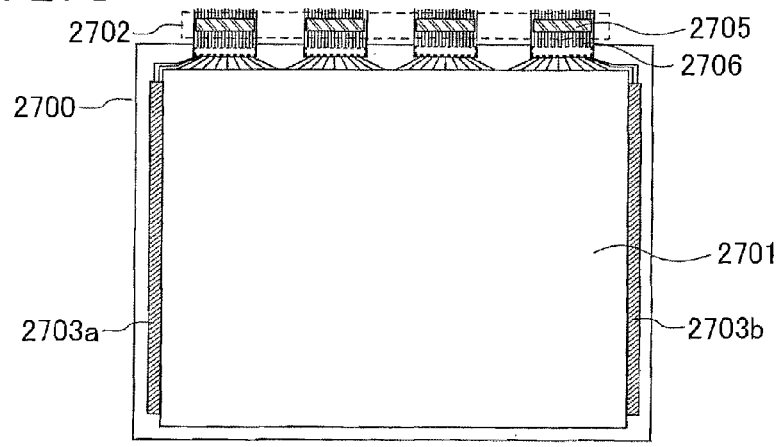

Moreover, in a case of FIG. 27C, the source signal line driving circuit 2702 and the like are mounted by a TAB method. The IC chip 2705 is connected to an external circuit through the FPC 2706. Although the source signal line driving circuit 2702 and the like are mounted by a TAB method in the case of FIG. 27C, the gate signal line driving circuit and the like may be mounted by a TAB method.

When the IC chip 2705 is mounted by a TAB method, a pixel portion can be provided widely with respect to the substrate, and accordingly, a narrowed frame can be achieved.

In addition, an IC in which an IC is formed over a glass substrate (hereinafter, referred to as a driver IC) may be provided instead of the IC chip 2705. As for the IC chip 2705, an IC chip is taken out of a circular silicon wafer; therefore, the shape of a mother substrate is limited. On the other hand, the driver IC has a mother substrate made of glass and the shape is not limited; thus, the productivity can be improved. Therefore, the shape and the size of the driver IC can be set freely. For example, in a case of forming the driver IC having a long side length of 15 to 80 mm, the required number of IC chips can be reduced as compared with a case of mounting IC chips. Accordingly, the number of connection terminals can be reduced, and a yield in manufacturing can be improved.

A driver IC can be formed using a crystalline semiconductor formed over a substrate, and the crystalline semiconductor may be formed by being irradiated with continuous wave laser light. A semiconductor film obtained by being irradiated with continuous wave laser light has crystal grains having large diameter with less crystal defects. Accordingly, a transistor having such a semiconductor film has favorable mobility and response speed and becomes capable of high speed drive, which is preferable for a driver IC.

It is to be noted that this embodiment mode can be carried out freely combined with any of the other embodiment modes.

Embodiment Mode 6

In this embodiment mode, a liquid crystal module performing color display by using white light of a driving mode such as an IPS (In-Plane-Switching) mode or an FFS (Fringe Field Switching) mode, which is a liquid crystal module incorporated into a liquid crystal display device will be explained with reference to a cross-sectional view of FIG. 28.

Figure 28:
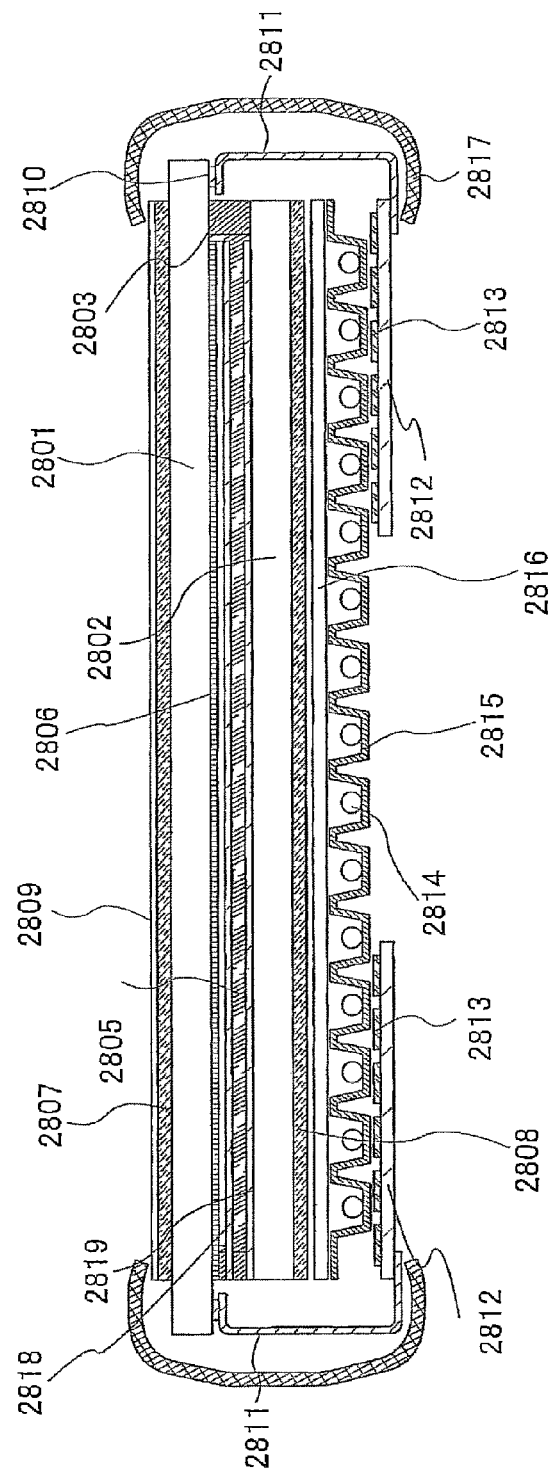
FIG. 28 is a view used for describing a structure of a display device of the present invention.

As shown in FIG. 28, a substrate 2801 and a counter substrate 2802 are fixed to each other by a sealing material 2803, and a liquid crystal layer 2805 is provided therebetween; accordingly, a liquid crystal display panel is formed.

A coloring film 2806 formed over the substrate 2801 is necessary in the case of performing color display, and in a case of an RGB system, a coloring film corresponding to each color of red, green, and blue is formed in each pixel. Alignment films 2818 and 2819 are formed inside of the substrate 2801 and the counter substrate 2802. Polarizing plates 2807 and 2808 are provided outside of the substrate 2801 and the counter substrate 2802. In addition, a protective film 2809 is formed over the surface of the polarizing plate 2807, and external impact is eased.

A wiring substrate 2812 is connected to a connection terminal 2810 provided over the substrate 2801 through an FPC 2811. An external circuit 2813 such as a pixel driving circuit (such as an IC chip or a driver IC), a control circuit, or a power supply circuit is incorporated into the wiring substrate 2812.

A cold-cathode tube 2814, a reflecting plate 2815, an optical film 2816, and an inverter (not shown) constitute a backlight unit. With the backlight unit as a light source, light is projected toward the liquid crystal display panel. The liquid crystal display panel, the light source, the wiring substrate 2812, the FPC 2811, and the like are maintained and protected by a bezel 2817.

It is to be noted that this embodiment mode can be carried out freely combined with any of the other embodiment modes.

Embodiment Mode 7

Next, a configuration example of a display device will be described with reference to FIG. 29. A display device 2920 shown in FIG. 29 may be provided with a display panel 2900, an external driving circuit 2921, a connection wiring substrate 2904, and a backlight unit 2914. The connection wiring substrate 2904 may be constituted of an FPC (flexible printed circuit).

The display panel 2900 includes a display portion 2901, a data line driver 2902, and a scan line driver 2903. It is to be noted that the data line driver 2902 and the scan line driver 2903 can be mounted by various methods.

The external driving circuit 2921 may include a control circuit 2910, an image data conversion circuit 2911, and a power supply circuit 2912. Further, the power supply circuit 2912 may be provided with a power supply 2915 for a control/image data conversion circuit, a power supply 2916 for drivers, a power supply 2917 for a pixel circuit, and a power supply 2918 for a backlight.

The connection wiring substrate 2904 may be electrically connected to the display panel 2900 through a connection portion 2905, and may be electrically connected to the external driving circuit 2921 through a connector 2913. Further, in order to correspond to a display panel having a large display portion 2901, a plurality of data line drivers, a plurality of scan line drivers, and a plurality of connection wiring substrates may be used for one display panel 2900 and one display portion 2901. When the number of data line drivers 2902 and scan line drivers 2903 is smaller, the number of ICs and connection points is decreased; thus, reliability can be improved and manufacturing costs can be reduced. When the number of data line drivers 2902 and scan line drivers 2903 is large, performance required for each driver is lowered, so that a yield can be improved. It is to be noted that the number of connection wiring substrates 2904 is preferably less than or equal to the number of data line drivers 2902 and scan line drivers 2903. When the number of connection wiring substrates 2904 is larger than the number of drivers, the number of contact points increases; thus, defects of breakage at the contact points are caused.

Figure 29:
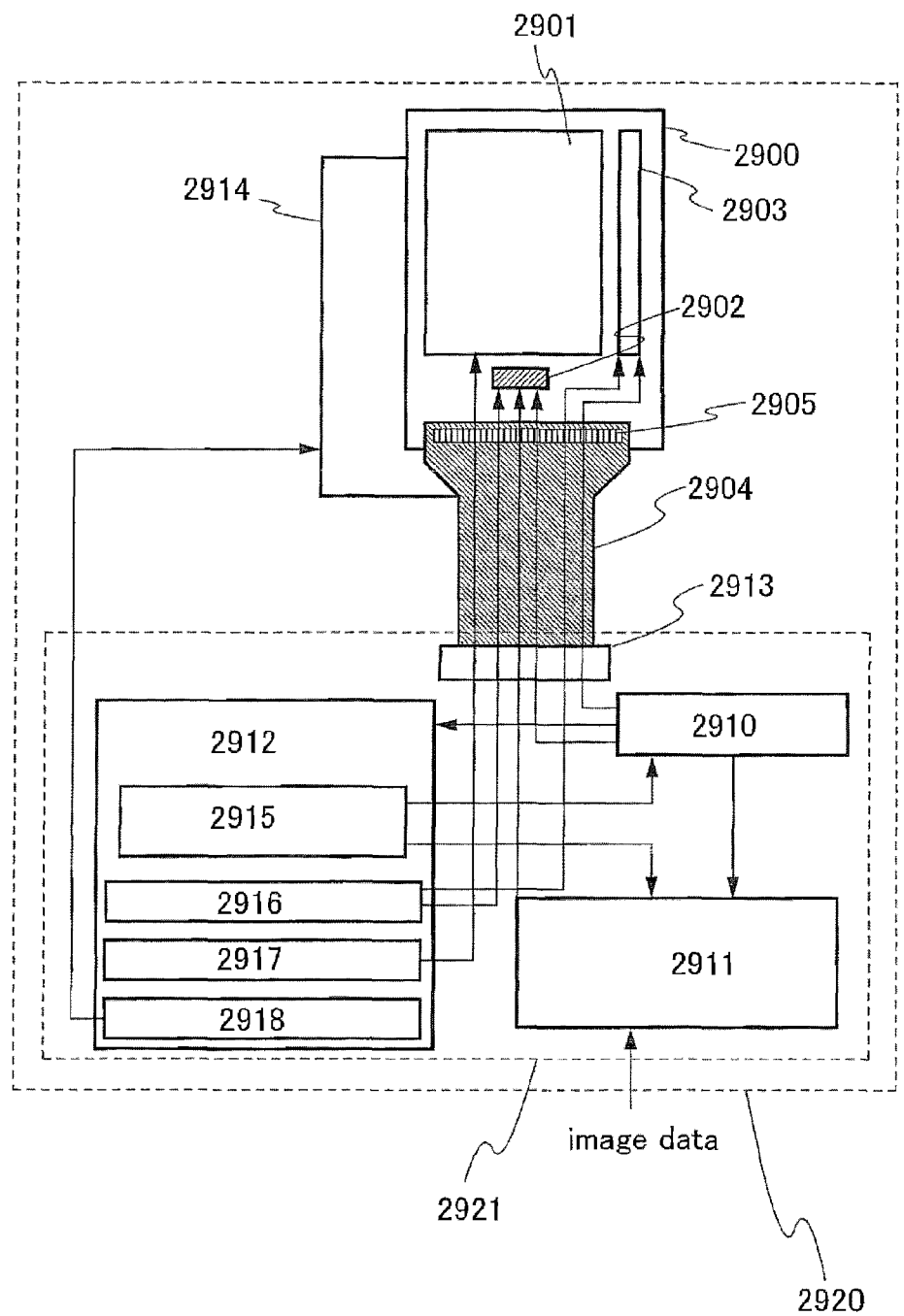
FIG. 29 is a view used for describing a structure of a peripheral driving circuit of a display device of the present invention.

In FIG. 29, the control circuit 2910 is connected to the image data conversion circuit 2911 and the power supply circuit 2912. Further, the control circuit 2910 is connected to the data line driver 2902 and the scan line driver 2903 through the connector 2913, the connection wiring substrate 2904, and the connection portion 2905. Further, the image data conversion circuit 2911 is connected to an input terminal which inputs image data. Further, the image data conversion circuit 2911 is connected to the data line driver 2902 through the connector 2913, the connection wiring substrate 2904, and the connection portion 2905.

Further, the power supply circuit 2912 supplies power for each circuit, and the power supply 2915 for a control/image data conversion circuit in the power supply circuit 2912 is connected to the control circuit 2910 and the image data conversion circuit 2911; the power supply 2916 for drivers is connected to the data line driver 2902 and the scan line driver 2903 through the connector 2913, the connection wiring substrate 2904, and the connection portion 2905; the power supply 2917 for a pixel circuit is connected to the display portion 2901 through the connector 2913, the connection wiring substrate 2904, and the connection portion 2905. The power supply 2918 for a backlight may be connected to the backlight unit 2914 by a wiring different from the connection wiring substrate 2904.

The voltage supplied to the control circuit 2910 and the image data conversion circuit 2911 from the power supply 2915 for control/image data conversion circuit is preferably as low as possible since the control circuit 2910 and the image data conversion circuit 2911 mainly conduct the logic operations, and thus, it is desirably about 3 V. Further, the voltage supplied from the power supply 2916 for drivers is preferably as low as possible in order to reduce power consumption. For example, when the ICs with single crystal substrates are used for the data line driver 2902 and the scan line driver 2903, the voltage is desirably about 3 V. Further, the data line driver 2902 and the scan line driver 2903 are integrated with the display panel 2900, voltage having an amplitude of about twice to three times as high as the threshold voltage of the transistor is desirably supplied. Consequently, the circuit can be operated securely while suppressing increase in power consumption.

The control circuit 2910 may have a configuration such that an operation of generating clocks to be supplied to data line driver 2902 and the scan line driver 2903, an operation of generating and supplying timing pulses, or the like are conducted. In addition, the control circuit 2910 may have a configuration such that an operation of generating clocks to be supplied to the image data conversion circuit 2911, an operation of generating timing pulses outputting converted image data to the data line driver 2902, or the like are conducted. The power supply circuit 2912 may have a configuration such that an operation of stopping supply of voltage to each circuit when the image data conversion circuit 2911, the data line driver 2902, and the scan line driver 2903, for example, are not required to be operated, thereby reducing power consumption.

When image data is input to the image data conversion circuit 2911, the image data conversion circuit 2911 converts the image data into data which can be input to the data line driver 2902 in accordance with the timing at which a signal is supplied from the control circuit 2910, and then, outputs the data to the data line driver 2902. Specifically, a configuration may be used in which image data input with an analog signal is converted into a digital signal with the image data conversion circuit 2911, and then, image data of the digital signal is output to the data line driver 2902.

The data line driver 2902 may have a configuration such as to take in the image data input to the data line driver 2902 with time division in accordance with a clock signal and a timing pulse supplied from the control circuit 2910; and output a data voltage or a data current with an analog value to a plurality of data lines in accordance with the data which has been taken. Updating of the data voltage or the data current output to the data lines may be conducted by a latch pulse supplied from the control circuit 2910. In accordance with the updating of the data voltage or the data current output to the data lines, the scan line driver 2903 operates the shift register circuit in response to a clock signal and a timing pulse supplied from the control circuit 2910 to scan the scan lines sequentially. It is to be noted that an example of arranging the scan line driver 2903 on one side is illustrated in FIG. 29; however, the scan line driver 2903 may be arranged on each side instead of one side. In the case of arranging the scan line driver 2903 on each side, left-right balance of the display device is achieved when mounted on an electronic device, so that it is advantageous in increasing the degree of freedom for arrangement.

It is to be noted that this embodiment mode can be carried out freely combined with any of the other embodiment modes.

Embodiment Mode 8

As semiconductor devices, video cameras, digital cameras, goggle-type displays (head mounted displays), navigation systems, audio reproducing devices (such as car audio components or audio components), notebook personal computers, game machines, mobile information terminals (mobile computers, cellular phones, mobile game machines, electronic books, and the like), image reproducing devices provided with a recording medium (specifically, devices provided with a display which can reproduce a recording medium such as a Digital Versatile Disk (DVD) and can display the image), and the like can be given. FIGS. 30A to 30D and FIG. 31 show specific examples of the semiconductor devices.

Figure 30A:
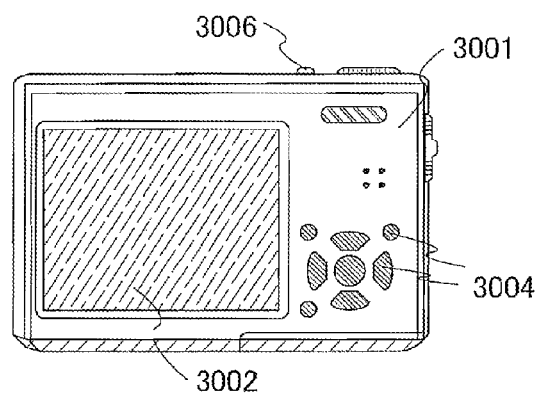
FIGS. 30A to 30D are views each showing an electronic device using a display device of the present invention.

FIG. 30A shows a digital camera, which includes a main body 3001, a display portion 3002, an imaging portion, operation keys 3004, a shutter button 3006, and the like. FIG. 30A shows the digital camera seen from the display portion 3002 side, and the imaging portion is not shown in FIG. 30A. By applying the contents (or part of them) described in this embodiment mode and other embodiment modes, a digital camera with less blurred moving images and reduced power consumption can be realized.

Figure 30B:
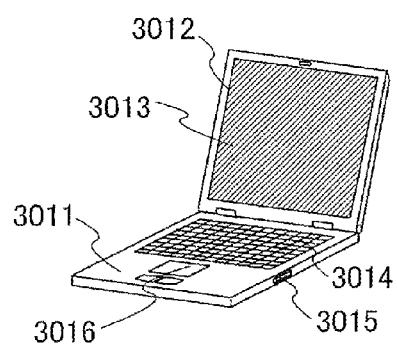

FIG. 30B shows a notebook personal computer, which includes a main body 3011, a casing 3012, a display portion 3013, a keyboard 3014, an external connection port 3015, a pointing device 3016, and the like. By applying the contents (or part of them) described in this embodiment mode and other embodiment modes, a notebook personal computer with less blurred moving images and reduced power consumption can be realized.

Figure 30C:
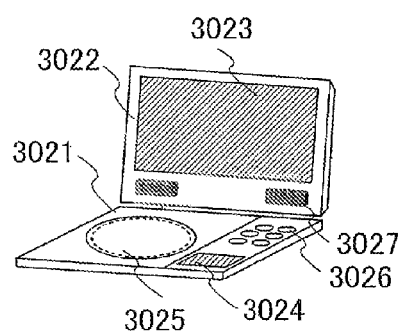

FIG. 30C shows a portable image reproducing device provided with a recording medium (specifically, a DVD reproducing device), which includes a main body 3021, a casing 3022, a display portion A 3023, a display portion B 3024, a recording medium (such as a DVD) reading portion 3025, operation keys 3026, a speaker portion 3027, and the like. The display portion A 3023 mainly displays image information and the display portion B 3024 mainly displays character information. The category of such an image reproducing device provided with a recording medium includes a home game machine and so on. By applying the contents (or part of them) described in this embodiment mode and other embodiment modes, an image reproducing device with less blurred moving images and reduced power consumption can be realized.

Figure 30D:
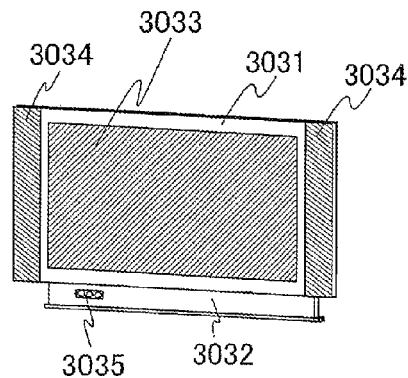

FIG. 30D shows a display device, which includes a casing 3031, a support 3032, a display portion 3033, a speaker 3034, a video input terminal 3035, and the like. This display device is manufactured by using a thin film transistor formed by a manufacturing method described in the above embodiment mode for the display portion 3033 and a driving circuit. Liquid crystal display devices, light emitting devices, and the like are given as examples of display devices. Specifically, all types of display devices for displaying information are included, for example, display devices for computers, display devices for receiving television broadcasting, and display devices for advertisement. By applying the contents (or part of them) described in this embodiment mode and other embodiment modes, a large-sized display device having a large screen of 22 to 50 inches, in particular, with less blurred moving images and reduced power consumption can be realized.

Figure 31:
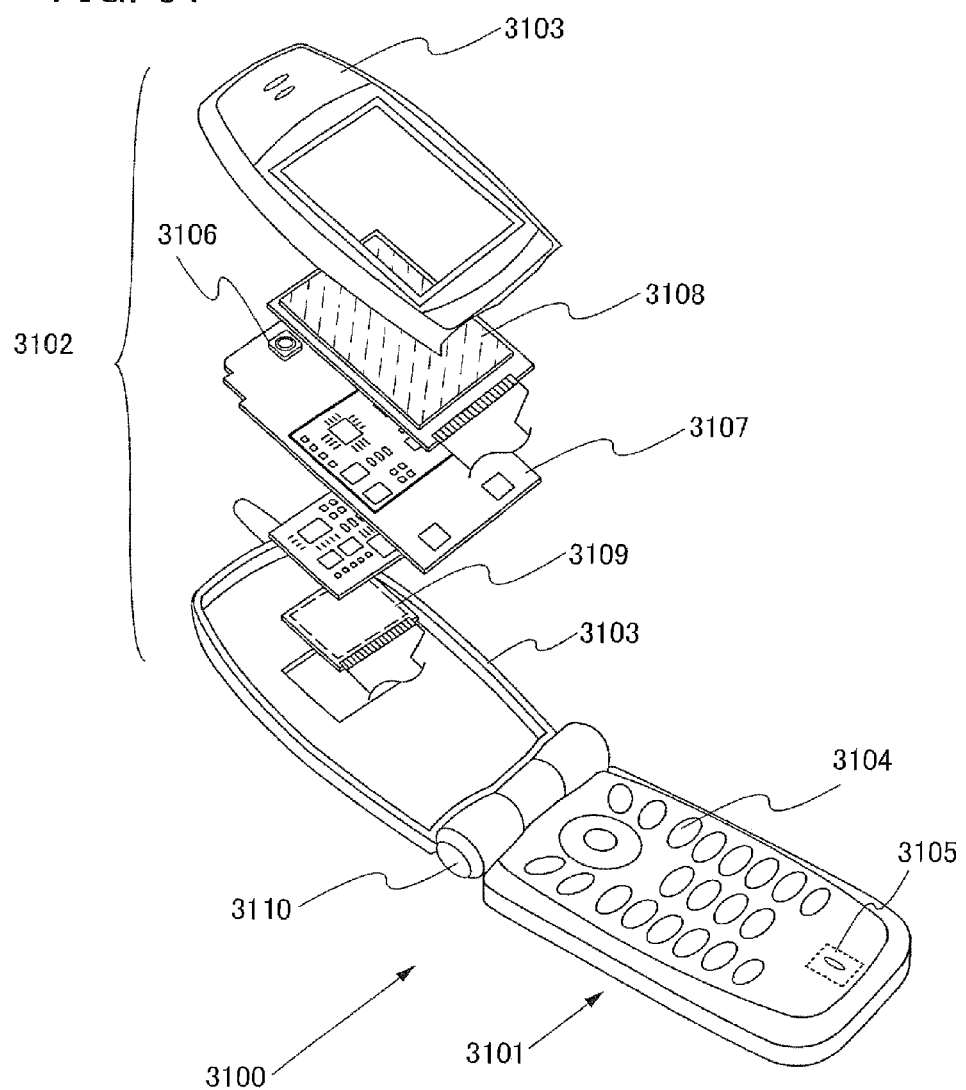
FIG. 31 is a view used for describing a packaging method of an electronic device using a display device of the present invention.

In the cellular phone shown in FIG. 31, a main body (A) 3101 provided with operation switches 3104, a microphone 3105, and the like is connected with a hinge 3110 to a main body (B) 3102 provided with a display panel (A) 3108, a display panel (B) 3109, a speaker 3106, and the like, such that the cellular phone can be opened and closed. The display panel (A) 3108 and the display panel (B) 3109 are placed in a casing 3103 of the main body (B) 3102 together with a circuit board 3107. Pixel portions of the display panel (A) 3108 and the display panel (B) 3109 are arranged such that they are visible through an opening formed in the casing 3103.

As for the display panel (A) 3108 and the display panel (B) 3109, the specifications such as the number of pixels can be appropriately determined in accordance with the functions of the cellular phone 3100. For example, the display panel (A) 3108 and the display panel (B) 3109 can be combined such that the display panel (A) 3108 works as a main screen and the display panel (B) 3109 works as a sub-screen.

By applying the contents (or part of them) described in this embodiment mode and other embodiment modes, a mobile information terminal with less blurred moving images and reduced power consumption can be realized.

The cellular phone according to this embodiment mode can be changed in various modes depending on functions or applications thereof. For example, it may be a camera-equipped cellular phone by implementing an imaging element in the hinge 3110. Even when the operation switches 3104, the display panel (A) 3108, and the display panel (B) 3109 are placed in one casing, the above-described effect can be obtained. Further, a similar effect can be obtained even when the structure of this embodiment mode is applied to an information display terminal equipped with a plurality of display portions.

It is to be noted that this embodiment mode can be carried out freely combined with any of the other embodiment modes.

Embodiment Mode 9

In this embodiment mode, an application example of a device (specifically, a display device or a display panel) using the contents (or part of them) described in this embodiment mode and other embodiment modes will be explained through illustration of application modes. A device using the contents (or part of them) described in this embodiment mode and other embodiment modes can be incorporated into a movable object, a constructed object, and the like.

Figure 36A:
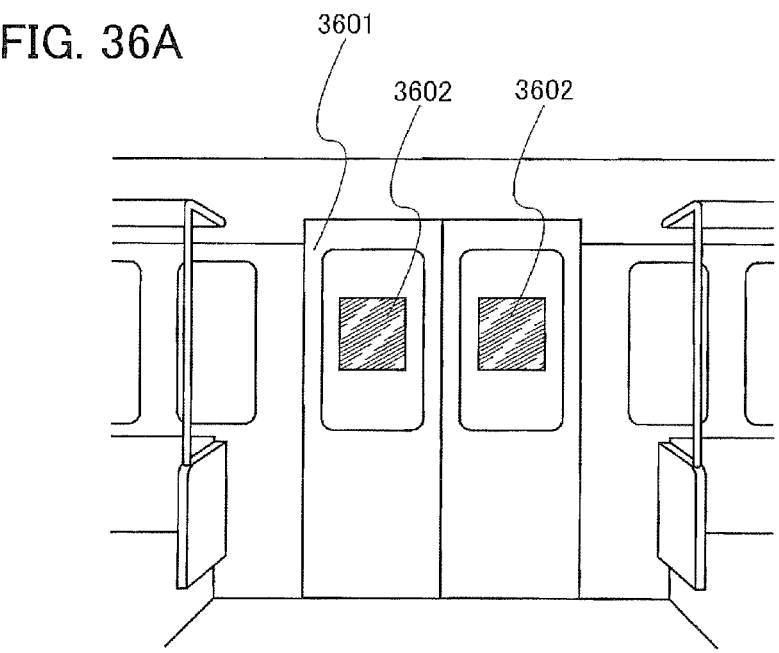
FIGS. 36A and 36B are views used for describing a movable object using a display device of the present invention.
Figure 36B:
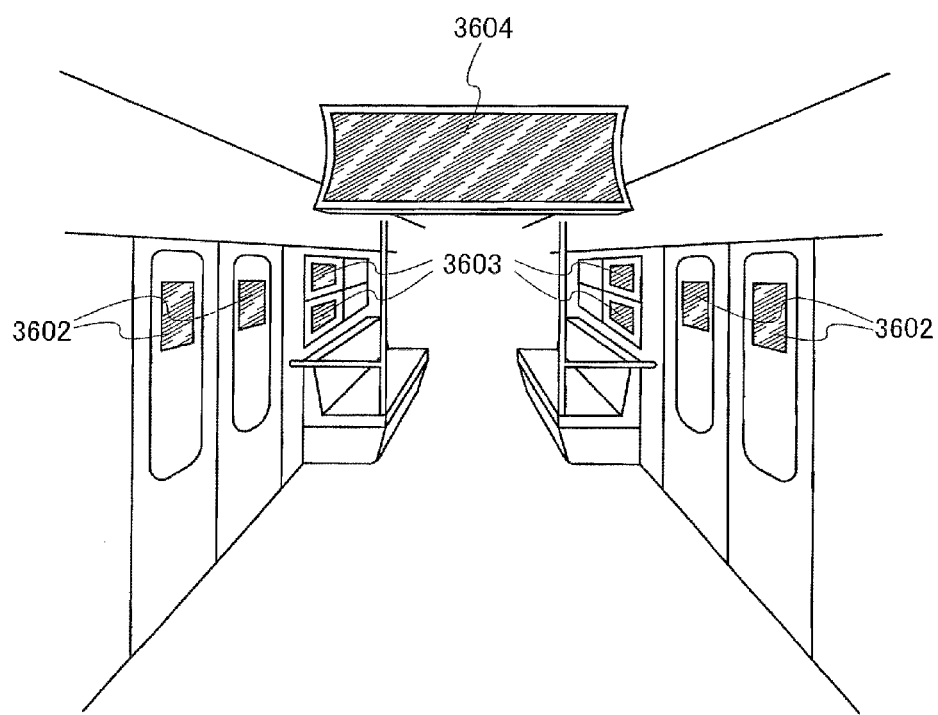

As for an example of a device using the contents (or part of them) described in this embodiment mode and other embodiment modes, a movable object incorporated with a display device is shown in FIGS. 36A and 36B. As an example of a movable object incorporated with a display device, FIG. 36A shows an example using a display panel 3602 for a glass part of a door in a train car body 3601. In the display panel 3602 including the display device using the pixel structure in a display portion shown in FIG. 36A, images displayed in the display portion can be easily switched by a signal from an external portion. Therefore, images on the display panel are switched in every time period when the types of passengers in the train are changed; thus, a more effective advertisement effect can be obtained.

It is to be noted that the device using the contents (or part of them) described in this embodiment mode and other embodiment modes is not limited to be applied to a glass part of a door in a train car body as shown in FIG. 36A and can be applied to any place by being changed into various shapes. An example thereof will be explained with reference to FIG. 36B.

A condition inside a train car body is shown in FIG. 36B. In FIG. 36B, a display panel 3603 provided in a glass window and a display panel 3604 suspended from a ceiling are shown in addition to the display panel 3602 in a glass part of a door shown in FIG. 36A. The display panel 3603 includes a self-luminous display element; therefore, when an advertisement image is displayed during rush hours and not displayed during non-rush hours, a view from a train window can also be seen. In addition, when a switching element such as an organic transistor is provided over a film-substrate and a self-luminous display element is driven, the display panel 3604 can perform display also in a bent state.

Another application mode will be explained with reference to FIG. 35 as an application example of a movable object incorporated with a display device which uses a device using the contents (or part of them) described in this embodiment mode and other embodiment modes.

Figure 35:
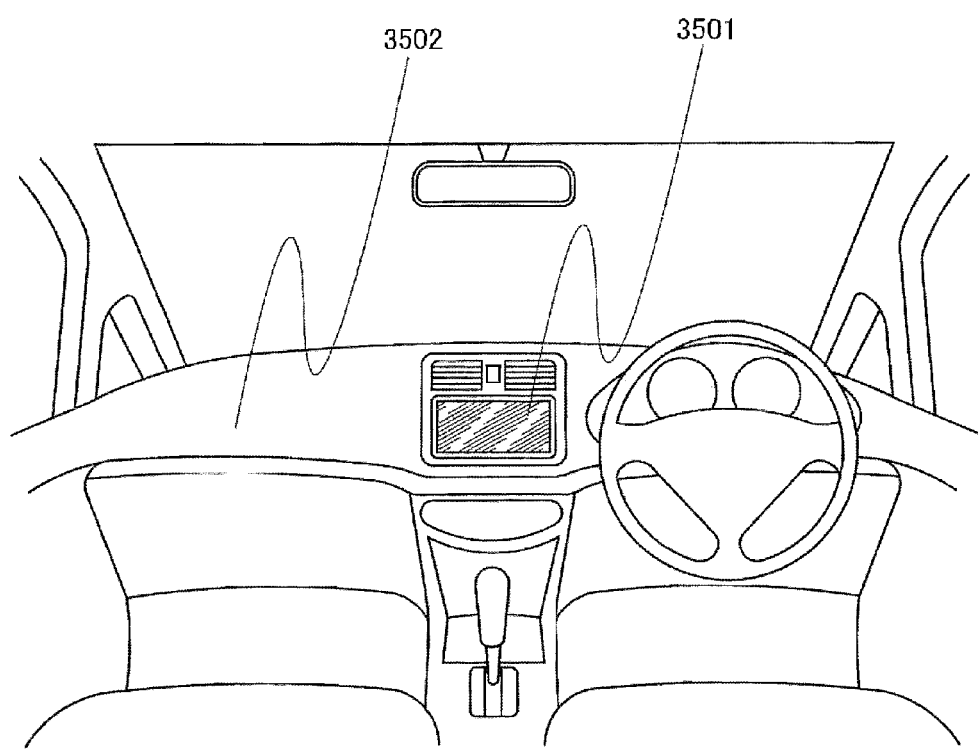
FIG. 35 is a view used for describing a movable object using a display device of the present invention.

As for an example of a device using the contents (or part of them) described in this embodiment mode and other embodiment modes, a movable object incorporated with a display device is shown in FIG. 35. As an example of a movable object incorporated with a display device, FIG. 35 shows a display panel 3502 incorporated into a body 3501 of a car. The display panel 3502 shown in FIG. 35 is incorporated into a body of a car, displays an operation of a car body and data input from an internal or external portion of a car body in an on-demand manner, and has a function to navigate a car to its destination.

It is to be noted that a device using the contents (or part of them) described in this embodiment mode and other embodiment modes is not limited to be applied to a front part of a car body as shown in FIG. 35 and can be applied to any place such as a glass window or a door by being changed into various shapes.

As for an application example of a movable object incorporated with a display device which uses a device using the contents (or part of them) described in this embodiment mode and other embodiment modes, another application mode will be explained with reference to FIGS. 37A and 37B.

Figure 37A:
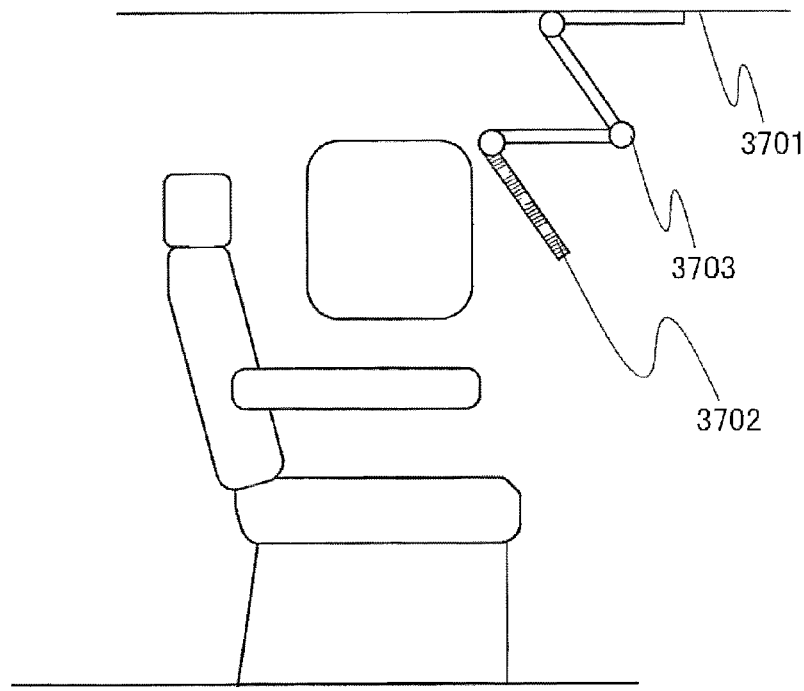
FIGS. 37A and 37B are views used for describing a movable object using a display device of the present invention.
Figure 37B:
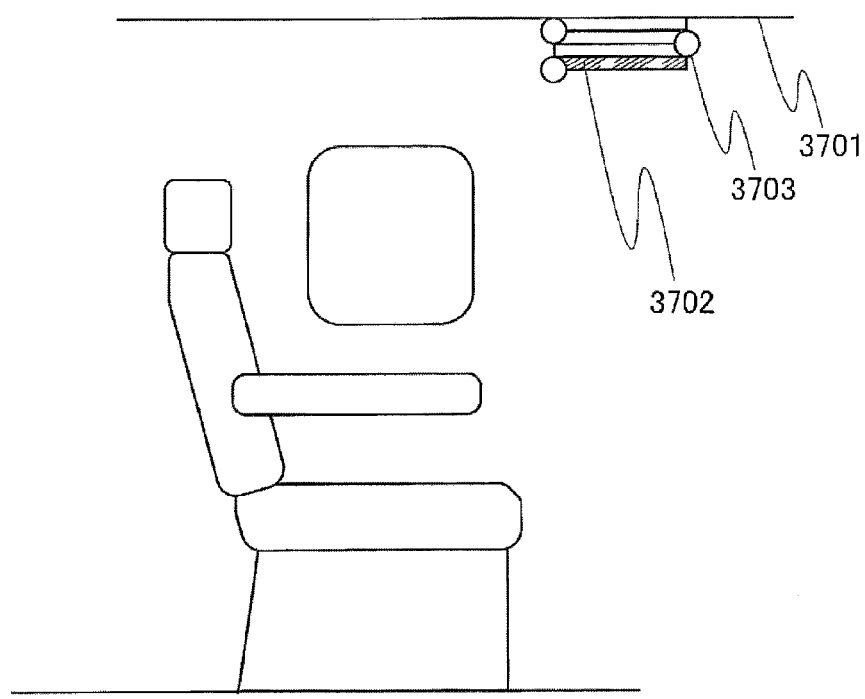

As for an example of a device using the contents (or part of them) described in this embodiment mode and other embodiment modes, a movable object incorporated with a display device is shown in FIGS. 37A and 37B. As for an example of a movable object incorporated with a display device, FIG. 37A shows an example of a display panel 3702 incorporated into a ceiling above a passenger seat of a body 3701 of an airplane. The display panel 3702 shown in FIG. 37A is incorporated into the body 3701 of an airplane through a hinge portion 3703, and the passengers can view the display panel 3702 by stretching of the hinge portion 3703. The display panel 3702 can display data by an operation by the passengers and can be used as advertisement or entertainment means. In addition, when the hinge portion is bent and put in the body 3701 of an airplane as shown in FIG. 37B, safety in taking-off and landing can be assured. Further, when a display element in the display panel is lighted in the case of emergency, the display panel can also be used as an evacuation light in the body 3701 of an airplane.

It is to be noted that a device using the contents (or part of them) described in this embodiment mode and other embodiment modes is not limited to be applied to a ceiling of the body 3701 of an airplane as shown in FIGS. 37A and 37B and can be applied to any place such as a seat or a door by being changed into various shapes. For example, a display panel may be provided on a back side of a seat so as to be operated and viewed.

In this embodiment mode, a body of a train car, a body of a car, a body of an airplane are illustrated as movable objects, but the present invention is not limited to this, and various moving objects such as a motorcycle, an auto four-wheel car (including a car, a bus, and the like), a train (including a monorail, a railroad car, and the like), and a vessel can be provided. By employing the device using the contents (or part of them) described in this embodiment mode and other embodiment modes, downsizing and low power consumption of the display panel can be achieved, and further, a movable object including a display medium which operates favorably can be provided. In particular, since display on the display panels in movable objects can be switched at the same time by a signal from an external portion, the display panel is highly effective as an advertisement display board for an indefinite number of customers or an information display board in the case of emergency or disaster.

As for an application example using a device using the contents (or part of them) described in this embodiment mode and other embodiment modes, an application mode using a constructed object will be explained with reference to FIG. 34.

As an application example of a device using the contents (or part of them) described in this embodiment mode and other embodiment modes, in FIG. 34, a switching element such as an organic transistor is provided over a film-substrate and a self-luminous display element is driven so that a display panel which can perform display even when being bent will be described. In FIG. 34, a display panel is provided on a curved surface of a column-shaped object provided outside, such as a power pole, as a constructed object. Here, as a column-shaped object, a power pole 3401 provided with a display panel 3402 will be explained.

Figure 34:
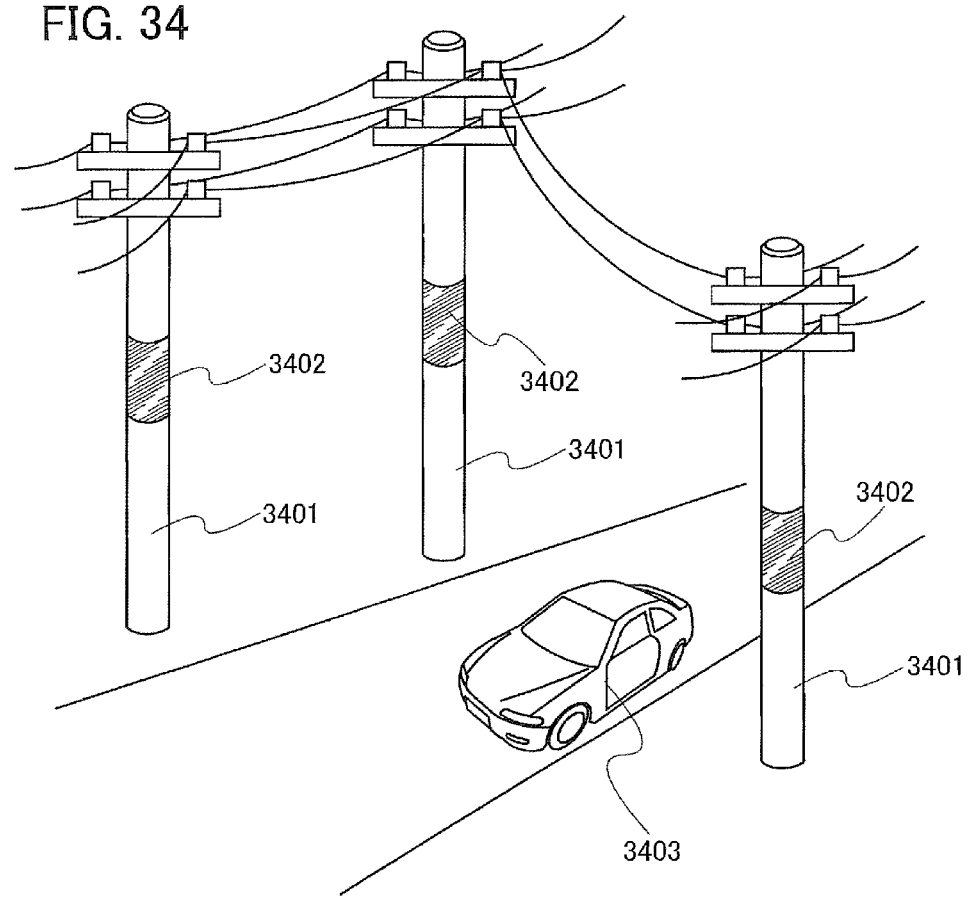
FIG. 34 is a view used for describing a column-shaped object using a display device of the present invention.

The display panel 3402 shown in FIG. 34 is positioned around the middle of the height of the power pole and is provided at a position higher than the human eye level. Thus, when viewing the display panel from a movable object 3403, an image on the display panel 3402 can be viewed. When the power poles stand together in large numbers repeatedly and the same images are displayed on the display panels 3402 on the power poles, viewers can view information display and advertisement display. Since it is easy to display the same images from an external portion on the display panels 3402 provided on the power poles 3401, highly effective information display and advertisement effect can be obtained. In addition, a self-luminous display element is provided as a display element; therefore, the device using the contents (or part of them) described in this embodiment mode and other embodiment modes can be effectively used as a display medium having high visibility also at night.

As for an application example using a device using the contents (or part of them) described in this embodiment mode and other embodiment modes, an application mode of a constructed object that is different from that of FIG. 34 will be explained with reference to FIG. 33.

Figure 33:
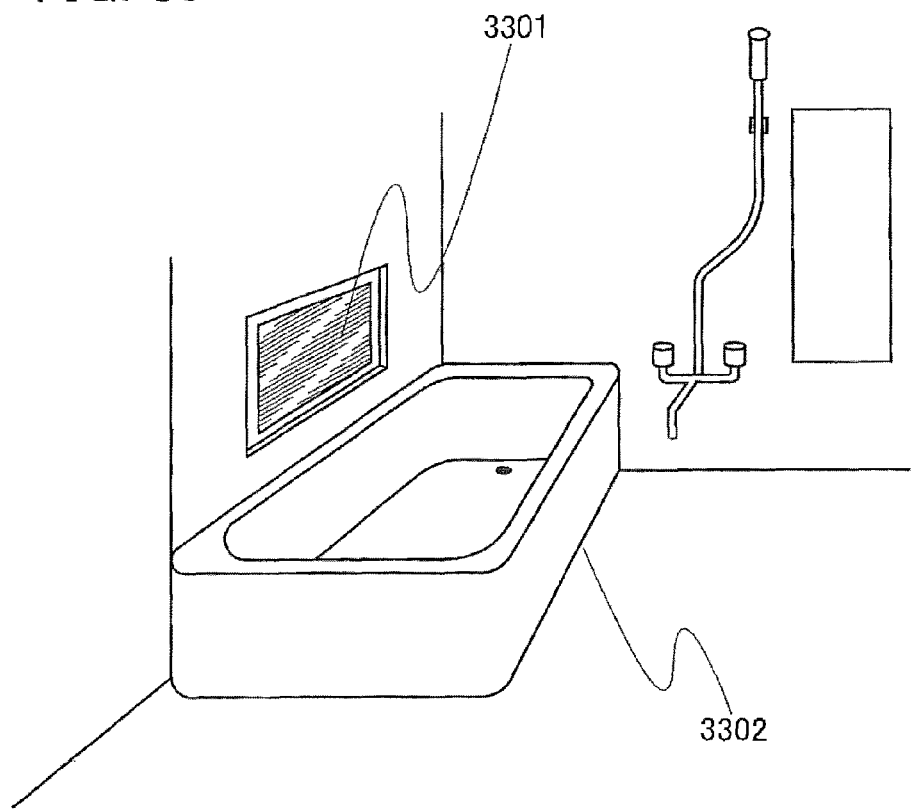
FIG. 33 is a view used for describing an application mode of a constructed object using a display device of the present invention.

FIG. 33 shows an application example of a device using the contents (or part of them) described in this embodiment mode and other embodiment modes. FIG. 33 shows a display panel 3301 incorporated into a side wall of a prefabricated bath 3302 as an example of a constructed object incorporated with a display device. The display panel 3301 shown in FIG. 33 is incorporated into the prefabricated bath 3302, and a person who takes a bath can view the display panel 3301. The display panel 3301 can display data by an operation by a person who takes a bath and can be used as advertisement or entertainment means.

It is to be noted that the device using the contents (or part of them) described in this embodiment mode and other embodiment modes is not limited to be applied to the side wall of the prefabricated bath 3302 as shown in FIG. 33 and can be applied to any place such as part of a mirror or a bathtub by being changed into various shapes.

Figure 32:
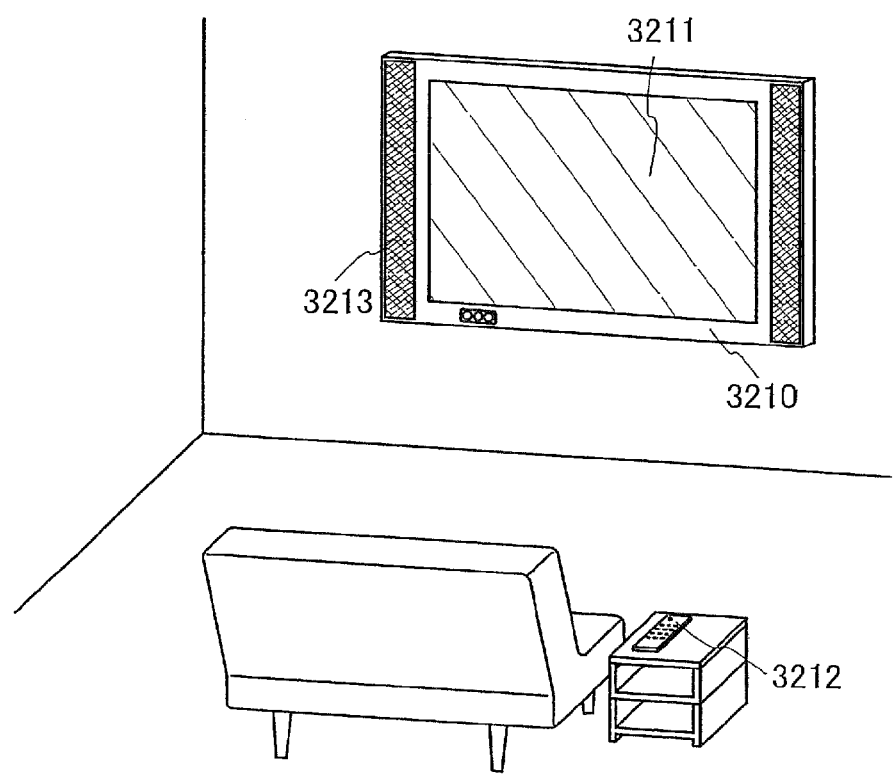
FIG. 32 is a view used for describing an application mode of a constructed object using a display device of the present invention.

In addition, FIG. 32 shows an example in which a television device having a large display portion is provided inside a building. The television device shown in FIG. 32 includes a housing 3210, a display portion 3211, a remote control device 3212 that is an operation portion, a speaker portion 3213, and the like. The device using the contents (or part of them) described in this embodiment mode and other embodiment modes is applied to manufacture the display portion 3211. The television device shown in FIG. 32 is incorporated into the building as a wall-hanging type and can be provided without requiring a wide space.

In this embodiment mode, as a constructed object, a power pole as a column-shaped body, a prefabricated bath, and the like are shown as examples; however, this embodiment mode is not limited to this, and any constructed object that can be provided with a display panel may be used.

By employing the device using the contents (or part of them) described in this embodiment mode and other embodiment modes, downsizing and low power consumption of the display panel can be achieved, and further, a movable object including a display medium which operates favorably can be provided.

This application is based on Japanese Patent Application serial No. 2006-155459 filed in Japan Patent Office on Jun. 2, 2006, the entire contents of which are hereby incorporated by reference.

What is claimed is:
1. A display device comprising:
a substrate;
a pixel portion over the substrate;
a signal line conductive layer in the pixel portion and generally oriented along a column direction; and
a first pixel in the pixel portion, the first pixel belonging to a column of pixels, the column of pixels being oriented along the column direction, and the first pixel comprising:
a first transparent conductive layer;
a second transparent conductive layer, the second transparent conductive layer overlapping with the first transparent conductive layer and comprising a first stripe-shaped portion oblique with respect to the column direction; and
a transistor comprising a semiconductor layer, a source electrode, and a drain electrode, one of the first transparent conductive layer and the second transparent conductive layer being electrically connected to the signal line conductive layer via the source electrode and the drain electrode,
wherein the signal line conductive layer comprises a first stripe-shaped portion parallel to the first stripe-shaped portion of the second transparent conductive layer,
wherein the display device is configured so that, during display, one frame period comprises at least a first subframe period and a second subframe period,
wherein each of the first subframe period and the second subframe period consists of one subframe period,
wherein, when the display device displays a maximum gray scale in the one frame period, a first luminance Lmax1 in the first subframe period and a second luminance Lmax2 in the second subframe period satisfy (½) Lmax2<Lmax1<(9/10) Lmax2, and
wherein a luminance change with respect to a gray scale change is constant in either the first subframe period or the second subframe period.

2. A display device comprising:
a substrate;
a pixel portion over the substrate;
a signal line conductive layer in the pixel portion and generally oriented along a column direction; and
a first pixel in the pixel portion, the first pixel belonging to a column of pixels, the column of pixels being oriented along the column direction, and the first pixel comprising:
a transistor comprising a semiconductor layer, a gate electrode, a source electrode, and a drain electrode;
a first insulating film over the semiconductor layer, the gate electrode, the source electrode, and the drain electrode, the first insulating film comprising a first opening;
a first transparent conductive layer over the first insulating film;
a second insulating film over the first transparent conductive layer, the second insulating film comprising a second opening;
a second transparent conductive layer over the second insulating film, the second transparent conductive layer overlapping with the first transparent conductive layer, comprising a first stripe-shaped portion oblique with respect to the column direction, and being connected to the signal line conductive layer via the first opening, the second opening, and each of the source electrode and the drain electrode,
wherein the signal line conductive layer comprises a first stripe-shaped portion parallel to the first stripe-shaped portion of the second transparent conductive layer,
wherein the display device is configured so that, during display, one frame period comprises at least a first subframe period and a second subframe period,
wherein each of the first subframe period and the second subframe period consists of one subframe period,
wherein, when the display device displays a maximum gray scale in the one frame period, a first luminance Lmax1 in the first subframe period and a second luminance Lmax2 in the second subframe period satisfy (½) Lmax2<Lmax1<(9/10) Lmax2, and
wherein a luminance change with respect to a gray scale change is constant in either the first subframe period or the second subframe period.

3. The display device according to claim 1,
wherein the second transparent conductive layer comprises a second stripe-shaped portion oblique with respect to the column direction,
wherein the first stripe-shaped portion and the second stripe-shaped portion of the second transparent conductive layer make a first angle and a second angle with the column direction, respectively, the second angle being different from the first angle, and
wherein the signal line conductive layer comprises a second stripe-shaped portion parallel to the second stripe-shaped portion of the second transparent conductive layer.

4. The display device according to claim 2,
wherein the second transparent conductive layer comprises a second stripe-shaped portion oblique with respect to the column direction,
wherein the first stripe-shaped portion and the second stripe-shaped portion of the second transparent conductive layer make a first angle and a second angle with the column direction, respectively, the second angle being different from the first angle, and wherein the signal line conductive layer comprises a second stripe-shaped portion parallel to the second stripe-shaped portion of the second transparent conductive layer.

5. A display device comprising:
a substrate;
a pixel portion over the substrate;
a signal line conductive layer in the pixel portion and generally oriented along a column direction; and
a first pixel in the pixel portion, the first pixel belonging to a column of pixels, the column being oriented along the column direction, the first pixel comprising:
 a transistor comprising a semiconductor layer, a gate electrode, a source electrode, and a drain electrode;
 a first insulating film over the semiconductor layer, the gate electrode, the source electrode, and the drain electrode, the first insulating film comprising a first opening;
 a first transparent conductive layer over the first insulating film;
 a second insulating film over the first transparent conductive layer, the second insulating film comprising a second opening; and
 a second transparent conductive layer over the second insulating film, the second transparent conductive layer overlapping with the first transparent conductive layer, comprising a first stripe-shaped portion and a second stripe-shaped portion, and being connected to the signal line conductive layer via the first opening, the second opening, and each of the source electrode and the drain electrode,
wherein the first stripe-shaped portion and the second stripe-shaped portion of the second transparent conductive layer make a first angle and a second angle with the column direction, respectively, the second angle being different from the first angle,
wherein the signal line conductive layer comprises a first stripe-shaped portion and a second stripe-shaped portion parallel to the first stripe-shaped portion and to the second stripe-shaped portion of the second transparent conductive layer, respectively,
wherein the display device is configured so that, during display, one frame period comprises at least a first subframe period and a second subframe period,
wherein each of the first subframe period and the second subframe period consists of one subframe period,
wherein, when the display device displays a maximum gray scale in the one frame period, a first luminance Lmax1 in the first subframe period and a second luminance Lmax2 in the second subframe period satisfy (½) Lmax2<Lmax1<(9/10) Lmax2, and
wherein a luminance change with respect to a gray scale change is constant in either the first subframe period or the second subframe period.

6. The display device according to claim 1,
wherein the second transparent conductive layer comprises a second stripe-shaped portion parallel to the first stripe-shaped portion of the second transparent conductive layer, and wherein the first transparent conductive layer of the first pixel is continuously formed so as to overlap with the first stripe-shaped portion and the second stripe-shaped portion of the second transparent conductive layer and with a totality of a space separating the first stripe-shaped portion and the second stripe-shaped portion of the second transparent conductive layer.

7. The display device according to claim 2,
wherein the second transparent conductive layer comprises a second stripe-shaped portion parallel to the first stripe-shaped portion of the second transparent conductive layer, and
wherein the first transparent conductive layer of the first pixel is continuously formed so as to overlap with the first stripe-shaped portion and the second stripe-shaped portion of the second transparent conductive layer and with a totality of a space separating the first stripe-shaped portion and the second stripe-shaped portion of the second transparent conductive layer.

8. The display device according to claim 5,
wherein the second transparent conductive layer comprises a third stripe-shaped portion parallel to the first stripe-shaped portion of the second transparent conductive layer, and
wherein the first transparent conductive layer of the first pixel is continuously formed so as to overlap with the first stripe-shaped portion, the second stripe-shaped portion, and the third stripe-shaped portion of the second transparent conductive layer, and with a totality of a space separating the first stripe-shaped portion from the third stripe-shaped portion of the second transparent conductive layer.

9. The display device according to claim 1,
wherein the semiconductor layer comprises amorphous silicon or polycrystalline silicon.

10. The display device according to claim 2,
wherein the semiconductor layer comprises amorphous silicon or polycrystalline silicon.

11. The display device according to claim 5,
wherein the semiconductor layer comprises amorphous silicon or polycrystalline silicon.

12. The display device according to claim 1,
wherein the semiconductor layer comprises an oxide semiconductor.

13. The display device according to claim 2,
wherein the semiconductor layer comprises an oxide semiconductor.

14. The display device according to claim 5,
wherein the semiconductor layer comprises an oxide semiconductor.

15. A liquid crystal display panel including the display device according to claim 1.

16. A liquid crystal display panel including the display device according to claim 2.

17. A liquid crystal display panel including the display device according to claim 5.

* * * * *